(12) United States Patent
Shimanaka et al.

(10) Patent No.: US 10,982,020 B2
(45) Date of Patent: Apr. 20, 2021

(54) A-B BLOCK CO-POLYMER, A-B BLOCK CO-POLYMER PRODUCTION METHOD, RESIN TREATMENT PIGMENT COMPOSITION, RESIN TREATMENT PIGMENT COMPOSITION PRODUCTION METHOD, PIGMENT DISPERSION, AND PIGMENT DISPERSION SOLUTION

(71) Applicant: DAINICHISEIKA COLOR & CHEMICALS MFG. CO., LTD., Tokyo (JP)

(72) Inventors: Hiroyuki Shimanaka, Tokyo (JP); Yoichi Tagi, Tokyo (JP); Yoshikazu Murakami, Tokyo (JP); Shinichiro Aoyagi, Tokyo (JP); Kazutaka Arai, Tokyo (JP); Sachio Yoshikawa, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 15/313,179

(22) PCT Filed: Jun. 25, 2014

(86) PCT No.: PCT/JP2014/066844
§ 371 (c)(1),
(2) Date: Nov. 22, 2016

(87) PCT Pub. No.: WO2015/198422
PCT Pub. Date: Dec. 30, 2015

(65) Prior Publication Data
US 2017/0166665 A1 Jun. 15, 2017

(51) Int. Cl.
| C08F 8/36 | (2006.01) |
| C08F 293/00 | (2006.01) |
| C08F 8/34 | (2006.01) |
| C09D 17/00 | (2006.01) |
| C08F 8/44 | (2006.01) |
| C09D 11/107 | (2014.01) |
| C08L 71/00 | (2006.01) |
| C08F 2/06 | (2006.01) |
| C09C 3/10 | (2006.01) |
| C09D 11/10 | (2014.01) |

(Continued)

(52) U.S. Cl.
CPC ............ *C08F 8/34* (2013.01); *C08F 2/06* (2013.01); *C08F 8/36* (2013.01); *C08F 8/42* (2013.01); *C08F 8/44* (2013.01); *C08F 293/005* (2013.01); *C08L 71/00* (2013.01); *C09B 69/106* (2013.01); *C09B 69/108* (2013.01); *C09B 69/109* (2013.01); *C09C 3/10* (2013.01); *C09D 11/10* (2013.01); *C09D 11/107* (2013.01); *C09D 11/326* (2013.01); *C09D 17/00* (2013.01)

(58) Field of Classification Search
CPC ...... C08F 8/36; C08F 293/005; C08L 53/005; C08L 71/00
See application file for complete search history.

(56) References Cited

U.S. PATENT DOCUMENTS

| 5,571,850 | A * | 11/1996 | Ma ................... C07C 69/604 106/31.75 |
| 7,446,135 | B2 * | 11/2008 | Ham ................... C08F 293/005 523/160 |
| 2010/0081752 | A1 * | 4/2010 | Ma ................... C08F 293/005 524/514 |

FOREIGN PATENT DOCUMENTS

| JP | 2007084659 | 4/2007 |
| JP | 4492760 | 6/2010 |

(Continued)

OTHER PUBLICATIONS

International Search Report issued in PCT/JP2014/066844 dated Sep. 22, 2014, 4 pages.

(Continued)

*Primary Examiner* — Karuna P Reddy
(74) *Attorney, Agent, or Firm* — Hamre, Schumann, Mueller & Larson, P.C.

(57) ABSTRACT

There is provided a resin-treated pigment that is useful as a coloring agent for color filters or inkjet inks, that can expand a hue range and improve performances such as color density, color developability, and transparency, and that is excellent in properties such as dispersibility and dispersion stability of pigments, re-dissolvability, and alkali-solubility. An A-B block copolymer 90% by mass or more of which is constituted by a methacrylate-based monomer or methacrylate-based monomers, in which the block A has a carboxy group-containing methacrylate as a constituent, and the block B has an ionic bond moiety represented by formula (1) as a constitutional unit, the ionic bond moiety containing a methacrylate, and an organic coloring matter having one or more sulfonate ions each being bonded thereto and each being a counter ion of a nitrogen cation of a quaternary ammonium salt.

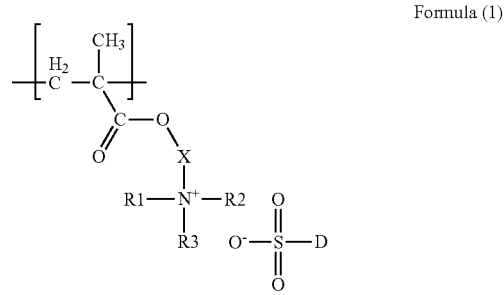

Formula (1)

15 Claims, 7 Drawing Sheets

(51) Int. Cl.
    *C09D 11/326*    (2014.01)
    *C08F 8/42*      (2006.01)
    *C09B 69/10*     (2006.01)

(56)             References Cited

FOREIGN PATENT DOCUMENTS

| JP | 2012184342  | 9/2012  |
| JP | 2012193249  | 10/2012 |
| JP | 2012212054  | 11/2012 |
| JP | 2013203887  | 10/2013 |
| JP | 2013213161  | 10/2013 |
| JP | 2014-214207 | 11/2014 |
| WO | 2007089859  | 8/2007  |
| WO | 2010013651  | 2/2010  |
| WO | 2010016523  | 2/2010  |
| WO | 2011122447  | 10/2011 |

OTHER PUBLICATIONS

Extended European Search Report, issued in the corresponding European patent application 14895990.1, dated Dec. 1, 2017, 6 pages.
Toshihiko Nakamichi, "Yokuwakaru Ganryo-Bunsan", Nikkan Kogyo Shinbunsha, Mar. 16, 2009, 14 pages including partial translation and relevancy statement).
European Office Action, issued in the corresponding European patent application No. 14895990.1, dated Jun. 17, 2019, 27 pages, with a full translation of JP 2013-203887, previously cited in the IDS filed Nov. 22, 2016.

* cited by examiner

[Figure 1]
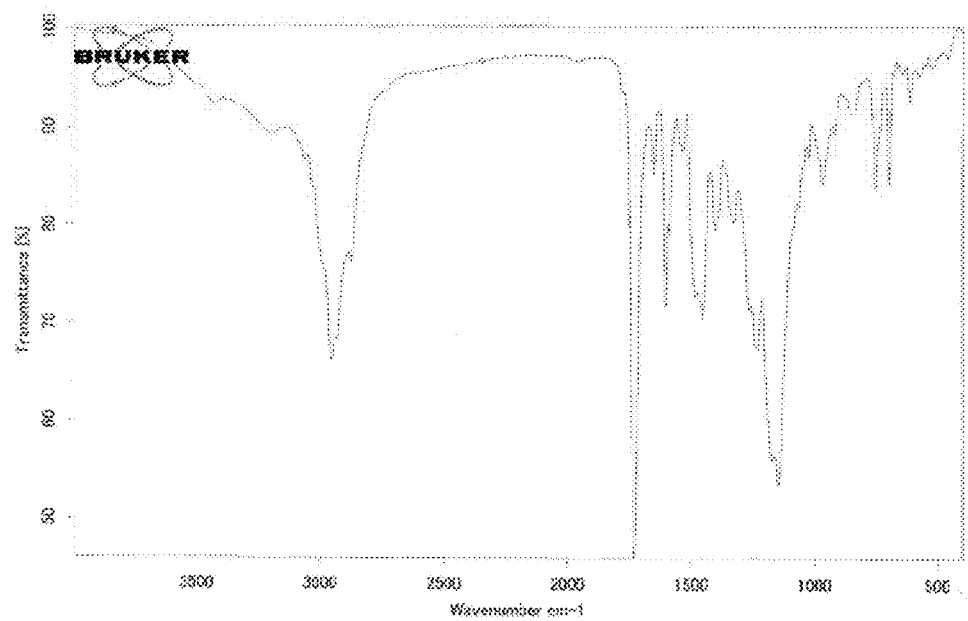
[Figure 2]
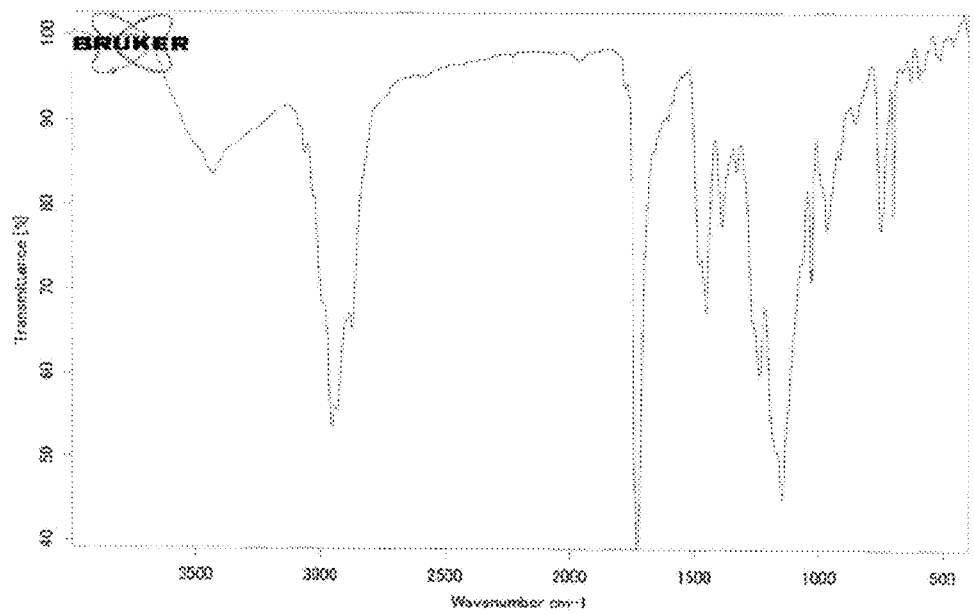

[Figure 3]
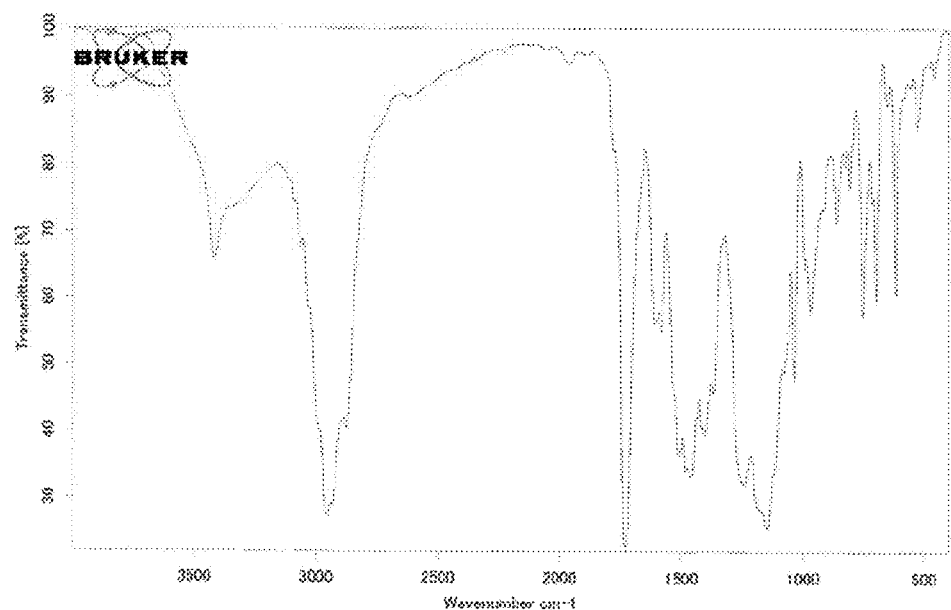
[Figure 4]
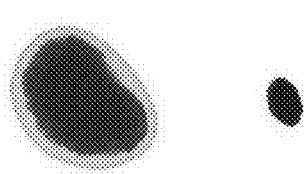

[Figure 5]
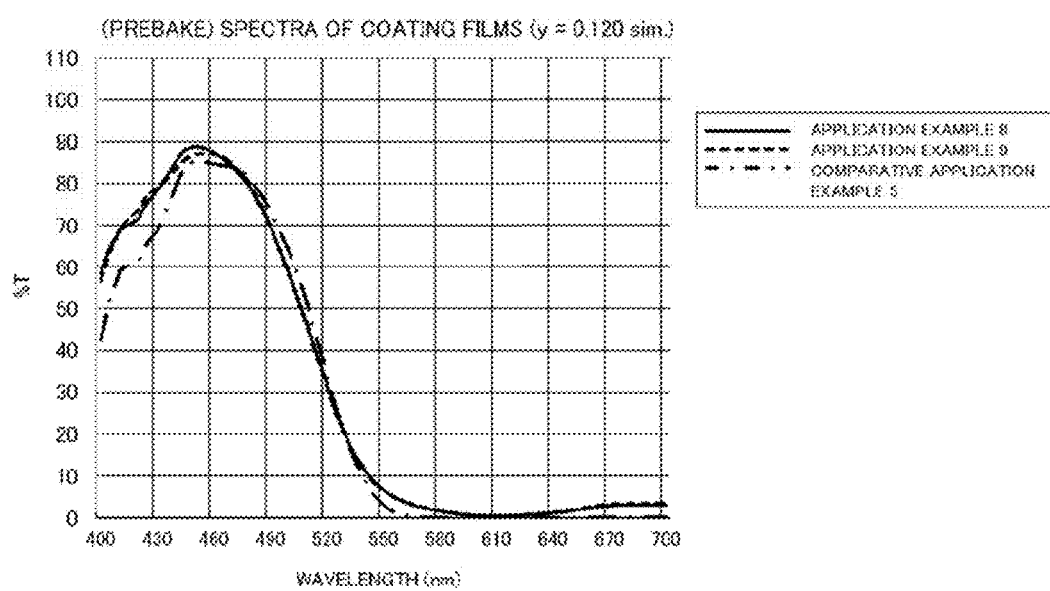

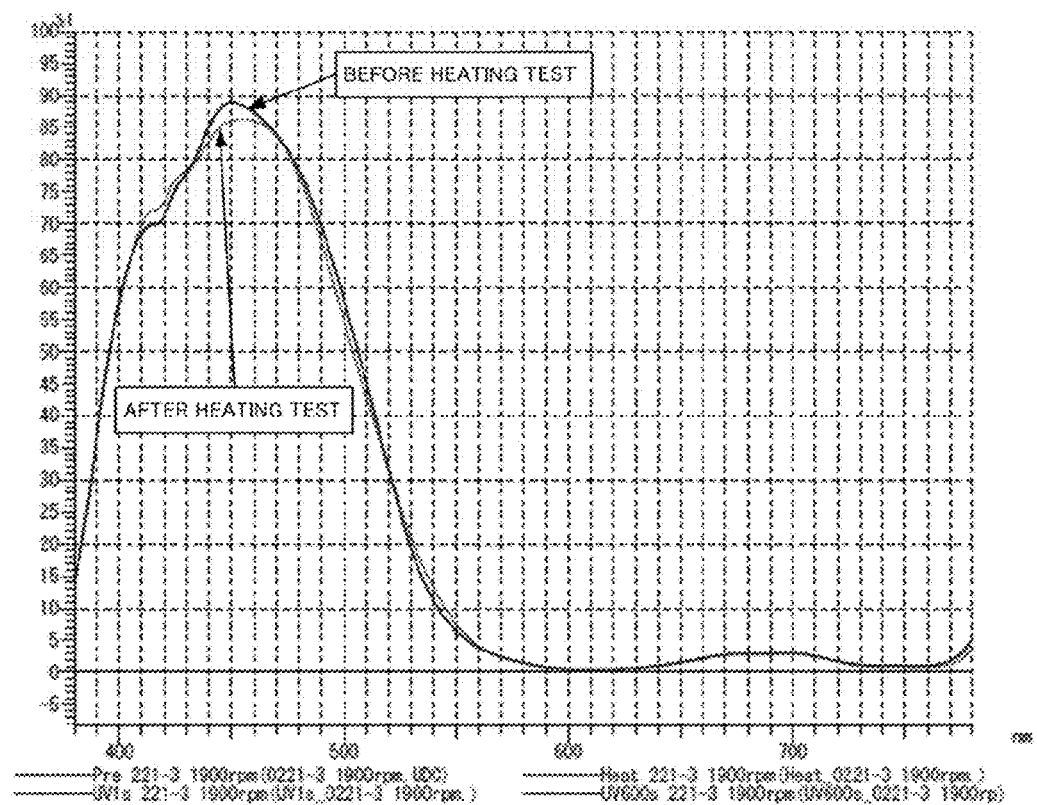
[Figure 6-1]

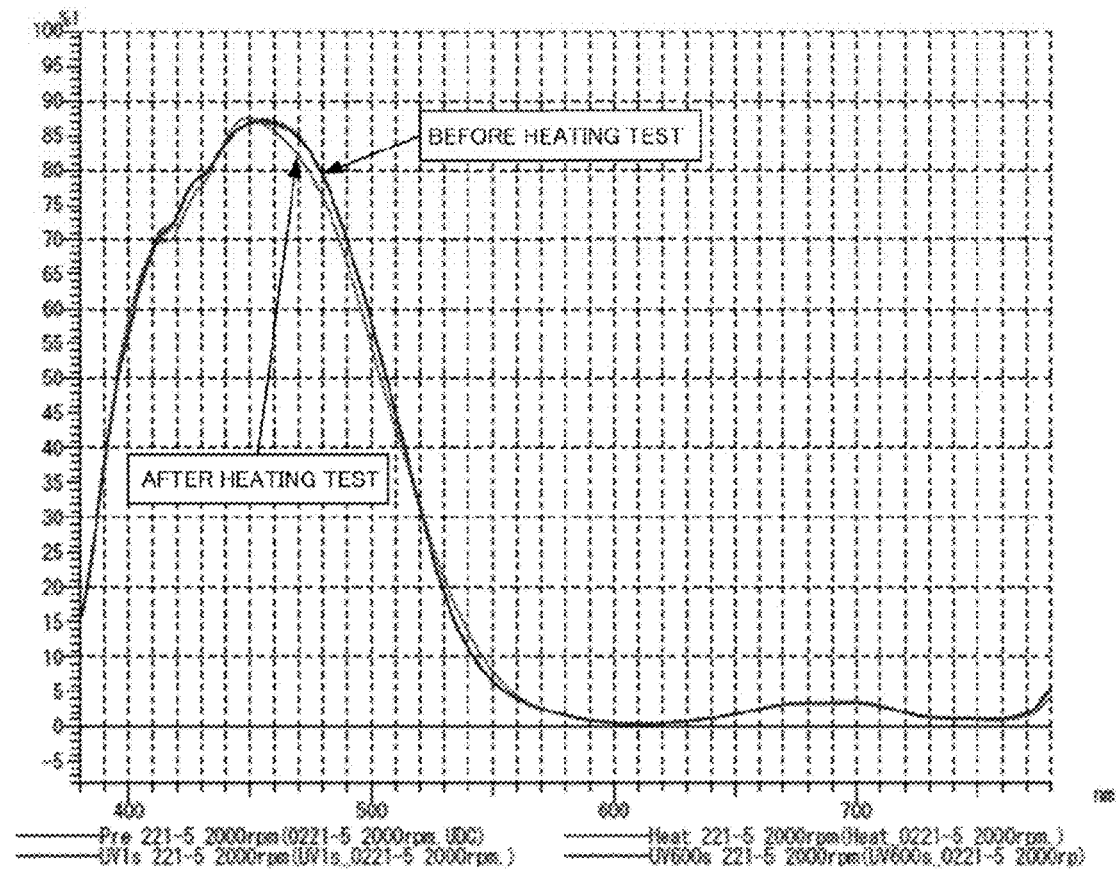
[Figure 6-2]

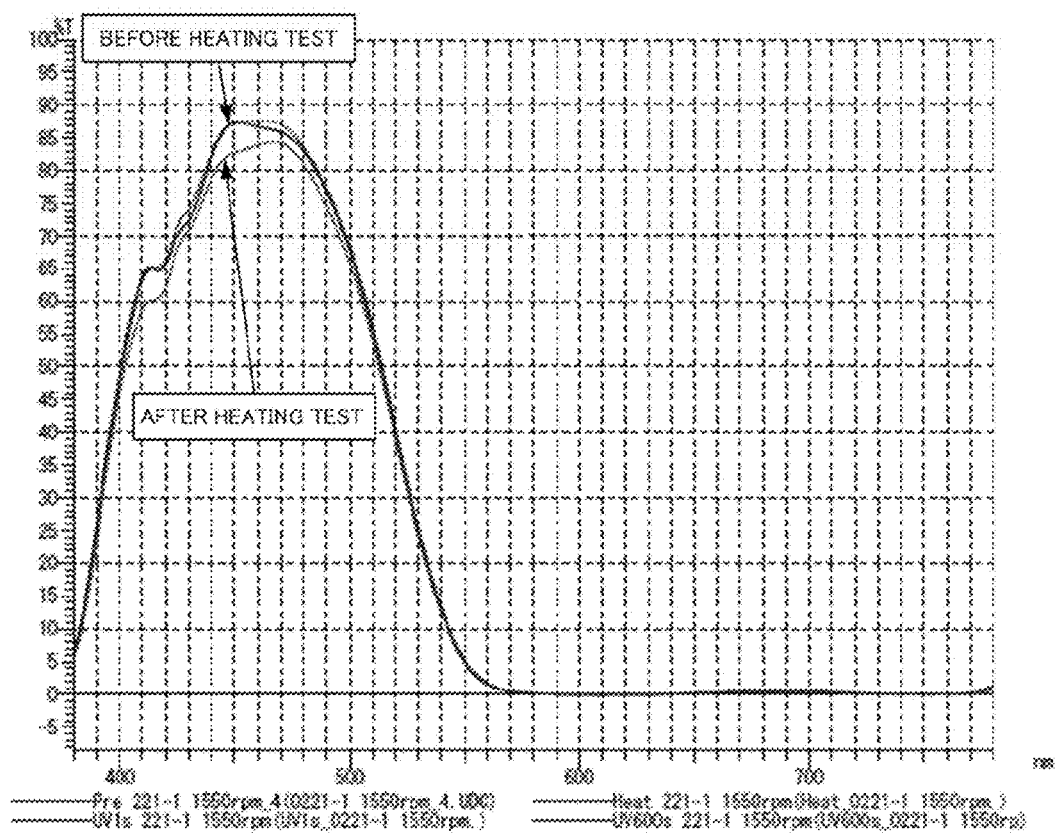
[Figure 6-3]

[Figure 7]
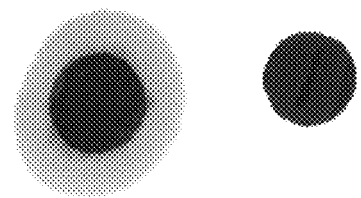
[Figure 8]
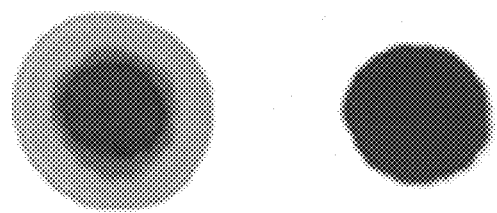

A-B BLOCK CO-POLYMER, A-B BLOCK CO-POLYMER PRODUCTION METHOD, RESIN TREATMENT PIGMENT COMPOSITION, RESIN TREATMENT PIGMENT COMPOSITION PRODUCTION METHOD, PIGMENT DISPERSION, AND PIGMENT DISPERSION SOLUTION

TECHNICAL FIELD

The present invention relates to a novel A-B block copolymer (hereinafter also referred to as "coloring matter block copolymer" or "coloring matter polymer") in which a coloring matter skeleton is incorporated into either one of the polymer blocks and a production process thereof, a resin-treated pigment composition in which a pigment is treated with the coloring matter block copolymer and a production process thereof, and a pigment dispersion and a pigment dispersion liquid each being useful as a novel coloring agent.

Particularly, the resin-treated pigment composition in which a pigment is treated with the coloring matter polymer according to the present invention and a dispersion thereof, or a pigment dispersion in which a pigment is dispersed with the coloring matter copolymer can expand a hue range and improve performances such as color density, color developability, and transparency more than the conventional pigments, and the properties which are required for a coloring agent that utilizes a pigment, such as dispersibility, dispersion stability, re-dissolvability, and alkali-solubility, are more excellent to an extent that has never conventionally been achieved. Therefore, utilization of the resin-treated pigment composition and the dispersion thereof, and the pigment dispersion in a wide range of areas can be expected.

BACKGROUND ART

In recent years, micronization of pigments for use as coloring agents has been advanced for the purpose of imparting a high color developability, a high transparency, and a high brightness which are required for color filters, and the particles of the pigments used for color filters have become considerably fine. The characteristics of the pigments are about to reach their limit because the pigment particles have become extremely fine. Therefore, hybrid pigment dispersion liquids containing a dye that exhibits a high color developability and a high transparency together with a pigment have been developed. On the other hand, using a dye together with a pigment has been conducted in inkjet inks for the purpose of expanding a color reproduction range.

However, in the case where the hybrid pigment dispersion liquid is used for a color filter, the dye is inferior in heat resistance because it exists as a molecule, and therefore there is a risk that dye molecule volatilizes due to heat during filter formation. Moreover, as for the oil-based coloring agents for color filters, a water-soluble dye is insolubilized to prepare a salt to make the water-soluble dye usable for oil-based media, and the salt is dissolved and used in a solvent. Furthermore, there are proposals on using a dye as a hybrid with a pigment by introducing the dye into a polymer skeleton for the purpose of improving the heat resistance (Patent Literatures 1 and 2).

Also in inkjet inks, when a dye is used together with a pigment, the desired color developability may not be obtained because the dye selectively penetrates into paper. Particularly in aqueous inkjet inks, water-soluble dyes are used, and therefore the inks are inferior in water resistance even after drying and printed images may be blurred when wetted with water. Thus, a method in which a dye is introduced into a polymer skeleton to improve water resistance or to use the polymer as a dispersant is adopted (Patent Literature 3).

CITATION LIST

Patent Literature

Patent Literature 1: Japanese Patent No. 4492760
Patent Literature 2: Japanese Patent Laid-Open No. 2012-184342
Patent Literature 3: International Publication No. WO 2007089859

SUMMARY OF INVENTION

Technical Problem

However, according to studies conducted by the present inventors, in the conventional technique in which a dye is introduced into a polymer skeleton to use the dye together with a pigment, the problems as described below may occur in addition to the problem that occurs when the dyes are used as they are. That is to say, polymers into which a dye is introduced may have a problem in color developability or the like because the dye only functions as a coloring agent and the amount of the dye to be introduced is limited, or may have a problem in solubility of the polymers themselves. Moreover, pigment dispersion liquids using a polymer into which a dye is introduced have a problem that an additional pigment dispersant for dispersing a pigment becomes necessary.

Accordingly, by utilizing an organic coloring matter such as a dye, the present invention intends to provide a pigment dispersion and a pigment dispersion liquid: that can expand a hue range and can improve performances such as color density, color developability, and transparency more than the conventional pigments; that have excellent properties which are required for a coloring agent that utilizes a pigment, such as dispersibility, dispersion stability, re-dissolvability, and alkali-solubility; and that are suitable as coloring agents for color filters or for inkjet.

Solution to Problem

Under the present circumstances as described above, the present inventors have conducted diligent studies and have solved the problems of the conventional techniques by developing: a novel A-B block copolymer in which a dye skeleton is incorporated; a resin-treated pigment composition in which a pigment is treated particularly with the coloring matter block copolymer; a pigment dispersion in which the composition is dispersed; and a pigment dispersion in which a pigment is dispersed with the coloring matter block copolymer. The present inventors have achieved the present invention by finding that these pigment dispersions are particularly suitable as coloring agents for color filters or for inkjet, can improve hue and heat resistance, can be dispersed in media as they are, and have an extremely excellent dispersibility of pigments in media.

That is to say, the present invention provides the invention described below. First of all, the present invention provides a novel A-B block copolymer as described below.

(1) An A-B block copolymer 90% by mass or more of which is constituted by a methacrylate-based monomer or methacrylate-based monomers, wherein: a polymer block A has at least a carboxy group-containing methacrylate as a constituent (excluding a case wherein the polymer block A has an amino group- or quaternary ammonium salt group-containing methacrylate as a constituent); and a polymer block B having an ionic bond moiety represented by formula (1) as a constitutional unit, the ionic bond moiety containing: a methacrylate; and an organic coloring matter having one or more sulfonate ions each being bonded thereto and each being a counter ion of a nitrogen cation in a quaternary ammonium.

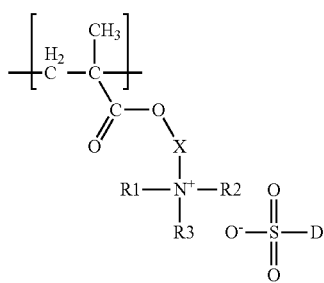

Formula (1)

[in formula (1), X represents an organic group, R1 to R3 each independently represent any one selected from the group consisting of C1 to C18 alkyl groups and a benzyl group, and D represents an organic coloring matter.]

Preferred embodiments of the A-B block copolymer include the following embodiments.

(2) The moiety represented by formula (1) is contained in a range from 5 to 40% by mass in the A-B block copolymer and in a range from 20 to 80% by mass in the polymer block (B).

(3) The ionic bond moiety being contained in the polymer block B and having an organic matter having one or more sulfonate ions each being bonded thereto is formed by subjecting: an A-C block copolymer having the polymer block A and a polymer block C having a quaternary ammonium methacrylate represented by formula (2) as a constituent; and the organic coloring matter having at least one structural moiety selected from the group consisting of sulfonic acids, alkali metal sulfonates, ammonium sulfonates, and amine sulfonates within a molecule thereof, to any one of a reaction to detach counter ions as a hydrogen halide, a reaction to detach counter ions as an alkali metal halide, a reaction to detach counter ions as a halogenated ammonium salt, and a reaction to detach counter ions as a halogenated amine salt.

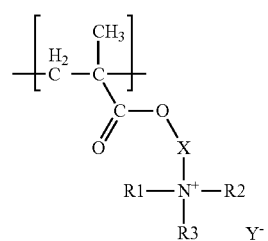

Formula (2)

[in formula (2), X represents an organic group, R1 to R3 each independently represent any one selected from the group consisting of C1 to C18 alkyl groups and a benzyl group, and Y⁻ represents a halogen ion.]

(4) The polymer block A has a number average molecular weight of 3000 to 20000 in terms of polystyrene in gel permeation chromatography, a degree of dispersion (weight average molecular weight/number average molecular weight) showing a molecular weight distribution of 1.5 or less, and an acid value of 30 to 250 mgKOH/g.

(5) The A-B block copolymer is obtained by utilizing living radical polymerization using a polymerization initiation compound.

(6) In the living radical polymerization, the total number of moles of a monomer or monomers for forming the polymer block B is 10 to 150 mol relative to 1 mol of the polymerization initiation compound.

The present invention provides as another embodiment (7) a process for producing the A-B block copolymer according to any one of (1) to (6), the process including a step of conducting living radical polymerization in the presence of at least a polymerization initiation compound and a catalyst, wherein: the polymerization initiation compound for use in the step is at least any one of iodine and iodine compounds; the catalyst for use in the step is at least one compound selected from the group consisting of phosphorus halides, phosphite-based compounds, phosphinate-based compounds, imide-based compounds, phenol-based compounds, diphenylmethane-based compounds, and cyclopentadiene-based compounds; and a polymerization temperature is 30 to 50° C.

The present invention provides as another embodiment (8) a resin-treated pigment composition obtained by treating a pigment with the A-B block copolymer according to any one of (1) to (6), wherein the pigment is treated within a range from 10 to 200 parts of the A-B block copolymer relative to 100 parts of the pigment.

Further, the present invention provides as another embodiment the invention that is described below and that relates to a process for producing the resin-treated pigment composition.

(9) A process for producing the resin-treated pigment composition according to (8), the process including subjecting an organic matter having at least one structural moiety selected from the group consisting of sulfonic acids, alkali metal sulfonates, ammonium sulfonates, and amine sulfonates within a molecule thereof and an A-C block copolymer having: a polymer block A having at least a carboxy group-containing methacrylate as a constituent (excluding a case wherein the polymer block A has an amino group- or quaternary ammonium salt group-containing methacrylate as a constituent); and a polymer block C has a quaternary ammonium methacrylate represented by formula (2) as a constituent to any one of a reaction to detach counter ions as a hydrogen halide, a reaction to detach counter ions as an alkali metal halide, a reaction to detach counter ions as a halogenated ammonium salt, and a reaction to detach counter ions as a halogenated amine salt in the presence of a pigment in an aqueous medium, thereby turning the pigment into a pigment treated with an A-B block copolymer having: the polymer block A; and a polymer block B having an ionic bond moiety represented by formula (1) as a constitutional unit, the ionic bond moiety containing: a methacrylate; and an organic coloring matter having one or more sulfonate ions each being bonded thereto and each being a counter ion of a nitrogen cation in a quaternary ammonium.

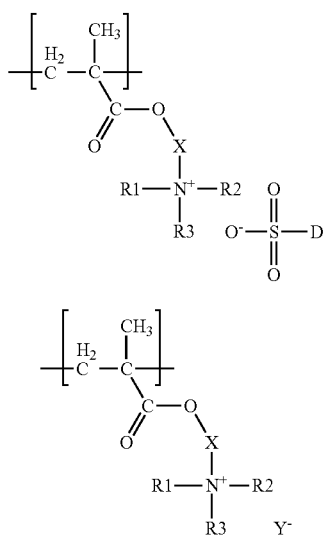

Formula (1)

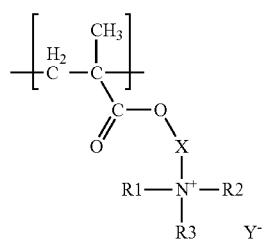

Formula (2)

[X in formula (1) and formula (2) represents an organic group, R1 to R3 in formula (1) and formula (2) each independently represent any one selected from the group consisting of C1 to C18 alkyl groups and a benzyl group. D in formula (1) represents an organic coloring matter, and $Y^-$ in formula (2) represents a halogen ion.]

Further, the preferred embodiments of the production process include

(10) the process including subjecting the organic coloring matter and the A-C block copolymer to any one of the reactions in an aqueous solvent containing a pigment dispersed therein with a sulfonate group-containing surface active agent, thereby turning the pigment into a pigment treated with the A-B block copolymer.

The present invention provides as another embodiment the invention given below.

(11) A pigment dispersion obtained by dispersing the resin-treated pigment composition according to (8), or a pigment dispersion obtained by dispersing a resin-treated pigment composition that is obtained by the process for producing the resin-treated pigment composition according to (9) or (10).

(12) A pigment dispersion containing at least: a pigment; and a pigment dispersant, wherein the pigment dispersant is the A-B block copolymer according to any one of (1) to (6).

(13) A pigment dispersion liquid obtained by dispersing the pigment dispersion according to (11) or (12) in at least one dispersion medium selected from the group consisting of water, organic solvents, and polymerizable monomers.

Advantageous Effects of Invention

According to the present invention described above, a resin-treated pigment composition (hereinafter, referred to as resin-treated pigment) in which a pigment is treated with a novel coloring matter block copolymer according to the present invention in which an organic coloring matter skeleton such as a dye is incorporated into either one of the polymer blocks, or a pigment dispersion obtained by dispersing a pigment with a novel coloring matter block copolymer has a color developability of a dye while containing a pigment as the main coloring material. Therefore, these are effective as a coloring agent for various applications. For example, in the case where these are used as an aqueous coloring agent, particularly as a coloring agent for inkjet inks, expansion of a hue range or improvement of transparency or gloss in formed images can be expected. Moreover, in the case where these are used as an oil-based coloring agent, particularly as a coloring agent for color filters, imparting of a high contrast characteristic, a high transparency, and a high heat resistance can be expected. Furthermore, as for a pigment that is treated or dispersed with the coloring matter block copolymer according to the present invention, the dispersibility and storage stability of the pigment are also improved as well as the performance as a coloring agent. That is to say, the dispersibility and storage stability of the pigment are improved because the polymer block A (hereinafter, also referred to as block A) in the coloring matter block copolymer according to the present invention is affinitive to the dispersion medium, compatible with the dispersion medium, and dissolves in the dispersion medium to cause steric repulsion, thereby improving the dispersibility of the pigment. At the same time, the polymer block B (hereinafter, also referred to as block B) is strongly adsorbed to the pigment, and therefore the A-B block copolymer that functions as a dispersant is never detached from the pigment, resulting in improvements of the dispersibility and storage stability of the pigment.

Moreover, the resin-treated pigment provided by the present invention can be dispersed finely in a fine particle form by only adding it to at least a dispersion medium and dispersing the resultant mixture. In the case where the resin-treated pigment is used in an aqueous inkjet ink, the block A has a large number of carboxy groups, is water-solubilized by being neutralized with an alkali, and therefore can impart the re-dispersibility which is necessary when an ink is dried at an ejection head and by which a pigment is easily dispersed by another liquid medium. In addition to the re-dispersibility, in the A-B block copolymer according to the present invention, the block A dissolves in water; however, the block B does not dissolve in water, and therefore the coloring matter block copolymer forms a particle of the block A in water and substantially does not dissolve in water. That is to say, since there is not a polymer that dissolves in a liquid medium, the aqueous inkjet ink becomes useful in that the change in viscosity does not occur and the ejection stability is excellent.

Furthermore, in the case where the resin-treated pigment in which a pigment is treated with the coloring matter block copolymer that is provided by the present invention is used as a coloring agent for a color filter, since the block A has a carboxy group, the polymer block A easily dissolves by an alkali in an aqueous alkaline solution during alkali development, and therefore the color filter is useful in that it exhibits excellent performance of shortening the developing time and of making the pixels sharp.

BRIEF DESCRIPTION OF DRAWINGS

FIG. 1 shows an IR chart of an A-B block copolymer obtained from A-C block copolymer-1 and Acid Red-289 in Example 1.

FIG. 2 shows an IR chart of an A-B block copolymer obtained from A-C block copolymer-2 and Direct Blue-86 in Example 5.

FIG. 3 shows an IR chart of an A-B block copolymer obtained from A-C block copolymer-3 and Direct Yellow-142 in Example 6.

FIG. 4 shows spots on filter paper when treated blue pigment-1 of Example 7 was obtained.

FIG. 5 shows spectra of coating films in Application Examples 8 and 9, and Comparative Application Example 5.

FIG. 6-1 shows a spectrum data of a heat resistance test in Application Example 8.

FIG. 6-2 shows a spectrum data of a heat resistance test in Application Example 9.

FIG. 6-3 shows a spectrum data of a heat resistance test in Comparative Application Example 5.

FIG. 7 shows spots on filter paper when treated cyan pigment-1 of Example 14 was obtained.

FIG. 8 shows spots on filter paper when treated magenta pigment-1 of Example 15 was obtained.

DESCRIPTION OF EMBODIMENTS

Hereinafter, the present invention will be described in more detail giving preferred embodiments for carrying out the present invention.

The coloring matter block copolymer according to the present invention is an A-B block copolymer having a structure in which one polymer block (hereinafter, referred to as block A) has a carboxy group, and an organic coloring matter skeleton is incorporated in the other polymer block (hereinafter, referred to as block B) through anionic bond. Because of the above-described structure, the block A has a characteristic of being compatible with dispersion media, and the other block B has a coloring matter skeleton and exhibits color. When a pigment is treated with the coloring matter polymer according to the present invention having such a structure as described above, the block B acts on the pigment such that the block B is adsorbed to the pigment, covers the pigment, precipitates on the pigment, and encapsulate the pigment. As a result, the pigment can easily be dispersed and has a high dispersibility and a high storage stability because, in the resin-treated pigment, the block A dissolves in the dispersion medium and makes a compatible state with the dispersion medium, and the block B acts on the pigment such that the block B is adsorbed to the pigment.

Moreover, when a pigment is treated with the coloring matter block copolymer according to the present invention, the organic coloring matter skeleton incorporated in the block B functions to be strongly adsorbed to the pigment, thereby further functioning to improve the dispersibility and storage stability. Further, the coloring matter block copolymer is a novel coloring agent having color developability coming from a pigment alone, and besides, color developability of an organic coloring matter such as a dye that constitutes part of the coloring matter block copolymer. That is to say, by adding the hue of the organic coloring matter to the hue of the pigment, the hue range of formed images is expanded in the case where the coloring agent is used in an inkjet ink, and the transparency and contrast of the formed pixels are improved in the case where the coloring agent is used as a coloring agent for a color filter. Furthermore, the coloring agent provided by the present invention has an ionic component within the structure thereof and therefore can make the heat resistance satisfactory.

Moreover, the A-B block copolymer according to the present invention having a structure in which a coloring matter is ionically bonded to the block B can easily be obtained from the coloring matter block copolymer according to the present invention by only mixing an existing, conventionally known, sulfonate group-containing coloring matter with an A-C block copolymer having: a carboxy group-containing polymer block A; and a polymer block C (hereinafter, also referred to as block C) having a quaternary ammonium salt, followed by desalting and ion exchange.

As described above, in the production of the coloring matter block copolymer according to the present invention, an existing, conventionally known, sulfonate group-containing coloring matter can be used, and therefore it is not particularly necessary to introduce a functional group into the coloring matter, or design and develop a coloring matter molecule having a novel structure for the purpose of obtaining the coloring matter block copolymer according to the present invention. This is also an extremely major characteristic in industrial production.

Moreover, since the block A in the coloring matter block copolymer according to the present invention has a carboxy group, the block A dissolves in water by neutralizing the carboxy group with an alkali, and thereby a pigment treated with the coloring matter block copolymer according to the present invention can be dispersed in water. Besides, in the case where the block A is neutralized with an alkali, when the coloring matter block copolymer is used, for example, as a coloring agent for inkjet, the neutralized block A exhibits water-solubility because the block A is neutralized with an alkali, and therefore the pigment is easily re-dispersed in an aqueous liquid medium and clogging of the head can be prevented.

Further, the block A has a carboxy group and dissolves also in an organic solvent, and therefore the coloring matter block copolymer according to the present invention can be used also as an oil-based coloring agent. Examples of the oil-based coloring agent include coloring agents for color filters, and also in this case, the coloring matter block copolymer exhibits satisfactory dispersibility and storage stability as described previously. Further, in addition to these performances, the block A that constitutes the coloring matter block copolymer according to the present invention is neutralized with an alkali and dissolves in water in alkali development when a color filter is produced, and therefore alkali-developability is satisfactory, the developing time can be shortened, and sharp edges in pixels can be obtained.

Furthermore, the coloring matter block copolymer according to the present invention is a polymer having an organic coloring matter skeleton incorporated in a part thereof through an ionic bond. Therefore, the coloring matter copolymer according to the present invention does not have a scattering property, which is different from a dye as it is, and the coloring matter therein does not volatilize by heat, and bleed out by which a dye comes out at the surface of a coating film or the like does not occur.

As a method for obtaining the A-B block copolymer according to the present invention or the A-C block copolymer as an intermediate of the A-B block copolymer, living radical polymerization is suitable. There are various methods as described below in living radical polymerization; however, in the present invention, it is preferable to utilize the living radical polymerization using a polymerization initiation compound described later from the reasons described below. For example, there are methods such as an NMP method in which a nitroxide is used, an atom transfer radical polymerization method in which a halide and a metal complex such as copper or ruthenium are utilized, and reversible addition fragmentation chain transfer polymerization in which a sulfur compound such as dithiocarbamate, a dithiocarboxylic acid ester, or a xanthate compound is used. However, each method has a problem. Specifically, there are problem as follows. The NMP method requires a high temperature, and therefore living polymerization of methacrylate-based monomers cannot be conducted favorably. The atom transfer radical polymerization uses the metal complex, the metal complex contains an amine compound as a ligand, and therefore carboxy group-containing monomers cannot be polymerized as they are. The reversible addition fragmentation chain transfer polymerization uses a sulfur compound, and therefore there is a problem of odor or the like.

From the reasons described above, as a process for producing the block copolymer for use in the present invention, it is preferable to apply the living radical polymerization in which, in conventional radical polymerization, an iodine compound is used as a polymerization initiation compound and, as necessary, a phosphorus atom-, nitrogen atom-, oxygen atom-, or carbon atom-containing organic compound that is active as a catalyst is used. As a result, a block copolymer that has a narrow molecular weight distribution (PDI=weight average molecular weight/number average molecular weight, hereinafter sometimes referred to as PDI), and that has never been obtained by conventional radical polymerization can easily be obtained. That is to say, a block copolymer having a uniform molecular weight can be obtained. Thus, a narrow molecular weight distribution and formation of a blocked structure can be achieved, and therefore the living radical polymerization method is most suitable for the production of the block copolymer for use in the present invention because the block copolymer obtained can be separated into a structure of a carboxy group-containing polymer block and a structure of a polymer block having a coloring matter skeleton such that mixing of a polymer molecule that easily dissolves in a liquid medium and a polymer molecule that is hard to dissolve in the liquid medium does not occur, the characteristics of respective structures are uniform and clearly different from each other. Hereinafter, the constitution of the coloring matter block copolymer according to the present invention will be described in detail.

[A-B Block Copolymer (Coloring Matter Block Copolymer)]

Ninety percent by mass or more of the coloring matter block copolymer according to the present invention is constituted by a methacrylate-based monomer or methacrylate-based monomers, in which the block A has at least a carboxy group-containing methacrylate as a constituent (excluding a case wherein the polymer block A has an amino group- or quaternary ammonium salt group-containing methacrylate as a constituent); and the block B has an ionic bond moiety (hereinafter, sometimes written as "coloring matter-containing methacrylate" or "coloring matter monomer unit") represented by formula (1) described below as a constitutional unit, the ionic bond moiety containing: a methacrylate; and an organic coloring matter having one or more sulfonate ions each being bonded thereto and each being a counter ion of a nitrogen cation in a quaternary ammonium.

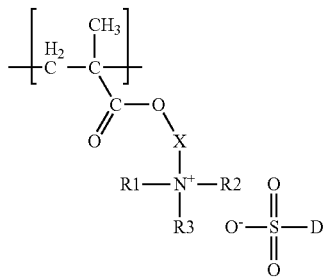

Formula (1)

[in formula (1), X represents an organic group, R1 to R3 each independently represent any one selected from the group consisting of C1 to C18 alkyl groups and a benzyl group, and D represents an organic coloring matter.]

It is required that the coloring matter block copolymer according to the present invention contain a constitutional unit derived from a methacrylate-based monomer in an amount of 90% by mass or more, preferably 95% by mass or more, and more preferably 100% by mass. As will be described later, in the suitable process (polymerization method) for producing the coloring matter block copolymer according to the present invention, it is particularly preferable to use a methacrylate-based monomer as a monomer. On the other hand, in the production process described later, it is not preferable to use a vinyl-based monomer such as styrene, an acrylate-based monomer, a vinyl ether-based monomer, or the like because iodine that has been bonded to a polymerization terminal is stabilized more than necessary and there is a risk that trouble occurs such that raising temperature is needed to dissociate the iodine or that the iodine is not dissociated. Therefore, in the case where a large amount of a monomer other than the methacrylate-based monomer is used, there is a possibility that trouble occurs such that a particular structure intended in the present invention is not obtained or the molecular weight distribution broadens. However, even though a monomer is other than the methacrylate-based monomer, the monomer may be used within a range that does not impair the object of the present invention.

[Polymer Block A (Block A)]

The block A that constitutes the coloring matter block copolymer according to the present invention uses at least a carboxy group-containing methacrylate as a methacrylate-based monomer being a component for forming the block A. Therefore, the block A contains a constitutional unit derived from the carboxy group-containing methacrylate-based monomer as listed below within the structure thereof. The block A into which a carboxy group is introduced is ionized to dissolve in water when neutralized with an alkali. Therefore, the coloring matter block copolymer according to the present invention can suitably be used for alkali development in a production process of a color filter, and when the block A dissolves in water, the coloring matter block copolymer according to the present invention can take a dispersed form in aqueous dispersion.

Specific examples of the carboxy group-containing methacrylate-based monomer that can suitably be used for forming the block A include the following monomers. Examples thereof include: methacrylic acid; half ester type methacrylates of poly-carboxy compounds such as dibasic acids and trimellitic acid, the half ester type methacrylates obtained by reacting a hydroxy group-containing methacrylate such as 2-hydroxyethyl methacrylate or 2-hydroxypropyl methacrylate with a dibasic acid such as phthalic acid, cyclohexane dicarboxylic acid, maleic acid, succinic acid, or an acid anhydride or acid chloride thereof; epoxy ester type methacrylates obtained by reacting glycidyl methacrylate with a dibasic acid as described above; and epoxy ester type methacrylates obtained by reacting a hydroxy group with a dibasic acid as described above, the hydroxy group obtained by reacting a glycidyl group of glycidyl methacrylate with a compound having one carboxy group such as acetic acid or lauric acid. Further, in the process of preparing the coloring matter block copolymer according to the present invention, a block copolymer is obtained by polymerizing at least glycidyl methacrylate as a constituent for block A, not using a carboxy group-containing methacrylate as a constituent, and thereafter a carboxy group is produced by reacting a hydroxy group with a dibasic acid as described above, the hydroxy group obtained by reacting the glycidyl group in the block copolymer with a carboxy group-containing compound such as, for example, acetic acid, acrylic acid, or methacrylic acid, or a carboxy group is produced by reacting the glycidyl group in the block copolymer with a dibasic acid having 2 or more carboxylic groups among the above-described dibasic acids. Thereby, an A-B block copolymer having a block A that is similar to that formed with a carboxy group-containing methacrylate as listed above can also be prepared, and such an embodiment is included in the present invention.

As a monomer component that is used for forming the block A and that is other than the above-described monomers, a conventionally known monomer can be used and is not particularly limited. Examples thereof include: (cyclo) alkyl methacrylates such as methyl methacrylate, ethyl methacrylate, propyl methacrylate, isopropyl methacrylate, butyl methacrylate, 2-methylpropane methacrylate, t-butyl methacrylate, pentyl methacrylate, hexyl methacrylate, octyl methacrylate, 2-ethylhexyl methacrylate, nonyl methacrylate, decyl methacrylate, isodecyl methacrylate, lauryl methacrylate, tetradecyl methacrylate, octadecyl methacrylate, behenyl methacrylate, isostearyl methacrylate, cyclohexyl methacrylate, t-butylcyclohexyl methacrylate, isobornyl methacrylate, trimethylcyclohexyl methacrylate, cyclodecyl methacrylate, cyclodecylmethyl methacrylate, tricyclodecyl methacrylate, and benzyl methacrylate; aryl methacrylates such as phenyl methacrylate and naphthyl methacrylate; alkenyl methacrylates such as allyl methacrylate; and glycol monoalkyl ether-based methacrylates such as (poly)ethylene glycol monomethyl ether methacrylates, (poly)ethylene glycol monoethyl ether methacrylates, (poly)ethylene glycol monolauryl ether methacrylates, and (poly)propylene glycol monomethyl ether methacrylates;

isocyanate group-containing methacrylates obtained by blocking an isocyanate group of (meth)acryloyloxyethyl isocyanate or 2-(2-isocyanatoethoxy)ethyl methacrylate with ε-caprolactone, methyl ethyl ketone oxime (MEK oxime), pyrazole, or the like; cyclic methacrylates such as tetrahydrofurfuryl methacrylate; halogen atom-containing methacrylates such as octafluorooctyl methacrylate and tetrafluoroethyl methacrylate; ultraviolet ray absorbing methacrylates such as 2-(4-benzoxy-3-hydroxyphenoxy)ethyl methacrylate, and 2-(2'-hydroxy-5-methacryloyloxyethylphenyl)-2H-benzotriazole; and silicon atom-containing methacrylates such as methacrylates having a trimethoxysilyl group or having a dimethyl silicone chain. Moreover, a macromonomer or the like obtained by introducing a (meth) acrylic group into one terminal of an oligomer obtained by polymerizing a monomer as described above can be used.

However, as specified in the present invention, an amino group- or quaternary ammonium salt group-containing methacrylate must not be used as a methacrylate-based monomer for forming the block A that constitutes the coloring matter block copolymer according to the present invention. In the present invention, the amino group- or quaternary ammonium salt group-containing methacrylate is only introduced as a constituent of the block B. The reason is that when the amino group- or quaternary ammonium salt group-containing methacrylate is used as a constituent of the block A, both the block A and the block B are adsorbed to a pigment during pigment dispersion and the pigment cannot stably be dispersed.

It is preferable that the acid value of the block A that constitutes the coloring matter block copolymer according to the present invention is 30 to 250 mgKOH/g. Further, the acid value is more preferably 50 to 200 mgKOH/g. When the acid value of the block A is within the above-described numerical value range, the block A can be used, for example, as a component suitable for alkali development in a production process of a color filter, and dissolves in water by being neutralized with an alkali, making it possible to disperse pigments in water. To the contrary, it is not preferable that the acid value of the block A is less than 30 mgKOH/g because the block A does not dissolve or the rate of dissolution is slow even when the block A is neutralized with an alkali. On the other hand, it is not preferable that the acid value of the block A exceeds 250 mgKOH/g because, in alkali development, even the hydrophilicity of the exposed-and-cured portion is enhanced to lower the water resistance and therefore there is a risk that pixels to be formed become disordered and that water resistance may be poor.

It is preferable that the block A in the coloring matter block copolymer according to the present invention has a number average molecular weight (hereinafter, sometimes written as Mn) of 3000 to 20000 in terms of polystyrene in gel permeation chromatography. Further, the block A more preferably has a number average molecular weight of 4000 to 15000. It is not preferable that the number average molecular weight of the block A is less than 3000 because there is a risk that steric repulsion of the block A does not act, resulting in lack of stability, and there is also a risk that since the block A is a solvent-soluble polymer block, solubility or compatibility becomes poor when the molecular weight is excessively small. On the other hand, it is not preferable that the number average molecular weight of the block A exceeds 20000 because moieties which dissolve in or are compatible with a dispersion medium increase in number and there is a risk that the viscosity excessively increases or developability is lowered.

It is preferable that the block A in the coloring matter block copolymer according to the present invention has a molecular weight distribution (PDI) of 1.5 or less, and more preferably 1.4 or less. According to the process for producing the coloring matter block copolymer of the present invention, which will be described later, the A-B block copolymer having a narrow molecular weight distribution as described above can be produced appropriately as designed. It is not preferable that the PDI of the block A exceeds 1.5 because the block A ends up containing components having a number average molecular weight of less than 3000 or components having a number average molecular weight of exceeding 20000 in a large amount and therefore there is a risk that the stability is lowered, the developability to alkali development is lowered, or the viscosity excessively increases. In the present invention, the number average molecular weight (Mn) and the molecular weight distribution (PDI) are measured by gel permeation chromatography (hereinafter, abbreviated as GPC) using polystyrene as a standard substance. This concludes the description of the constitution of the polymer block A in the A-B block copolymer according to the present invention.

[Polymer Block B (Block B)]

Hereinafter, the block B that constitutes the coloring matter block copolymer according to the present invention will be described. The block B has at least a moiety represented by formula (1) described below as a constitutional unit. That is to say, the constitution of the block B has an ionic bond moiety containing: a methacrylate; and an organic coloring matter having one or more sulfonate ions each being bonded thereto and each being a counter ion of a nitrogen cation in a quaternary ammonium.

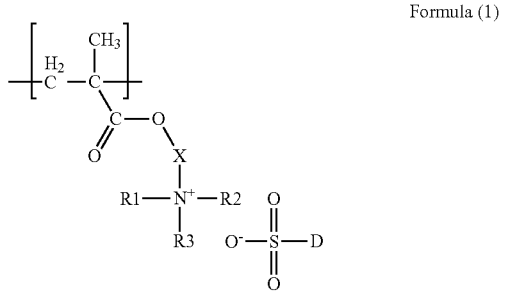

Formula (1)

[in formula (1), X represents an organic group, R1 to R3 each independently represent any one selected from the group consisting of C1 to C18 alkyl groups and a benzyl group, and D represents an organic coloring matter.]

In formula (1), X is an arbitrary organic group. Examples thereof include: divalent alkylene groups, alkenylene groups, and alkinylene groups each having a number of carbon atoms of 1 to 18; organic groups in which one or more hydroxy groups, ester groups, urethane groups, ether groups, or the like are introduced in the alkylene group, alkenylene group, or alkinylene group; and organic groups each being a polyalkylene (having a number of carbon atoms of 2 to 6) glycol chain, though not being particularly limited thereto. In formula (1), R1, R2, and R3 may be the same or different, and each may be an alkyl group having a number of carbon atoms of 1 to 18 (C1 to C18 alkyl group) or a benzyl group being a hydrocarbon-based or aromatic alkyl-based substituent that constitutes the quarternary ammonium salt.

In formula (1), D represents an organic coloring matter skeleton and the block B has in the structure thereof an ionic bond moiety in which one or more sulfonate ions each being bonded to the organic coloring matter and each being a counter ion of a nitrogen cation in a quaternary ammonium being bonded to the X. That is to say, in the present invention, the polymer block B has a structure having the coloring matter skeleton incorporated therein through an ionic bond. The ionic bond moiety to be a counter ion including the D can easily be constituted, for example, by a conventionally known sulfonate group-containing acid dye or the like. Examples of the sulfonate group-containing acid dye include: acid dyes having a xanthene structure such as Acid Red 52, Acid Red 92, Acid Red 289, and Acid Yellow 73; pyranine derivatives such as Solvent Green 7; and coumarin derivatives such as Acid Yellow 184, and any of the sulfonate group-containing acid dyes can be applicable to the present invention. The compound that constitutes the ionic bond moiety is not limited to these acid dyes, and examples thereof further include coloring matters such as oxazole derivatives, thiazole derivatives, imidazole derivatives, imidazolone derivatives, pyrazolone derivatives, benzidine derivatives, phthalocyanine derivatives, quinacridone derivatives, diketopyrrolopyrrole derivatives, azo-based dyes, disazo-based dyes, diaminostilbene disulfonic acid derivatives, various sulfonate group-containing dyes each having a color index number, and sulfonate group-containing dyes developed for inkjet. Hereinafter, such a dye as listed above is referred to as "sulfonate group-containing coloring matter".

As described above, the block B that constitutes the coloring matter block copolymer according to the present invention has in the structure thereof an ionic bond moiety that is formed with a methacrylate and that has an organic coloring matter skeleton D incorporated therein through an ionic bond. It is preferable that the content of the moiety (hereinafter, also referred to as coloring matter monomer unit) that constitutes the block B and that is represented by formula (1) is in a range from at least 5 to 40% by mass in the coloring matter block copolymer according to the present invention and in a range from 20 to 80% by mass in the polymer block B. That is to say, it is not preferable that the content of the coloring matter monomer unit in the coloring matter block copolymer is less than 5% by mass in the coloring matter block copolymer because the color developability of the coloring matter and adsorptivity to the pigments are hard to exhibit, and on the other hand, it is not preferable that the content exceeds 40% by mass because the characteristics of the coloring matter greatly affect the characteristics of the coloring matter block copolymer and the coloring matter block copolymer cannot be dissolved in a liquid medium. The content is more preferably from 10 to 30% by mass. Moreover, it is not preferable that the content of the coloring matter monomer unit in the block B is less than 20% because there is a risk that the adsorption to the pigments is weakened, the block B dissolves in a dispersion medium, and as a result, the required adsorption action may not be obtained or the intended color properties may not be obtained. On the other hand, it is not preferable that the content exceeds 80% by mass because the amount of the moiety having the coloring matter is excessively large which makes the block B have an extremely hard characteristic, and as a result, there is a possibility that aggregates may be generated when the block B is detached from the pigments. The content of the coloring matter monomer unit in the block B is more preferably from 30 to 70% by mass.

When the block B is formed, a monomer component other than the monomers that constitute the coloring matter monomer unit can be used as necessary. The monomer component other than the monomers that constitute the coloring matter monomer unit is not particularly limited, and any of the conventionally known monomers can be used as the monomer component. Specifically, one or more of the methacrylates as listed previously are used so that the content of the coloring matter monomer unit may fall in the above-described range. It is to be noted that when the block B that constitutes the present invention is formed, a carboxy group-containing methacrylate may be used as a constituent. As described previously, it must be avoided that the coloring matter-containing methacrylate be introduced into the block A; however, when the block B is formed, a carboxy group-containing methacrylate may be introduced into the block B to such an extent that water-solubility is not exhibited. With respect to the amount of the carboxy group-containing methacrylate used, it is preferable to use the carboxy group-containing methacrylate within a range from 0 to 5% by mass in the monomers for forming the block B. From the reason as described previously, it is clearly required anyway in the present invention that the coloring matter monomer unit formed with the coloring matter-containing methacrylate be introduced only into the block B.

[Preparation of A-B Block Copolymer]

The A-B block copolymer according to the present invention containing the constituents as described above may be prepared in such a way that the block A is formed, and thereafter the coloring matter-containing methacrylate represented by formula (1) is separately prepared and added to the block A to form the polymer block B. More preferably, the A-B block copolymer may be produced in such a way that the A-C block copolymer is prepared in the manner as described below, and thereafter the A-C block copolymer and a sulfonate group-containing coloring matter are reacted. The reason that the latter process is preferable is that there are shortcomings such as complexity and costs in the former production process such that the coloring matter-containing methacrylate has to be synthesized in advance, and that the number of steps is reduced when the A-C block copolymer is prepared and thereafter the sulfonate group-containing coloring matter is reacted with the A-C block copolymer.

(Preparation of A-C Block Copolymer)

The A-C block copolymer used for obtaining the A-B block copolymer according to the present invention is easily obtained from the block A and the block C that contains a methacrylate of a quaternary ammonium salt, the methacrylate represented by formula (2) described below.

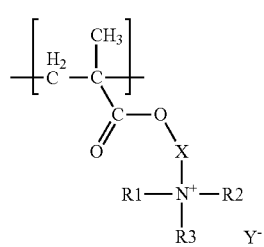

Formula (2)

[in formula (2), X represents an organic group, R1 to R3 each independently represent any one selected from the group consisting of C1 to C18 alkyl groups and a benzyl group, and Y$^-$ represents a halogen ion.]

The quaternary ammonium salt group-containing methacrylate represented by formula (2) is conventionally known, and X and R1 to R3 in formula (2) are the same as those described previously for formula (1). The Y— in formula (2) is a halogen ion that is a chlorine ion, bromine ion, or iodine ion, and at least one of the halogen ions is used.

Examples of the quaternary ammonium salt group-containing methacrylate-based monomer include conventionally known quaternary ammonium salt group-containing methacrylate-based monomers such as halide salts of a tertiary amino group. Specific examples thereof include quaternary ammonium salt group-containing methacrylates in which an amino group in 2-dimethylaminoethyl methacrylate, 2-diethylaminoethyl methacrylate, 2-dibutylaminoethyl methacrylate, 2-dicyclohexylaminoethyl methacrylate, or the like is quaternized with a conventionally known quaternary ammonium-forming material such as methyl chloride, methyl bromide, methyl iodide, benzyl chloride, or lauryl chloride. More specific examples thereof include benzyl dimethyl ammonium chloride ethyl methacrylate and trimethyl ammonium chloride ethyl methacrylate.

As for the introduction of the block C having a moiety formed with the quaternary ammonium salt-containing methacrylate in addition to the above described process, the block C may be formed in such a way that the block A is formed, and thereafter the quaternary ammonium salt group-containing methacrylate is polymerized, or the A-C block copolymer according to the present invention may be prepared in such a way that the block A is formed, thereafter an amino group-containing polymer block is prepared using a tertiary amino group-containing methacrylate-based monomer, and an organic halide is reacted with the amino group to produce a quaternary ammonium salt. Or a quaternary ammonium salt contained in the block C may be prepared in such a way that the block A is formed, thereafter a halogenated alkyl group-containing methacrylate is polymerized to form a polymer block, and thereafter an amine compound is reacted with the polymer block.

Examples of the halogenated alkyl group-containing methacrylate for use in the polymerization described above include 2-chloroethyl methacrylate, 2-bromo-propyl methacrylate, and 1-chloro-2-hydroxypropyl methacrylate, though not being limited thereto. Moreover, examples of the amine compound for use in the reaction described above include trimethylamine, triethylamine, dimethylbenzylamine, and dimethyllaurylamine, though not being limited thereto. Moreover, any of conventionally known processes for the reaction can be used. The amount of the amine compound used is adjusted so that the content of the coloring matter-bonded monomer contained in the block B in the A-B block copolymer according to the present invention may fall within the range as specified in the present invention.

In the A-C block copolymer for use in the present invention, the block A is water-insoluble when the carboxy group is not neutralized although that depends on the monomer composition; however, since the block C contains a quaternary ammonium salt, the block A forms a fine particle, the block C dissolves in water because of high affinity to water when the A-C block copolymer is added to water, and as a result, the A-C block copolymer is finely dispersed and emulsified in a fine particle form.

By exchanging salts between the sulfonate group-containing coloring matter and a quaternary ammonium salt using the A-C block copolymer as described above, the moiety (coloring matter monomer unit) represented by formula (1) is introduced, and thus the A-B block copolymer can be prepared. The coloring matter for use in the salt exchange is as described previously, and the coloring matter may have one or more sulfonate groups. For example, the coloring matter in which the sulfonate group is bonded thereto as sulfonic acid, an alkali metal sulfonate, an ammonium sulfonate, or an amine sulfonate is used. When such a coloring matter is reacted with the A-C block copolymer, any one of a reaction to detach counter ions as a hydrogen halide, a reaction to detach counter ions as an alkali metal halide, a reaction to detach counter ions as a halogenated ammonium salt, and a reaction to detach counter ions as a halogenated amine salt occurs to exchange salts. Any of conventionally known reactions for salt exchange can be selected without any particular limitation, and one or more solvents each having a high polarity to dissolve a dye and being selected from among water, alcohols, glycol-based solvents, and amide-based solvents, etc. are used. Water is particularly preferable and is used in an amount of 50% by mass or more. Since the A-C block copolymer according to the present invention is dispersed and emulsified in a fine particle form in water as described previously, reaction can be conducted by adding an aqueous solution of the A-C block copolymer or a water-soluble solvent solution of the A-C block copolymer to an aqueous solution of a dye. Moreover, as for the reaction condition, the reaction is conducted at room temperature or by raising the temperature. Furthermore, the concentration of the dye during the reaction is not particularly limited; however, it is preferable that the dye is reacted in a concentration of 10% by mass or less.

Moreover, the reactivity ratio of the sulfonate group-containing coloring matter and the quaternary ammonium salt contained in the A-C block copolymer is not particularly limited. When the number of moles of the coloring matter is made larger than that of the quaternary salt, the coloring matter is surely reacted with the ammonium salt of the block B, and conversely, when the quaternary ammonium salt is excessive, part of the quaternary ammonium salt is left unreacted, but the coloring matter used is surely reacted with the ammonium salt to be introduced into the block B. There is a possibility that the coloring matter or the quaternary ammonium salt is left unreacted even though the equimolar amounts of the coloring dye and the quaternary ammonium salt are used; however, the coloring matter and the quaternary ammonium salt are reacted so as to form the block B that constitutes the A-B block copolymer according to the present invention. Preferably, the number of moles of the quaternary salt to the number of moles of the coloring matter molecules may be set so as to be equimolar or more and 1.5 times or less because it is difficult to say that excessive amount of the coloring matter, if it occurs, is appropriate from the standpoint of costs or disposal of waste liquid generated in production steps. When the quaternary salt is excessively left unreacted, there is a risk that the block B dissolves in water in the case where the A-B block copolymer is used for aqueous dispersion. However, this is not a problem in particular in the case of oil-based dispersion. Besides, the coloring matter having one or more sulfonate groups is used in the present invention; however, in the case where two or more sulfonate groups are present in a coloring matter molecule, all of the sulfonate groups are not necessarily reacted with quaternary ammonium salts in the A-C block copolymer, and one of the sulfonate group contained in the coloring matter molecule may be reacted with the quaternary ammonium salt for sure.

Next, the molecular weight of the A-B block copolymer and of the A-C block copolymer is described. The molecular weight of the block A that constitutes the A-B block copolymer according to the present invention is as described previously. The suitable molecular weight of the block A is the same in the A-C block copolymer through which A-B block copolymer is obtained. The number average molecular weight of the whole block copolymer is not particularly limited for both the A-B block copolymer and the A-C block copolymer, but is in the range that is obtained according to the range of the content of the block B. The number average molecular weight of the A-B block copolymer according to the present invention and of the A-C block copolymer used for obtaining the A-B block copolymer cannot be measured accurately with conventionally known GPC. The reason is as follows. Since the acidic carboxy group, the basic quaternary ammonium salt, and the coloring matter are contained, the quaternary ammonium salt is adsorbed to a column in the case where GPC provided with the column to which the carboxy group is not adsorbed is used, and therefore measurement cannot be conducted. In the case where measurement is conducted using a column with which measurement for the quaternary ammonium salt can be conducted, the polymer having a carboxy group is adsorbed to the column, and therefore measurement cannot be conducted. In this way, the accurate molecular weight cannot be obtained in any of the cases. Only the number average molecular weight of the block A before preparing the A-B block copolymer therefrom can be measured.

Since the specification by the molecular weight cannot be done, the specification as described below is applied to the block B so that the molecular weight of the block B may be specified indirectly. A living radical polymerization method is utilized for producing a block copolymer in the present invention, and in the living radical polymerization, a polymerization initiation compound that easily dissociates to produce a radical is generally used. For example, when the radical initiation compound is denoted as R—X, the living radical polymerization is represented by reaction formula (1) described below as a general formula.

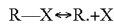  Reaction Formula (1)

From R—X, X is eliminated by heat, light, or a catalyst to produce radical R, and one molecule of a monomer is inserted in radical R. In the case of normal radical polymerization for example, monomers are subsequently inserted through chain transfer, and radicals are finally deactivated by termination reaction. Moreover, the chain transfer cannot be controlled because the lifetime of radicals is short, and the molecular weight of the polymer obtained in such a case varies from a low molecular weight to a high molecular weight, resulting in a broad molecular weight distribution. On the other hand, the reverse reaction is dominant in formula (1) in the living radical polymerization. Thus, immediately after a monomer is inserted, X is added to and stabilizes the resultant radical to terminate the insertion of monomers, and therefore termination reaction does not occur. Subsequently, X is eliminated again by heat, light, or a catalyst to produce a radical at a terminal, a monomer is then inserted, and X is bonded again to and stabilizes the resultant radical. Radical production is probabilistically even, and therefore the resultant molecular weight is uniform. Besides, a polymerization initiation compound functions as an initiation point of polymerization, a molecule extends from the initiation point, and therefore the molecular weight can be controlled according to the amount of the polymerization initiation compound.

In the present invention, the living radical polymerization is utilized, and a polymerization initiation compound and a methacrylate being a radically polymerizable group that constitutes monomers for use in polymerization are used. When the block A is formed, the amount of the methacrylate that constitutes the block A is adjusted so that the block A may have the above-described molecular weight. However, since the molecular weight of the block B cannot be measured as described previously, the molar amount of the methacrylate for forming the block B is specified relative to 1 mol of the initiation compound. That is to say, it is preferable in the present invention that the total number of moles of monomers that form the block B is 10 to 150 mol relative to 1 mol of the polymerization initiation compound. The amount of the monomers in the block B is adjusted in the above-described range together with the number of "% by mass" of the coloring matter-containing monomer contained in the block B. In adjusting the amount of the monomers, when the amount is less than 10 mol, the molecular weight of the block B becomes excessively small and there is a possibility that the affinity with a pigment cannot be exhibited. When the amount is more than 150 mol, the molecular weight of the block B becomes excessively large and there is a possibility that adsorption to the pigment over a plurality of particles, or the like occurs to hamper fine dispersion of the pigment. Preferably, the molar amount of the methacrylate for forming the block B is set to from 20 mol to 100 mol relative to 1 mol of the initiation compound. As described previously, the specification of the molecular weight of the block B is similarly applicable in the case where the A-C block copolymer used for obtaining the A-B block copolymer is formed.

Moreover, the block copolymer according to the present invention is obtained through living radical polymerization, and particularly preferably through the production process as follows. The process is for obtaining the A-B block copolymer or the A-C block copolymer, and specifically includes a step of conducting living radical polymerization in the presence of a polymerization initiation compound and a catalyst, wherein: the polymerization initiation compound for use in the step is at least any one of iodine and iodine compounds; the catalyst for use in the step is at least one compound selected from the group consisting of phosphorus halides, phosphite-based compounds, phosphinate-based compounds, imide-based compounds, phenol-based compounds, diphenylmethane-based compounds, and cyclopentadiene-based compounds; and the polymerization temperature is 30 to 50° C.

As described previously, various methods have been invented as living radical polymerization, and examples thereof include: a nitroxide method (Nitroxide mediated polymerization method: NMP method) utilizing dissociation and bonding of an amine oxide radical; an atom transfer radical polymerization method (ATRP method) conducting polymerization using a heavy metal such as copper, ruthenium, nickel, or iron, and a ligand that forms a complex with these heavy metals, and further using, as an initiation compound, a halogen compound; a reversible addition-fragmentation chain transfer method (RAFT method) conducting polymerization using an additionally polymerizable using a dithiocarbamate, a dithiocarboxylic acid ester, a xanthate compound, or the like as an initiation compound and also using an additionally polymerizable monomer and a radical initiator; a MADIX method (Macromolecular Design via Interchange of Xanthate method); and a method (Degenerative transfer method: DT method) using a heavy metal such as organotellurium, organobismuth, organoantimony, an antimony halide, organogermanium, or a germanium halide. These methods also use a polymerization initiation compound and can be applicable to the present invention.

However, there is a problem that any of the methods listed above are difficult to say that it is the most suitable method to obtain the A-B block copolymer according to the present invention. For example, in the NMP method, an amine oxide such as tetramethyl piperidine oxide radical is used, and it is required to conduct polymerization under a high temperature condition of 100° C. or higher, and there is also a problem that polymerization does not progress in the case where a methacrylate-based monomer is used.

Moreover, in the ATRP method, it is necessary to use a heavy metal, and it is also necessary to remove oxygen because the ATRP method is a polymerization method accompanied by oxidation-reduction reaction. In the method of conducting polymerization through forming a complex using an amine compound as a ligand, it is difficult to polymerize an additionally polymerizable monomer as it is, the additionally polymerizable monomer having an acid group such as a carboxy group, because the formation of a complex is inhibited when an acidic substance is present in the polymerization system. It is necessary to polymerize a monomer the acidic group of which is protected with a protection group and to eliminate the protective group after polymerization; however, the method is complicated, and it is not easy to introduce an acidic group into a polymer block.

In the RAFT method and the MADIX method, a special compound such as a dithiocarbamate, a dithiocarboxylic acid ester, or a xanthate compound is necessary in the first place, and since these compounds are sulfur-based compounds, an unpleasant odor peculiar to sulfur is liable to be left in a polymer to be obtained, and the polymer may be colored. Therefore, it is necessary to remove the odor or coloration from the polymer obtained. Besides, the polymerization of methacrylate-based monomers may not proceed well. Moreover, there is a possibility that sulfur esters such as the dithiocarboxylic acid ester and the xanthate compound is dissociated by an amino group, and therefore polymers may be made to have a low molecular weight, or sulfurous odor is generated.

Furthermore, it is necessary to use a heavy metal in the DT method similar to the ATRP method. Therefore, there is a problem that the heavy metal has to be removed from the polymer obtained, and there is also a problem that waste water which contains the heavy metal has to be purified.

Under such circumstances, the polymerization method that is used in the present invention makes it possible to carry out production easily by only using relatively inexpensive materials sold on the market, and in the polymerization method, use of a heavy metal compound is not essential, purification of a polymer is not essential, and it is not necessary to synthesize a special compound. Moreover, the polymerization method used in the present invention is a method the polymerization condition of which is calm, with which polymerization can be conducted under the same conditions as those in the conventional radical polymerization methods, and it is worthy of mentioning that a monomer having a carboxyl group or a phosphate group is subjected to living radical polymerization as it is.

Specifically, the process for producing the A-B block copolymer according to the present invention includes a step (polymerization step) of subjecting monomer components containing a methacrylate-based monomer to living radical polymerization in the presence of a polymerization initiation compound and a catalyst, and the polymerization initiation compound is at least any one of iodine and iodine compounds. In the living radical polymerization that is adopted in the present invention, various functional groups can be used.

The polymerization step is a step of subjecting monomer components containing a methacrylate-based monomer to polymerization through living radical polymerization using at least any one of iodine and iodine compounds as a polymerization initiation compound. When the iodine or iodine compound used as a polymerization initiation compound is heated or irradiated with light, an iodine radical dissociates. Immediately after a monomer is inserted in a state where the iodine radical has dissociated, the iodine radical is bonded to a polymer terminal radical again to be stabilized, and the polymerization reaction progresses while the termination reaction is prevented.

Specific examples of the iodine compound include: alkyl iodides such as 2-iodo-1-phenyl ethane, 1-iodo-1-phenyl ethane; and cyano group-containing iodides such as 2-cyano-2-iodopropane, 2-cyano-2-iodobutane, 1-cyano-1-iodocyclohexane, 2-cyano-2-iodo-2,4-dimethylpentane, and 2-cyano-2-iodo-4-methoxy-2,4-dimethylpentane.

With respect to these iodine compounds, commercially available iodine compounds may be used as they are; however, iodine compounds prepared by a conventionally known method can also be used. An iodine compound can be obtained, for example, by reacting an azo compound such as azobisisobutyronitrile with iodine. Moreover, an iodine compound can also be obtained by reacting an organic halide in which the iodine in the iodine compound is substituted by a halogen atom such as bromine or chlorine with an iodide salt such as a quaternary ammonium iodide or sodium iodide to conduct halogen exchange.

In the polymerization step, a catalyst that is capable of abstracting iodine in the polymerization initiation compound can be used together with the polymerization initiation compound. As the catalyst, it is preferable to use a phosphorus-based compound such as a phosphorus halide, a phosphite-based compound, or a phosphinate-based compound; a nitrogen-based compound such as an imide-based compound; an oxygen-based compound such as a phenol-based compound; or a hydrocarbon-based compound such as a diphenylmethane-based compound or a cyclopentadiene-based compound. In addition, these catalysts can be used alone or in combination of two or more.

Specific examples of the phosphorus-based compound include phosphorus triiodide, diethyl phosphite, dibutyl phosphite, ethoxyphenyl phosphinate, and phenylphenoxy phosphinate. Specific examples of the nitrogen-based compound include succinimide, 2,2-dimethylsuccinimide, maleimide, phthalimide, N-iodosuccinimide, and hydantoin. Specific examples of the oxygen-based compound include phenol, hydroquinone, methoxyhydroquinone, t-butylphenol, catechol, and di-t-butylhydroxytoluene. Specific examples of the hydrocarbon-based compound include cyclohexadiene and diphenylmethane.

It is preferable that the amount (number of moles) of catalyst used is less than the amount (number of moles) of the polymerization initiation compound used. When the amount (number of moles) of the catalyst used is excessively large, polymerization may be controlled more than necessary and polymerization may be hard to progress. Moreover, it is preferable to set the temperature (polymerization temperature) during living radical polymerization to 30 to 100° C. When the polymerization temperature is excessively high, iodine at a polymerization terminal may dissociate to make the terminal unstable and living polymerization may not progress. Furthermore, it is preferable in this polymerization method that iodine is bonded to the terminal, a radical is generated by dissociating the iodine as the radical, and the terminal is stable. In the case of acrylates or vinyl-based monomers, the terminal is a secondary iodide compound that is relatively stable and that does not dissociate as an iodine radical, and therefore there is a possibility that the polymerization does not progress or the molecular weight distribution becomes broad. The iodine can be dissociated by raising the temperature; however, it is preferable that the polymerization is calmly conducted in the above-described temperature range from the viewpoint of environment and energy. Accordingly, tertiary iodides that are easy to generate a radical and that are relatively stable are preferable, and methacrylate-based monomers are suitable in the living polymerization for use in the present invention.

Moreover, in the polymerization step, a polymerization initiator that can generate a radical can usually be added. As the polymerization initiator, a conventionally known azo-based initiator or peroxide-based initiator is used. In addition, it is preferable to use a polymerization initiator that generates a radical sufficiently in the above-described polymerization temperature range. Specifically, it is preferable to use an azo-based initiator such as 2,2'-azobis(4-methoxy-2,4-dimethylvaleronitrile). It is preferable to set the amount of the polymerization initiator used to 0.001 to 0.1 mol times, and more preferably 0.002 to 0.05 mol times relative to the monomers. When the amount of the polymerization initiator used is excessively small, the polymerization reaction may not sufficiently progress. On the other hand, when the amount of the polymerization initiator is excessively large, usual radical polymerization reaction other than the living radical polymerization reaction may progress as side reaction.

The living radical polymerization may be bulk polymerization in which an organic solvent is used; however, it is preferable to utilize solution polymerization in which an organic solvent is used. It is preferable that the organic solvent is capable of dissolving the components such as a polymerization initiation compound, a catalyst, a monomer component, and a polymerization initiator.

Specific examples of the organic solvent include: hydrocarbon-based solvents such as hexane, octane, decane, isodecane, cyclohexane, methylcyclohexane, toluene, xylene, and ethylbenzene; alcohol-based solvents such as methanol, ethanol, propanol, isopropanol, butanol, isobutanol, hexanol, benzyl alcohol, and cyclohexanol; glycol-based solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, tetraglyme, dipropylene glycol dimethyl ether, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate; ether-based solvents such as diethyl ether, dipropyl ether, methyl cyclopropyl ether, tetrahydrofuran, dioxane, and anisole; ketone-based solvents such as methyl ethyl ketone, diethyl ketone, methyl isobutyl ketone, cyclohexanone, isophorone, and acetophenone; ester-based solvents such as methyl acetate, ethyl acetate, butyl acetate, propyl acetate, methyl butyrate, ethyl butyrate, caprolactone, methyl lactate, ethyl lactate, dimethyl succinate, dimethyl adipate, and dimethyl glutarate; halogenated solvents such as chloroform and dichloroethane; amide-based solvents such as dimethylformamide, dimethylacetoamide, pyrrolidone, N-methylpyrrolidone, and caprolactam; and further, dimethyl sulfoxide, sulfolane, tetramethylurea, ethylene carbonate, propylene carbonate, and dimethyl carbonate. In addition, these organic solvents can be used alone or in combination of two or more.

Moreover, the organic solvent used for the polymerization can be used continuously as a solution, or the polymer is taken out from the solution and can be solidified as necessary. The method of solidifying the polymer is not particularly limited, and, for example, the polymer is precipitated in a poor solvent, and then filtered and dried, or the solution is dried to take out only the polymer to obtain a solidified product of the polymer. The solid polymer obtained may be used as it is, or a solvent may be added to the polymer to use as a polymer solution.

In the case where solution polymerization is conducted, it is preferable that the solid concentration (monomer concentration) of a polymerization liquid is set to 5 to 80% by mass, and more preferably 20 to 60% by mass. When the solid concentration of the polymerization liquid is less than 5% by mass, the monomer concentration is excessively small and polymerization may not be completed. On the other hand, when the solid concentration of the polymerization liquid exceeds 80% by mass, or bulk polymerization is conducted, the viscosity of the polymerization liquid is excessively high to make it difficult to stir the polymerization liquid and there is a tendency that the polymerization yield is lowered. It is preferable that the living polymerization is conducted until the monomer is exhausted. Specifically, it is preferable to set the polymerization time to 0.5 to 48 hours, and more preferably 1 to 24 hours substantially. Moreover, the polymerization atmosphere is not particularly limited, and may be an atmosphere where oxygen exists in a usual concentration range or may be under a nitrogen stream. Further, a material (monomer or the like) for use in polymerization may be used after removing impurities by distillation, active carbon treatment, alumina treatment, or other methods, or a commercially available product may be used as it is. Furthermore, polymerization may be conducted under a light-shielded condition or may be conducted in a transparent glass container.

As described previously, the molecular weight of the main chain of the A-B block copolymer according to the present invention and of the A-C block copolymer prepared for obtaining the A-B block copolymer is controlled by adjusting the balance of use in terms of molar ratio between the methacrylate-based monomers and polymerization initiation compound in conducting living radical polymerization. Specifically, a polymer the main chain of which has an arbitrary molecular weight can be obtained by appropriately setting the number of moles of the monomers relative to the number of moles of the polymerization initiation compound. For example, in the case where polymerization is conducted using 1 mol of a polymerization initiation compound and 500 mol of a monomer having a molecular weight of 100, a polymer having a theoretical molecular weight of "1×100× 500=50000" can be obtained. That is to say, the theoretical molecular weight of the main chain polymer can be calculated by formula (3) below. In addition, the above-described term "molecular weight" is a concept that includes both the number average molecular weight (Mn) and the weight average molecular weight (Mw).

"Theoretical molecular weight of main chain polymer"="1 mole of polymerization initiation compound"×"molecular weight of monomer"× "number of moles of monomer/number of moles of polymerization initiation compound" (3)

The amount of the polymerization initiation compound is as described previously.

In addition, the side reaction such as bimolecular termination or disproportionation may be accompanied in the polymerization process, and therefore the main chain polymer having a theoretical molecular weight may not be obtained. It is preferable that the polymer is obtained without these side reactions. Moreover, the conversion may not necessarily be 100%. Furthermore, the polymerization may be completed in such a way that the polymerization is completed once, and thereafter a polymerization initiation compound or a catalyst is added to consume the residual monomers. That is to say, in the present invention, an A-B copolymer or A-C block copolymer having a particular structure may be produced through the production process as described above, and may be contained as the main component. Preferably, when 80% or more of the copolymer produced is the particular block copolymer according to the present invention, the effect of the polymer is sufficiently obtained.

Moreover, with respect to the order of polymerization for making each block in the A-B block copolymer according to the present invention, the block A may be obtained firstly by polymerizing a carboxy group-containing methacrylate, and thereafter the polymer block B or C may be formed by polymerizing a coloring matter-containing methacrylate that is for forming the coloring matter monomer unit and that is represented by formula (1) or a quaternary ammonium salt-containing methacrylate represented by formula (2). Conversely, the polymer block B may be formed firstly, and thereafter the block A may be formed by polymerizing a carboxy group-containing methacrylate. However, preferably, it is better that the block A is obtained by polymerizing the carboxy group-containing methacrylate, and thereafter the polymer block B or C is formed by polymerizing the coloring matter-containing methacrylate represented by formula (1) or the quaternary ammonium salt-containing methacrylate represented by formula (2). The reason is as follows. In the case where the coloring matter-containing methacrylate or the quaternary ammonium salt-containing methacrylate is polymerized in advance, there is no problem when all of the monomers for forming the polymer block B or C are polymerized; however, when part of the monomers are left, they are also introduced into the block A and there is a risk that a polymer obtained does not function as the A-B block copolymer according to the present invention.

In the A-B block copolymer or A-C block copolymer obtained in the manner as described above, the iodine atoms that originate from the polymerization initiation compound may be kept in a state where the iodine atoms are bonded to the block copolymer; however, it is preferable to eliminate the iodine atoms. Any of conventionally known methods of eliminating the iodine atoms can be used as a method of eliminating iodine from the A-B block copolymer without any limitation in particular. Specifically, the A-B block copolymer may be heated, or may be treated with an acid or an alkali. Moreover, the A-B block copolymer may be treated with sodium thiosulfate, or other materials. The eliminated iodine may be removed through treatment with an iodine-adsorbing agent such as active carbon or alumina.

Since the A-B block copolymer according to the present invention obtained in the manner as described above has the organic coloring matter skeleton D, it can be used as it is as a coloring agent, but can also be used as a pigment dispersant. In the case where the A-B block copolymer according to the present invention is used as a pigment dispersant, the A-B block copolymer according to the present invention is added to a pigment, and the result mixture may be dispersed with a dispersion medium to prepare a pigment dispersion. Moreover, the pigment dispersion in which a pigment and the A-B block copolymer are dispersed can also be obtained by adding a sulfonate group-containing coloring matter and the A-C block copolymer prepared for obtaining the A-B block copolymer to a pigment to conduct salt exchange reaction and disperse the reaction product in parallel with the salt exchange.

However, according to studies conducted by the present inventors, in the case where the pigment dispersion is obtained in the manner as described above, the block B has a coloring matter skeleton in the structure thereof, has a large number of ionic bonds, and therefore is hardly soluble to solvents. Thus, it may be difficult to disperse a pigment in a liquid medium using the A-B block copolymer according to the present invention as a dispersant because the block B is hardly soluble to solvents. It is considered that this is because the block B is insoluble and cannot be adsorbed to the pigment, making it difficult to disperse the pigment.

<Resin-Treated Pigment Composition>

Thus, the present invention provides a more preferable, novel resin-treated pigment composition (hereinafter, also written as resin-treated pigment) in which the A-B block copolymer is adsorbed on the surface of a pigment. This is a resin-treated pigment in which a pigment is treated with the A-B block copolymer in advance, and a state where the polymer block B is strongly adsorbed to the pigment can be realized because the polymer block B is hardly soluble to solvents and has a high affinity to the pigment. Therefore, the resin-treated pigment according to the present invention realizes a state where the A-B block copolymer is more surely adsorbed to the pigment than in the embodiment of use as the above-described pigment dispersant, and thus exhibits a more satisfactory dispersibility. For example, when the resin-treated pigment according to the present invention is dispersed in a liquid medium, the polymer block B is adsorbed to the pigment to encapsulate the pigment, and the polymer block A dissolves in the liquid medium or the dispersion medium and makes a compatible state with the liquid medium or the dispersion medium to be able to disperse the pigment into a fine particle by the steric hindrance and steric repulsion. As a result, an extremely satisfactory pigment dispersion that has a high storage stability, that does not cause aggregation of pigments, and that does not cause a viscosity increase of the dispersion liquid can be obtained. Moreover, with the resin-treated pigment according to the present invention, a pigment dispersion in which a pigment is finely dispersed can easily be obtained by only mixing the resin-treated pigment obtained and a liquid medium being a dispersion medium and dispersing the resultant mixture, and this is also a major feature of the resin-treated pigment according to the present invention. Further, in addition to the color performance of the pigment, the color performance of the coloring matter that constitutes the A-B block copolymer is added, and the resin-treated pigment according to the present invention exhibits color performance that has never been achieved so far.

Hereinafter, the details about the resin-treated pigment according to the present invention having the above-described excellent performance will be described. The resin-treated pigment contains 10 to 200 parts of the A-B block copolymer relative to 100 parts of the pigment. On the other hand, when the amount of the A-B block copolymer is less than 10 parts, the function as a dispersant when the pigment is dispersed is insufficient, and therefore the pigment may not be finely dispersed or the storage stability may be poor. Moreover, when the amount of the A-B block copolymer is more than 200 parts, the relative content of the pigment is reduced, and therefore the performance of the pigment may not be exhibited. The amount of the A-B block copolymer is more preferably 30 to 100 parts.

The pigment for use in the resin-treated pigment according to the present invention is not particularly limited, and red pigments, green pigments, and blue pigments for use in R, G, and B colors respectively, yellow pigments as a complementary color for blue, violet pigments, and pigments each exhibiting yellow, cyan, magenta, and black color for Y, C, M, and Bk colors respectively in color filters and inkjet inks can be used.

Specific examples of the pigments used in inkjet inks include: Color Index No. (C.I.) Pigment Blue 15:3, and 15:4, C.I. Pigment Red 122, and 269, C.I. Pigment Violet 19, C.I. Pigment Yellow 74, 155, 180, and 183, C.I. Pigment Green 7, 36, and 58, C.I. Pigment Orange 43, C.I. Pigment Black 7, and C.I. Pigment White 6. It is preferable that the average primary particle diameter of these pigments is smaller than 350 nm. More preferably, the average primary particle diameter may be smaller than 150 nm for C.I. Pigment Blue 15:3 and 15:4, C.I. Pigment Red 122 and 269, C.I. Pigment Violet 19, C.I. Pigment Yellow 74, 155, 180, and 183, C.I. Pigment Green 7, 36, and 58, C.I. Pigment Orange 43, and C.I. Pigment Black 7, and the average primary particle diameter may be smaller than 300 nm for C.I. Pigment White 6. It is more preferable that the average primary particle diameter of the pigments is smaller against the clogging of a head in an inkjet recording apparatus or sharpness of images. The pigment for use in the resin-treated pigment according to present invention may be a treated pigment to which surface treatment or encapsulation is applied with a surface treatment agent such as a coupling agent or a surface active agent, or a resin.

It is preferable to use an organic pigment or an inorganic pigment for black matrixes as a pigment for color filters. Examples of the red pigment include Color Index No. (hereinafter, written as C.I.) Pigment Red (PR) 56, 58, 122, 166, 168, 176, 177, 178, 224, 242, 254, and 255. Examples of the green pigment include C.I. Pigment Green (PG) 7, 36, 58, poly (14 to 16) brominated copper phthalocyanine, and poly (12 to 15) brominated-poly (4 to 1) chlorinated copper phthalocyanine. Examples of the blue pigment include C.I. Pigment Blue 15:1, 15:3, 15:6, 60, and 80.

Moreover, examples of the complementary color pigments to the above-described pigments for color filters or pigments for multicolor type pixels include the following pigments. Examples of the yellow pigment include C.I. Pigment Yellow (PY) 12, 13, 14, 17, 24, 55, 60, 74, 83, 90, 93, 126, 128, 138, 139, 150, 154, 155, 180, 185, 216, and 219, and examples of the violet pigment include C.I. Pigment Violet (PV) 19 and 23. Furthermore, examples of the black pigment for black matrixes include C.I. Pigment Black (PBk) 6, 7, 11, and 26, and copper-based, manganese-based, and iron-based complex oxides. The surface of these pigments may be treated with a pigment surface-modifying agent called a synergist, or with a surface active agent.

The synergist is not particularly limited, a compound having a coloring matter skeleton containing an acidic or basic group such as a sulfonate group, a carboxy group, a phosphate group, or an amino group is used. It is particularly preferable that a sulfonate group-containing synergist having a sulfonate group is used because such a compound exchanges salts with the quaternary ammonium salt in the A-C block copolymer in the production process according to the present invention to exhibit a strong adsorption action. Similarly, the surface active agent is not particularly limited. It is preferable to use a sulfonate group-containing surface active agent such as sodium dodecylbenzene sulfonate or sodium lauryl sulfate because such a surface active agent as well as the above-described synergist reacts with the quaternary ammonium salt in the A-C block copolymer to be adsorbed strongly to the pigment.

The number average particle diameter of the pigment after being dispersed through the resin-treated pigment according to the present invention is not particularly limited, but is preferably 10 to 200 nm in the case of carbon black and organic pigments, and more preferably 20 to 150 nm. Moreover, the number average particle diameter of the pigment after being dispersed through the resin-treated pigment according to the present invention is preferably 50 to 300 nm, and more preferably 100 to 250 nm for inorganic pigments such as titanium oxide. In addition, the number average particle diameter of the pigment can be determined by observation with a transmission electron micrograph (TEM). The pigment obtained in such a way that a particulate pigment is treated with the A-B block copolymer according to the present invention is useful as a coloring agent that gives a high color developability, high coloring properties, a high glossiness, and a high printability.

Hereinafter, the production process for obtaining the resin-treated pigment will be described. The resin-treated pigment according to the present invention can be obtained by mixing a pigment and the A-B block copolymer according to the present invention or a solvent solution of the A-B block copolymer; however, as described previously, since the polymer block B is hardly soluble to liquid media, there is a risk that the product results in a mere mixture. Thus, the resin-treated pigment according to the present invention can stably be obtained in the manner as described below.

That is to say, the resin-treated pigment treated with the A-B block copolymer according to the present invention is easily obtained by subjecting an organic matter having at least one structural moiety selected from the group consisting of sulfonic acids, alkali metal sulfonates, ammonium sulfonates, and amine sulfonates and the A-C block copolymer to any one of a reaction to detach counter ions as a hydrogen halide, a reaction to detach counter ions as an alkali metal halide, a reaction to detach counter ions as a halogenated ammonium salt, and a reaction to detach counter ions as a halogenated amine salt in the presence of a pigment in an aqueous medium.

More specifically, the reaction is conducted according to the procedures described below. A pigment is added to an aqueous medium, or an aqueous medium containing, as necessary, a water-soluble organic solvent added therein. As the pigment, a powder pigment may be used, but preferably, water paste of the pigment before drying may be used as will be described below. The pigment as it is after being synthesized has a large crystal, and therefore particles thereof are made uniform, micronized, and subjected to pigmentation, thereby preparing pigment particles having fine primary particle diameters. The pigment powder is then obtained by drying and pulverizing the pigment particles; however, primary particles of the pigment aggregate to form secondary particles, resulting in coarse pigment particles. Therefore, the coarse pigment particles are finely dispersed with a mechanical media to prepare a pigment dispersion liquid; however, in the paste of primary particles before drying, the pigment exists as fine particles without forming the secondary particles, and accordingly the paste of primary particles before drying is suitable because treatment can be conducted in a state where the pigment exists as fine particles when the pigment is treated with the A-C block copolymer for use in the present invention and a dye.

More specifically, it is preferable to prepare a water slurry having a solid concentration of the pigment of 0.5 to 30% using the water paste of the pigment before drying. The slurry is peptized by a conventionally known method. The method of peptizing the pigment is not particularly limited, and the peptizing may be conducted using a disper or a homogenizer, or, as necessary, a disperser such as a vertical bead mill, a horizontal bead mill, or a high-pressure homogenizer, or a kneading machine such as a kneader, a flusher, a twin-roll kneader, or a triple-roll kneader. The peptizing condition is conventionally known and is not particularly limited. Moreover, in peptizing the pigment, the previously described pigment surface-modifying agent or surface active agent can be added as necessary. The addition of the surface active agent will be described later.

Subsequently, an organic coloring matter having at least one sulfonic acid, alkali metal sulfonate, ammonium sulfonate, or amine sulfonate in the structure thereof is added in order to complete the constitution that characterizes the present invention, and the resultant mixture is made uniform. In the case where the coloring matter is hard to dissolve when the coloring matter is added, the coloring matter may be added after dissolving the coloring matter in an organic solvent, preferably in a water-soluble organic solvent. The method and condition of stirring is not limited.

Subsequently, the A-C block copolymer for use in the present invention is added. The solution of the polymerization solvent containing the A-C block copolymer obtained through polymerization may be added as it is, the A-C block copolymer obtained through polymerization may be taken out as a solid and may be added as the solid, or the A-C block copolymer taken out as a solid may be added after dissolving the solid in another liquid medium. In the case where the A-C block copolymer is added as the solution of the polymerization solvent, it is preferable that the polymerization solvent is a water-soluble organic solvent or a solvent such as an alcohol-based, glycol-based, or amide-based solvent, and more preferably, the alcohol-based, glycol-based, or the amide-based water-soluble solvent are suitable as the solvent in obtaining the A-C block copolymer through polymerization because with these solvents, there is no need for a step of purifying the polymer, etc.

Preferable examples of the solvent for use in adding the A-C block copolymer include: alkylene (number of carbon atoms: C2 to C6) diols; alkylene (number of carbon atoms: C3 to C10) triols, mono or dialkyl (number of carbon atoms: C1 to C4) ethers; (poly n=2 to 5) alkylene (number of carbon atoms: C2 to C4) glycol mono or dialkyl (number of carbon atoms: C1 to C4) ethers; mono or poly (n=2 to 5) ethylene glycol monoalkyl ether acetates; and amide-based solvents. Specifically, solvents as follows can preferably be used, the solvents including: alkylene (number of carbon atoms: C2 to C6) diols such as ethylene glycol, propylene glycol, 1,3-propane diol, 1,2-butane diol, 1,3-butane diol, 1,4-butane diol, and 3-methyl-3-hydroxy-1-butanol; alkylene (number of carbon atoms: C3 to C10) triols such as glycerin, trimethylolpropane, and 1,2,4-butanetriol; mono or dialkyl ethers of the alkylene (number of carbon atoms: C2 to C6) diols, such as ethylene glycol monomethyl ether, ethylene glycol dimethyl ether, propylene glycol monomethyl ether, propylene glycol monopropyl ether, and 3-methyl-3-methoxy-1-butanol; (poly n=2 to 5) alkylene (number of carbon atoms: C2 to C4) glycol mono or dialkyl (number of carbon atoms: C1 to C4) ethers such as diethylene glycol monobutyl ether, triethylene glycol monobutyl ether, tetraethylene glycol monomethyl ether, tetraethylene glycol dimethyl ether, dipropylene glycol monomethyl ether, and tripropylene glycol monomethyl ether; mono or poly (n=2 to 5) ethylene glycol monoalkyl ether acetates such as diethylene glycol monoethyl ether acetate; and amide-based solvents such as 2-pyrrolidone and N-methylpyrrolidone.

When the A-C block copolymer is added, the phenomenon of viscosity increase may be observed although it depends on the concentration of the pigment. It is considered that this is because as follows. The A-C block copolymer and the detached sulfonic acid of the coloring matter forms the A-B block copolymer to insolubilize the A-C block copolymer and the sulfonic acid of the coloring matter to water. The formed A-B block copolymer is then strongly adsorbed to the pigment to make the surface of the pigment hydrophobic due to the hydrophobicity of the polymer block A in the polymer. Therefore, the fluidity of the pigment is reduced. In this case, when a spot is made on filter paper with the slurry containing the dye and the pigment, it can be confirmed that the pigment and the dye separate and the dye bleeds. However, when the A-C block copolymer is added to the slurry, bleeding of the dye is not observed, meaning that the dye is insolubilized, and it is found that the pigment is treated with the A-B block copolymer according to the present invention. As the method of adding the A-C block copolymer, the A-C block copolymer may be added at once, or may be added gradually. The A-C block copolymer may be added at room temperature or under heating. Further, the time for stirring is not particularly limited, and the stirring condition is arbitrary. Subsequently, filtration, washing, drying, and pulverization are conducted, and thereby the resin-treated pigment according to the present invention can be obtained. The resin-treated pigment, when used in aqueous dispersion, can be used in a water paste state without drying.

Moreover, when the water paste is used, a sulfonate group-containing surface active agent can be used. The method of using the sulfonic acid group-containing surface active agent is a method by which a pigment having a finer particle diameters can be treated although the water paste causes no trouble as described above. Even though the secondary particles are not formed in the water paste of the pigment before drying, soft secondary aggregation is formed due to pressure during storage, drying of part of the water paste, and hydrophobicity of particles, and therefore there is a possibility that coarse particles exist when the pigment particles are treated while the particle diameters thereof are as they are in the water paste. Thus, it is preferable to use the pigment finely dispersed in advance in water with a sulfonate group-containing surface active agent. With respect to the dispersion, any of conventionally known methods may be selected without any particular limitation; however, a pigment is dispersed at the pigment concentration of 10 to 40% by mass using 1 to 10% of a sulfonate group-containing surface active agent relative to the pigment by a conventionally known dispersion method such as dispersion with beads or ultrasonic dispersion adding an additive such as a defoaming agent as necessary. Examples of the disperser for use in dispersing the pigment with a sulfonic group-containing surface active agent include kneading machines such as a kneader, a twin-roll kneader, a triple-roll kneader, and Miracle KCK (trade name, manufactured by Asada Iron Works Co., Ltd.), an ultrasonic disperser, and a high-pressure homogenizer such as Microfluidizer (trade name, manufactured by Mizuho Industrial Co., Ltd.), Nanomizer (trade name, manufactured by Yoshida Kikai Co., Ltd.), Starburst (trade name, manufactured by Sugino Machine Limited), and G-smasher (trade name, manufactured by RIX Corporation). Moreover, a ball mill, a sand mill, a horizontal medium mill disperser, and a colloid mill can be used among the apparatuses using a bead medium such as glass or zircon bead. The formulation for dispersion is not particularly limited. It is also a preferable embodiment to use another additive as necessary to such an extent that does not have an adverse effect to the product quality. The additive for use in this case is not particularly limited, and at least one of various kinds of additives as follows can arbitrarily be added. The additives include, for example, a defoaming agent, a levelling agent, a light stabilizer, an ultraviolet ray absorbing agent, a surface-adjusting agent, a coloring agent such as a dye, a polymer component for improving film properties and adhesiveness, a water repellent agent, an oil repellent agent, a crosslinking agent accompanied by chemical bond formation, a matting agent, a silane coupling agent, a surface active agent, etc.

The resin-treated pigment can be obtained as described previously in such a way that the pigment dispersion liquid containing the pigment dispersed with the sulfonate group-containing surface active agent is used, the sulfonate group-containing coloring matter is added thereto, the resultant mixture is mixed, stirred, and, as necessary, dispersed, and the A-C block copolymer is then added thereto. The treatment is conducted in a state where the pigment is dispersed into fine particles, and therefore the resin-treated pigment in which a particulate pigment is treated can be obtained.

The pigment dispersion according to the present invention contains at least a pigment and the A-B block copolymer according to the present invention; however, it is more preferable that a dispersion is obtained using the resin-treated pigment which contains the pigment and the A-B block copolymer and which is obtained in the manner as described above. A pigment dispersant can be added separately as necessary; however, in the case where the resin-treated pigment obtained in the manner as described above is used, the pigment dispersant is basically unnecessary. The reason is as follows. When the resin-treated pigment according to the present invention is used, the A-B block copolymer functions as a pigment dispersant, namely, the block B is adsorbed to the pigment and is not desorbed from the pigment because the block B is insoluble to liquid media, and the block A dissolves in the dispersion medium. Therefore, a dispersion state can be made.

As the dispersion medium for use in obtaining the pigment dispersion, liquid media and solid media can be used; however, liquid media are preferable. Specific examples of the liquid media include water, the above-described organic solvents, and polymerizable monomers used for UV inks or polymerized toners. That is to say, the pigment dispersion according to the present invention has a characteristic that it can be used as an aqueous coloring agent and also as an oil-based coloring agent.

Description is made here with respect to the polymerizable monomer for use as the dispersion medium. For example, the above-described methacrylates; and acrylic acid-based monomers and oligomers are suitable. Specific examples of the monomer include butyl acrylate, 2-methylpropane acrylate, t-butyl acrylate, pentyl acrylate, hexyl acrylate, octyl acrylate, 2-ethylhexyl acrylate, nonyl acrylate, decyl acrylate, isodecyl acrylate, lauryl acrylate, tetradecyl acrylate, octadecyl acrylate, behenyl acrylate, isostearyl acrylate, cyclohexyl acrylate, t-butylcyclohexyl acrylate, isobornyl acrylate, trimethylcyclohexyl acrylate, cyclodecyl acrylate, cyclodecylmethyl acrylate, tricyclodecyl acrylate, benzyl acrylate, phenoxyethyl acrylate, phenyl acrylate, naphthyl acrylate, 2-hydroxyethyl acrylate, 2-hydroxypropyl acrylate, (poly)ethylene glycol monomethyl ether acrylates, (poly)ethylene glycol monomethyl ether acrylates, (poly)ethylene glycol monolauryl ether acrylates, (poly)propylene glycol monomethyl ether acrylates, octafluorooctyl acrylate, tetrafluoroethyl acrylate, acrylates of ethylene oxide adducts of nonyl phenol, acryloyloxyethyl phosphate, and acryloyloxy phthalate. Moreover, the above-described methacrylate-based monomers can also be used. Besides, vinyl-based monomers such as styrene can also be used.

Furthermore, the radically polymerizable oligomer is a compound having two or more polymerizable groups in one molecule, and the specific examples thereof include: acrylic acid diesters of alkyl, alkenyl, and cycloalkyl diols such as ethylene glycol, butanediol, hexanediol, nonanediol, cyclohexanedimethanol, butenediol, butindiol, and neopentyl glycol; acrylic acid diesters of poly (n=2 or more) glycol ethers such as ethylene oxide adducts of polyethylene glycol, polypropylene glycol, polytetramethylene glycol, and bisphenol A; diacrylate compounds of polyester diols such as poly(hexanediol adipate) and poly(butanediol succinate), and polycaprolactone; diacrylates of carbonate diols such as polyhexamethylene carbonate; polyacrylate compounds of urethane polyols obtained from a diisocyanate such as toluene diisocyanate and a diol, triol, or a diamine; polyacrylate compounds of epoxy resins such as glycidyl ether adducts of bisphenol A; and polyacrylate compounds of polyhydric compounds such as polyglycerin, trimethylolpropane, pentaerythritol, dipentaerythritol, and sorbitol, and polyacrylate compounds of alkylene oxide adducts of the polyhydric compounds.

The above-described acrylates or radically polymerizable monomers can contribute also as a cationically polymerizable compound; however, vinyl ether-based monomers can be used as a cationically polymerizable compound. Specific examples of the usable vinyl ether-based monomers include: monofunctional vinyl ethers such as ethyl vinyl ether, butyl vinyl ether, cyclohexyl vinyl ether, and hydroxyethyl vinyl ether; and multifunctional vinyl ethers such as (poly)ethylene glycol divinyl ethers, butanediol divinyl ether, hexanediol divinyl ether, and trimethylolpropane trivinyl ether. Further, epoxy compounds and oxetane compounds can also be used.

Moreover, as the dispersion medium, a solid medium may be used and is applicable to thermoplastic resins and thermosetting resins. The pigment dispersion according to the present invention can also be used for coloration of plastic shaped products, films, toners, etc.

A coloring agent for color filters is given as an example of an oil-based pigment dispersion particularly as a dispersion with a liquid medium. Specifically, as an example of use thereof, the coloring agent is obtained in such a way that the resin-treated pigment obtained in the manner as previously described is blended in an organic solvent in an amount of 5 to 40% by mass as the pigment content, a binder for imparting alkali developability is then added as necessary, and the resultant mixture is dispersed by the dispersion method as described previously.

With respect to the pigment, the pigment as described previously is used; however, the pigment described below may preferably be used. The pigment having an average particle diameter of 10 to 150 nm is preferable, and it is more preferable to use a pigment having an average particle diameter of 20 to 80 nm. Moreover, particularly in the case where the resin-treated pigment is used as a coloring agent for color filters, it is preferable to use a pigment having an average particle diameter of 10 to 50 nm for constituting the coloring agent. The pigment dispersion according to the present invention obtained by dispersing such a particulate pigment is particularly suitable as a coloring agent that is capable of producing a color filter having a high transparency and a high contrast characteristic. When the average particle diameter is less than 10 nm, the size of the pigment becomes the size of the primary particles or smaller and there is a risk that physical properties such as light fastness and heat resistance become deteriorated. On the other hand, when the average particle diameter exceeds 150 nm, there is a risk that the transparency and contrast characteristic are deteriorated. In addition, the average particle diameter of the pigment can be determined by observation with a transmission electron microscope (TEM). Moreover, the resin-treated pigment according to the present invention contains a pigment dispersant that is capable of highly and finely dispersing the particulate pigment stably. Therefore, the pigment dispersion according to the present invention using the resin-treated pigment according to the present invention contains an extremely fine pigment dispersed in a satisfactory state and is also excellent in long term storage stability.

Moreover, in the step of dispersing the pigment dispersion according to the present invention, a coloring matter derivative can be added as necessary. Examples of the coloring matter derivative include acidic functional group-containing coloring matter derivatives and basic functional group-containing coloring matter derivatives, and a skeleton that is the same as or similar to the skeleton of the pigment, or a skeleton that is the same as or similar to the skeleton of the compound as a raw material of the pigment is preferable. Specific examples of the coloring matter skeleton include azo-based coloring matter skeletons, phthalocyanine-based coloring matter skeletons, anthraquinone-based coloring matter skeletons, triazine-based coloring matter skeletons, acridine-based coloring matter skeletons, and perylene-based coloring matter skeletons.

The resin-treated pigment according to the present invention has a carboxy group in the polymer block A, and therefore has a characteristic that it can be developed as it is with an alkali. An alkali-developable polymer can be added as necessary to the resin-treated pigment. The alkali-developable polymer contains an acidic group such as a carboxy group in the structure thereof, and the acidic group is neutralized with an aqueous alkali solution to make the polymer water-soluble, and therefore the polymer can be developed.

As the alkali-developable polymer, photosensitive resins having a photosensitive group such as an unsaturated bond group or non-photosensitive resins can be used. Specific examples of the photosensitive resin include photosensitive cyclized rubber-based resins, photosensitive phenol-based resins, photosensitive polyacrylate-based resins, photosensitive polyamide-based resins, photosensitive polyimide-based resins, unsaturated polyester-based resins, polyester acrylate-based resins, polyepoxy acrylate-based resins, polyurethane acrylate-based resins, polyether acrylate-based resins, and polyol acrylate-based resins. Specific examples of the non-photosensitive resin include cellulose acetate-based resins, nitrocellulose-based resins, styrene-based (co) polymers, polyvinyl butyral-based resins, amino alkyd-based resins, polyester-based resins, amino resin-modified polyester-based resins, polyurethane-based resins, acrylic polyol urethane-based resins, soluble polyamide-based resins, soluble polyimide-based resins, soluble polyamide-imide-based resins, soluble polyester imide-based resins, hydroxyethyl cellulose, styrene-maleic acid ester-based copolymers, and (meth)acrylic acid ester-based (co)polymers. These alkali-developable polymers can be used alone or in combination of two or more. In addition, it is preferable that the content of the alkali-developable binder in the resin-treated pigment is 5 to 300 parts by mass, and more preferably 10 to 100 parts by mass relative to 100 parts by mass of the pigment.

It is also a preferable aspect that an unsaturated bond group-containing block copolymer obtained by reacting (meth)acrylates each having a glycidyl group or an isocyanate group is further contained in the resin-treated pigment according to the present invention. The unsaturated bond group-containing block copolymer is a component that is capable of forming a film by photocuring. Therefore, with the unsaturated bond group-containing block copolymer, the strength (resistance) of the pixels of color filters can be improved. Moreover, edges of the pixels can be formed sharply, and the solvent resistance of the pixels formed can be improved. In addition, as the unsaturated bond group in the unsaturated bond group-containing block copolymer, an acrylic group or a methacrylic group is suitable. These unsaturated bond groups are introduced into the unsaturated bond group-containing block copolymer by a conventionally known method.

As the liquid medium that constitutes the pigment dispersion according to the present invention being an oil-based pigment dispersion liquid, the above-described organic solvents can be used alone or in combination of two or more. Glycol ester-based solvents such as propylene glycol monomethyl ether acetate are particularly preferable.

The pigment dispersion according to the present invention may further contain a conventionally known additive added therein. Specific examples of the additive include an ultraviolet ray absorbing agent, a levelling agent, a defoaming agent, a photopolymerization initiator. Moreover, a monomer having an unsaturated bond, such as a methacrylate or acrylate, may be added as a reactive diluent.

When the pigment dispersion according to the present invention is produced, respective components may be blended at once, or may be blended separately. The resin-treated pigment and components such as a liquid medium and an alkali-developable polymer are added, and the resultant mixture is dispersed. In addition, another pigment dispersant may be added as necessary.

The method of dispersing the pigment may be any of conventionally known methods and is not particularly limited. The pigment dispersion liquid obtained may be used as it is; however, it is preferable to remove coarse particles by subjecting the pigment dispersion liquid to centrifugal separation with a centrifugal separator or filtration through an arbitrary filter. The viscosity of the pigment dispersion liquid obtained is not particularly limited, but is preferably 5 to 30 mPa·s, and more preferably 6 to 20 mPa·s.

Moreover, examples of use in an aqueous medium among the pigment dispersions in which a pigment is dispersed in a liquid medium include a coloring agent (ink) for aqueous inkjet. Specifically as use of the pigment dispersion, the resin-treated pigment obtained in the manner as described previously is blended in an aqueous solution containing an alkali dissolved therein in an amount of 5 to 40% by mass as the pigment content, a water-soluble organic solvent is added as necessary thereto, a resin component to be a film component is further added, and the resultant mixture is dispersed by the dispersion method described previously, thereby obtaining the pigment dispersion as a coloring agent.

First of all, in the aqueous alkali solution, the alkali functions to ionize the carboxy group in the block A in the A-B block copolymer according to the present invention and dissolve the block A in water. As for the amount of the alkali used in this case, the alkali may be used in an amount 0.5 to 1.5 times the molar equivalent of the carboxy group contained in the block A, and the carboxy group in the polymer block A is neutralized with the alkali to solve the block A. Examples of the alkali used in this case include conventionally known alkalis, for example, ammonia, organic amines, and hydroxides such as sodium hydroxide. Preferably, ammonia or an organic amine may be used. The reason is that since an alkali metal oxide such as, for example, sodium hydroxide is a strong base, the quaternary ammonium salt, which constitutes the polymer block B and which is a salt of sulfonic acid of the coloring matter represented by formula (1), reacts with the hydroxide to produce an alkali metal salt of the sulfonic acid and to produce a hydroxide salt from the quaternary ammonium salt, and therefore there is a risk that the coloring matter is detached from the polymer.

Examples of the organic solvent added as necessary in obtaining the pigment dispersion include the previously described alcohol-based solvents, glycol-based solvents, and amide-based solvents, and glycerin, and these organic solvents are used for intended purposes such as prevention of drying of inks, facilitation of penetration into paper, adjustment of surface tension, etc. The amount of the organic solvent blended is arbitrary; however, the organic solvents are used within a range from 0 to 50% by mass in the system.

Moreover, the resin component as a film component used in obtaining the pigment dispersion is not particularly limited, and an acrylic, styrene-acrylic, ether urethane-based, carbonate urethane-based, or silicone-based water-soluble polymer, dispersion liquid, or emulsion can be used, and these resin components are not particularly limited. The resin component is used in an amount added within a range from 0 to 20% by mass in the dispersion liquid, and exhibits effects of improving adhesiveness to recording media, rub fastness, and durability of printed products.

In the present invention, the pigments described previously can be used, and the desirable particle diameter of the dispersed pigment is as described previously. The average particle diameter is 150 nm or smaller for organic pigments and 300 nm or smaller for inorganic pigments in consideration of coloring properties and print quality of inks, such as optical density and chroma, or sedimentation of pigments in inks. In order to obtain a pigment dispersion having a desired particle size distribution, a method in which the size of pulverizing media of the disperser is made small, the filling ratio of pulverizing media is made large, the treatment time is made long, the ejection speed is made slow, classification of particles is conducted with a filter or a centrifugal separator after dispersion is used, or a method in combination thereof is given as an example. Further, a method using a pigment the primary particle diameter of which is finely adjusted in advance by a conventionally known method such as a salt milling method can be used. It is preferable to remove coarse particles with a centrifugal separator or filter after dispersion.

Moreover, an additive is added as necessary to the coloring agent to prepare an ink. An additive such as a surface active agent, a pigment derivative, a dye, a levelling agent, a defoaming agent, and an ultraviolet ray absorbing agent can be used as an additional additive, and the additional additives are not particularly limited. It is preferable that the surface tension of the additional additive is set in a range from 20 mN/m or more and 40 mN/m or less. At least a surface active agent may be added from the viewpoint of spreading the dot diameter printed by inkjet to a suitable width. A conventionally known surface active agent can be used as the surface active agent. The amount of the surface active agent added is within a range from 0.01 to 5% by mass, and preferably within a range from 0.1 to 2% by mass because when the amount is large, the dispersion stability of the pigment may be impaired.

The viscosity of the dispersion liquid obtained is not particularly limited, but is 2 to 10 mPa·s for inkjet inks containing a dye or an organic pigment and 5 to 30 mPa·s for inkjet inks containing an inorganic pigment. The pigment dispersion according to the present invention can be obtained in the manner as described above.

EXAMPLES

Hereinafter, the present invention will be described more specifically giving Examples and Comparative Examples; however, the present invention is not limited by these examples at all. It is to be noted that the "parts" and "%" in the description are on a mass basis.

Synthesis Example 1: Synthesis of A-C Block Copolymer-1

In a 1 L separable flask equipped with a reflux pipe, a nitrogen gas-introducing apparatus, a thermometer, and a stirring apparatus, 368.7 parts of diethylene glycol monobutyl ether (hereinafter, abbreviated as BDG) as an organic solvent, 3.2 parts of iodine, 44.0 parts of methyl methacrylate (hereinafter, abbreviated as MMA), 44.0 parts of butyl methacrylate (hereinafter, abbreviated as BMA), 22.0 parts of 2-ethylhexyl methacrylate (hereinafter, 2-EHMA), 34.0 parts of a poly (n=2 to 4) ethylene glycol monomethyl ether methacrylate (manufactured by NOF CORPORATION, hereinafter abbreviated as PME200), 15.0 parts of methacrylic acid (hereinafter, abbreviated as MAA) 0.3 parts of diphenylmethane (hereinafter, abbreviated as DPM) as a catalyst, and 13.5 parts of 2,2'-azobis(4-methoxy-2,4-dimethylvaleronitrile) (manufactured by Wako Pure Chemical Industries, Ltd., hereinafter abbreviated as V-70) as a polymerization initiator were charged, and polymerization was conducted at 40° C. for 5.5 hours under a nitrogen stream to form a block A and obtain a polymer solution (A1). The solid content of the polymer solution (A1) measured was 32.3%, and the calculated polymerization conversion was almost 100%. Moreover, GPC measurement was conducted using tetrahydrofuran (hereinafter, abbreviated as THF) as an eluent to find that the number average molecular weight was 5700, and the PDI was 1.26. When part of the polymer solution (A1) was added to water, a resin was precipitated. This shown that the polymer obtained is water-insoluble.

Moreover, the acid value as a resin of the block A measured by titration with phenolphthalein as an indicator using 0.1 N KOH ethanol solution using ethanol/toluene as a solvent was 54.0 mgKOH/g, which was almost equal to a theoretical value. The acid values were measured by the method described above, and the values are shown hereinafter.

Subsequently, a polymer block C was introduced in the manner as described below into the block A obtained above. First of all, a solution obtained in advance by mixing and homogenizing 30.1 parts of benzyl dimethylammonium chloride ethyl methacrylate (herein after, abbreviated as DMQ-1) having a structure represented by formula (2), 88.1 parts of benzyl methacrylate (hereinafter, abbreviated as BzMA), and 70.2 parts of BDG was added to the polymer solution (A1) obtained above. Further, 2.4 parts of V-70 were added to the resultant mixture and polymerization was conducted at the same temperature for 4 hours to form the block C and obtain a polymer solution (A1-C1). The solid content of the polymer solution (A1-C1) obtained was 40.3%, and the calculated conversion was almost 100%. When GPC measurement was conducted, the peaks were small and unclear. It is considered that this is because the solubility of the quaternary ammonium salt in THF was poor and the quarternary ammonium salt was adsorbed to the column.

When part of the polymer solution (A1-C1) obtained above was added to water, the polymer solution (A1-C1) dissolved almost transparently. The reason is considered to be as follows. The quaternary ammonium salt being a constituent of the block C has a water-soluble characteristic, and therefore the block C portion dissolved in water by the quaternary ammonium salt being introduced in the block C and the water-insoluble block A portion became a fine particle to be dispersed in water. From the result obtained above, it is suggested that the polymer obtained is an A-C block copolymer in which the block C is introduced to the block A. The polymer is referred to as A-C block copolymer-1.

Synthesis Example 2: Synthesis of A-C Block Copolymer-2

Using the same apparatus as the one used in Synthesis Example 1, a block A was formed and a polymer solution (A2) was obtained conducting polymerization in the same manner as in Synthesis Example 1 except that 382.8 parts of BDG as an organic solvent, 3.2 parts of iodine, 44.0 parts of MMA, 44.0 parts of BMA, 22.0 parts of 2-EHMA, 34.0 parts of PME200, 15.0 parts of MAA, 0.3 parts of DPM as a catalyst, and 13.5 parts of V-70 were used. The solid content of the polymer solution (A2) measured was 31.5%, and the calculated polymerization conversion was almost 100%. The number average molecular weight obtained by GPC measurement was 5700, and the PDI was 1.26. Moreover, the acid value as a resin of the block A was 54.5 mgKOH/g.

Subsequently, a block C was formed and a polymer solution (A2-C2) was obtained conducting polymerization in the same manner as in Synthesis Example 1 except that a solution obtained in advance by mixing and homogenizing 19.9 parts of DMQ-1, 88.1 parts of BzMA, and 46.4 parts of BDG was added to the polymer solution (A2) obtained above, and further, 2.2 parts of V-70 were added to the resultant mixture. The solid content of the polymer solution (A2-C2) was 40.5%, and the calculated conversion was almost 100%.

GPC measurement was conducted in the same manner as in Synthesis Example 1, but was not satisfactory because the peaks were small and unclear. Moreover, when part of the polymer solution (A2-C2) was added to water, the polymer solution (A2-C2) dissolved in a slightly clouded state. It is considered that this is because the amount of the quaternary ammonium salt was smaller as compared with that in the case of Synthesis Example 1, and therefore the water-solubility was lowered. However, the obtained polymer solution (A2-C2) exhibited water-solubility while the block A was water-insoluble, and therefore it is considered that the A-C block copolymer as intended was obtained. The polymer is referred to as A-C block copolymer-2.

Synthesis Example 3: Synthesis of A-C Block Copolymer-3

Using the same apparatus as the one used in Synthesis Example 1, a block A was formed and a polymer solution (A3) was obtained conducting polymerization in the same manner as in Synthesis Example 1 except that 365.0 parts of BDG as an organic solvent, 3.2 parts of iodine, 44.0 parts of MMA, 44.0 parts of BMA, 22.0 parts of 2-EHMA, 34.0 parts of PME200, 15.0 parts of MAA, 0.3 parts of DPM as a catalyst, and 13.5 parts of V-70 were used. The solid content of the polymer solution (A3) measured was 32.5%, and the calculated conversion was almost 100%. GPC measurement was conducted to find that the number average molecular weight was 5600, and the PDI was 1.26. Moreover, the acid value as a resin of the block A was 54.3 mgKOH/g.

Subsequently, a block C was formed and a polymer solution (A3-C3) was obtained conducting polymerization in the same manner as in Synthesis Example 1 except that a solution obtained in advance by mixing and homogenizing 42.0 parts of DMQ-1, 88.1 parts of BzMA, and 98.0 parts of BDG was added to the polymer solution (A3) obtained above, and further, 2.6 parts of V-70 were added to the resultant mixture. The solid content of the polymer solution (A3-C3) was 40.0%, and the calculated conversion was almost 100%.

GPC measurement was conducted in the same manner as in Synthesis Example 1, but was not satisfactory because the peaks were small and unclear. Moreover, when part of the polymer solution (A3-C3) was added to water, the polymer solution (A3-C3) dissolved almost transparently. Therefore, it is considered that the A-C block copolymer was obtained. The polymer is referred to as A-C block copolymer-3.

Synthesis Example 4: Synthesis of A-C Block Copolymer-4

Using the same apparatus as the one used in Synthesis Example 1, a block A was formed and a polymer solution (A4) was obtained conducting polymerization in the same manner as in Synthesis Example 1 except that 362.1 parts of BDG as an organic solvent, 3.2 parts of iodine, 44.0 parts of MMA, 44.0 parts of BMA, 22.0 parts of 2-EHMA, 34.0 parts of PME200, 15.0 parts of MAA, 0.3 parts of DPM as a catalyst, and 13.5 parts of V-70 were used. The solid content of the polymer solution (A4) measured was 31.5%, and the calculated polymerization conversion was almost 100%. The number average molecular weight obtained by GPC measurement was 5600, and the PDI was 1.25. Moreover, the acid value as a resin of the block A was 54.4 mgKOH/g.

Subsequently, a block C was formed and a polymer solution (A4-C4) was obtained conducting polymerization in the same manner as in Synthesis Example 1 except that a solution obtained in advance by mixing and homogenizing 48.2 parts of DMQ-1, 88.1 parts of BzMA, and 112.6 parts of BDG was added to the polymer solution (A4) obtained above, and further, 2.7 parts of V-70 were added to the resultant mixture. The solid content of the polymer solution (A4-C4) was 40.5%, and the calculated conversion was almost 100%.

GPC measurement was conducted in the same manner as in Synthesis Example 1, but was not satisfactory because the peaks were small and unclear. Moreover, when part of the polymer solution (A4-C4) obtained above was added to water, the polymer solution (A4-C4) exhibited water-solubility similar to the case in Synthesis Example 1. Therefore, it is considered that the A-C block copolymer as intended was obtained. The polymer is referred to as A-C block copolymer-4.

<Physical Properties of A-C Block Copolymers Obtained in Synthesis Examples 1 to 4>

The number of moles of monomers for A (the total number of monomers used for forming the block A, the same applies hereinafter.) relative to 1 mol of the polymerization initiation compound, the number of moles of monomers for C (the total number of monomers used for forming the block C, the same applies hereinafter.) relative to 1 mol of the polymerization initiation compound, the mass ratio of the block A and the block C, and the number of moles (mmol) of the quaternary ammonium salt contained in 1 g of the A-C block copolymer were calculated for each of the A-C block copolymers obtained in Synthesis Examples 1 to 4. These are shown together in Table 1.

TABLE 1

Physical properties of A-C block copolymers 1 to 4 obtained in Synthesis Examples 1 to 4

| | Number of moles relative to 1 mol of polymerization initiation compound | | Mass ratio of block A and block C | Number of moles (mmol) of quaternary ammonium salt in 1 g of copolymer |
|---|---|---|---|---|
| | Monomers for A | Monomers for C | | |
| Synthesis Example 1 | 48.0 | 24.2 | 57:43 | 0.36 |
| Synthesis Example 2 | 48.0 | 22.8 | 60:40 | 0.24 |
| Synthesis Example 3 | 48.0 | 25.9 | 55:45 | 0.48 |
| Synthesis Example 4 | 48.0 | 26.6 | 54:46 | 0.54 |

Comparative Synthesis Example 1: Synthesis of Comparative Polymer Through Random Copolymerization Using the same apparatus as the one used in Synthesis Example 1, 438.9 parts of BDG, 3.2 parts of iodine, 44.0 parts of MMA, 44.0 parts of BMA, 22.0 parts of 2-EHMA, 34.0 parts of PME200, 15.0 parts of MAA, 30.1 parts of DMQ-1, 88.1 parts of BzMA, 0.3 parts of DPM as a catalyst, and 13.5 parts of V-70 were charged, and polymerization was conducted at 40° C. for 6 hours under a nitrogen stream to obtain a polymer solution (R1). The solid content of the polymer solution (R1) was 40.2%, and the calculated conversion was almost 100%. The polymer obtained above is a comparative random block copolymer obtained by conducting random copolymerization with the same composition as that of the A-C block copolymer-1 of Synthesis Example 1.

Example 1: Synthesis of Coloring Matter Polymer R-1

In a 3 L beaker, 15 parts of Acid Red 289 (hereinafter, abbreviated as AR-289, molecular weight of 676.7) and 985 parts of water were charged, and the resultant mixture was stirred and homogenized to obtain a dye solution. When a spot was made on filter paper with part of the dye solution, it was confirmed that the dye stuck through the filter paper and the dye dissolved. Next, when a mixed solution of 154.0 parts of the A-C block copolymer-1 obtained in Synthesis Example 1 and 154.0 parts of ion-exchanged water was gradually added to the dye solution, a viscosity increase was observed. After the resultant mixture was stirred continuously for 1 hour, a spot was made on filter paper with part of the resultant solution to find that the precipitation of the resin was confirmed and the bleeding of the dye was hardly observed. This is considered to be as follows. While the chloride ion of the quaternary ammonium chloride in the A-C block copolymer-1 and the sodium ion in AR-289 in the dye solution were detached as sodium chloride, the quaternary ammonium salt and the sulfonate ion in AR-289 formed a salt to insolubilize the block copolymer. That is to say, it is considered that a coloring matter was introduced into the A-C block copolymer-1 to obtain the A-B block copolymer having a structure as specified in the present invention.

When the solution was filtered, the filtrate was transparent, and even after the precipitate was washed with ion-exchanged water, the filtrate was kept transparent, which suggested that the coloring matter was bonded to the polymer. Thereafter, the precipitate was dried in a drying machine at 80° C. and then pulverized to obtain the A-B block copolymer of the present Example. The copolymer is referred to as coloring matter polymer R-1. As for the content of the coloring matter monomer unit in the coloring matter polymer R-1 in which the coloring matter is introduced into the A-B block copolymer, the coloring matter monomer unit was contained in an amount of 26.4% in the A-B block copolymer and 49.5% in the block B. Infrared absorption measurement was conducted for the coloring matter polymer with an infrared spectrophotometer (IR). The result is shown in FIG. 1. The peaks originating from A-C block copolymer-1 and the peaks originating from AR-289 were able to be confirmed.

Examples 2 and 3: Synthesis of Coloring Matter Polymers R-2 and 3

A-B block copolymers were synthesized in the same manner as in Example 1 except that A-C block copolymer-2 obtained in Synthesis Example 2 or A-C block copolymer-3 obtained in Synthesis Example 3 was used in place of A-C block copolymer-1 of Synthesis Example 1 used in Example 1. Specifically, the A-B block copolymers were synthesized in the same manner as in Example 1 except that 228.0 parts of A-C block copolymer-2 were used as Example 2 and 115.4 parts of A-C block copolymer-3 was used as Example 3. It is to be noted that, in both Examples, the amount of the polymer used was adjusted so that the quaternary ammonium salt in the A-C block copolymer might react in an almost equimolar amount to the sulfonate group contained in AR-289.

The same phenomena as those in Example 1 were observed for the A-B block copolymers obtained, and thereby it was confirmed that the A-B block copolymer as specified in the present invention was obtained in both Examples. The A-B block copolymer of Example 2 is referred to as coloring matter polymer R-2, and the A-B block copolymer of Example 3 is referred to as coloring matter polymer R-3. As for the content of the coloring matter monomer unit in the coloring matter polymer R-2, the coloring matter monomer was contained in an amount of 18.8% in the A-B block copolymer and 39.4% in the block B. Moreover, as for the content of the coloring matter monomer unit in the coloring matter polymer R-3, the coloring monomer unit was contained in the A-B block copolymer in an amount of 33.4% and 58.0% in the block B.

Example 4: Synthesis of Coloring Matter Polymer R-4

An A-B block copolymer was synthesized in the same manner as in Example 1 except that 30 parts of Acid Red 52 (hereinafter, referred to as AR-52, molecular weight of 580.6) in place of AR-289 used in Example 1, 1970 parts of water, 236.3 parts of A-C block copolymer-4 obtained in Synthesis Example 4 in place of A-C block copolymer-1 obtained in Synthesis Example 1, and 236.3 parts of ion-exchanged water were used. It is to be noted that the amount of the polymer used was adjusted so that the quaternary ammonium salt in the A-C block copolymer might react in an almost equimolar amount to the sulfonate group contained in AR-52.

The same phenomena as those in Example 1 were observed for the A-B block copolymer obtained, and thereby it was confirmed that the A-B block copolymer as specified in the present invention was obtained. The A-B block copolymer of Example 4 is referred to as coloring matter polymer R-4. As for the content of the coloring matter monomer unit in the coloring matter polymer R-4, the coloring matter monomer was contained in an amount of 36.3% in the A-B block copolymer and 62.8% in the block B.

Example 5: Synthesis of Coloring Matter Polymer B-1

In a 3 L beaker, 15 parts of Direct Blue 86 (hereinafter, abbreviated as DB-86, molecular weight of 780.2) and 985 parts of water were charged, and the resultant mixture was stirred and homogenized to obtain a dye solution. A spot made on filter paper with the dye solution struck through the filter paper, and thereby it was confirmed that the dye dissolved. Next, when a mixed solution of 196.2 parts of A-C block copolymer-2 obtained in Synthesis Example 2 and 196.2 parts of ion-exchanged water was gradually added to the dye solution, a viscosity increase was confirmed similarly as in the case of Example 1. When a spot was made on filter paper with the resultant mixture after stirring for 1 hour, the precipitation of the resin was able to be confirmed. Bleeding was hardly observed, and it is considered that most of coloring matters were reacted. That is to say, it is considered that a coloring matter molecule of DB-86 was introduced into the block C and the A-B block copolymer having a structure as specified in the present invention was produced. The block copolymer is referred to as coloring matter polymer B-1. As for the content of the coloring matter monomer unit in the coloring matter polymer B-1, the coloring matter monomer unit was contained in an amount of 20.7% in the A-B block copolymer and 42.3% in the block B. Infrared absorption measurement was conducted for the coloring matter polymer with an infrared spectrophotometer (IR). The result is shown in FIG. 2. The peaks originating from A-C block copolymer-2 and the peaks originating from DB-86 were able to be confirmed.

Example 6: Synthesis of Coloring Matter Polymer Y-1

In a 3 L beaker, 15 parts of Direct Yellow 142 (hereinafter, abbreviated as DY-142, molecular weight of 794.7) and 985 parts of water were charged, and the resultant mixture was stirred and homogenized to obtain a dye solution. A spot made on filter paper with the dye solution struck through the filter paper, and thereby it was confirmed that the dye dissolved. Next, when a mixed solution of 98.6 parts of A-C block copolymer-3 obtained in Synthesis Example 3 and 98.6 parts of ion-exchanged water was gradually added to the dye solution, a viscosity increase was confirmed similarly as in the case of Example 1. When a spot was made on filter paper with the resultant mixture after stirring for 1 hour, the precipitation of the resin was able to be confirmed. Bleeding was hardly observed, and it is considered that most of coloring matters were reacted. That is to say, it is considered that a coloring matter molecule of DY-142 was introduced into the block C and the A-B block copolymer having a structure as specified in the present invention was produced. The block copolymer is referred to as coloring matter polymer Y-1. Infrared absorption measurement was conducted for the coloring matter polymer Y-1 polymer with an infrared spectrophotometer (IR). The result is shown in FIG. 3. As for the content of the coloring matter monomer unit in the coloring matter polymer Y-1, the coloring matter monomer unit was contained in an amount of 36.1% in the A-B block copolymer and 60.8% in the block B. From the measurement result of IR shown in FIG. 3, the peaks originating from A-C block copolymer-3 and the peaks originating from DY-142 were able to be confirmed.

The compositions etc. were shown together in Table 2 for respective coloring matter polymers obtained in Examples 1 to 6.

TABLE 2

Compositions and physical properties of coloring matter polymers of Examples

| | Coloring matter polymer | Components used for reaction | | Content of coloring matter monomer unit | |
|---|---|---|---|---|---|
| | | A-C block copolymer | Dye | in A-B block copolymer | in block B |
| Example 1 | R-1 | -1 (Synthesis Example 1) | AR-289 | 26.4% | 49.5% |
| Example 2 | R-2 | -1 (Synthesis Example 1) | AR-289 | 18.8% | 39.4% |
| Example 3 | R-3 | -1 (Synthesis Example 1) | AR-289 | 33.4% | 58.0% |
| Example 4 | R-4 | -4 (Synthesis Example 4) | AR-52 | 36.3% | 62.8% |
| Example 5 | B-1 | -2 (Synthesis Example 2) | DB-86 | 20.7% | 42.3% |
| Example 6 | Y-1 | -3 (Synthesis Example 3) | DY-142 | 36.1% | 60.8% |

Synthesis Example 5: Synthesis of A-C Block Copolymer-5

Using the same apparatus as the one used in Synthesis Example 1, 355.4 parts of triethylene glycol monobutyl ether (hereinafter, abbreviated as BTG) as an organic solvent, 99 parts of BzMA, 22.7 parts of MAA, 0.22 parts of N-iodo succinic acid imide, 1.5 parts of iodine, and 6.5 parts of V-70 were charged, and polymerization was conducted for 5 hours in the same manner as in Synthesis Example 1 to form a block A and obtain a polymer solution (A5). The solid content of the polymer solution (A5) measured was 26.3%, and the calculated polymerization conversion was almost 100%. Moreover, the number average molecular weight was 6800, and the PDI was 1.23. Further, the acid value as a resin, when measured in the same manner as in Synthesis Example 1, was 121.7 mgKOH/g. Furthermore, when the polymer solution (A5) was added to water, precipitation was confirmed, and thereby it was confirmed that the polymer was water-insoluble.

Subsequently, 25.4 parts of DMQ-1, 59.54 parts of BTG, and 79.2 parts of BzMA were charged in the polymer solution (A5) obtained above, and thereafter polymerization was conducted for 4 hours in the same manner as in Synthesis Example 1 to form a block C and obtain a polymer solution (A5-05). The solid content of the polymer solution (A5-05) was 40.0%, and the calculated conversion was almost 100%. The molecular weight was unclear, and exact measurement of the molecular weight was not able to be conducted. Moreover, when the polymer solution (A5-05) was added to water, it was confirmed that the polymer was dispersed in a fine particle form to make the resultant liquid semitransparent. It is considered that the block A formed a water-insoluble fine particle and the block C dissolved in water. The polymer is referred to as A-C block copolymer-5.

Synthesis Example 6: Synthesis of A-C Block Copolymer-6

Polymerization was conducted to form a block A in the same manner as in Synthesis Example 5 using MAA as a monomer for forming the block A except that the amount of MAA was reduced by half. The polymerization conversion was almost 100%, the polymer obtained had a number average molecular weight of 5600 and a PDI of 1.19. The acid value as a resin was 61.0 mgKOH/g.

Subsequently, polymerization was conducted with the same composition as in Synthesis Example 5 to form a block C and obtain a polymer solution (A6-C6). The solid content of the polymer solution (A6-C6) was 40.2%, and it was confirmed that polymerization had completed almost 100%. The molecular weight was unclear. Moreover, when the polymer solution (A6-C6) was added to water, it was confirmed that the polymer was dispersed in a fine particle form to make the resultant liquid semitransparent. The polymer is referred to as A-C block copolymer-6.

Synthesis Example 7: Synthesis of Block Copolymer-7

Polymerization was conducted to form a block A in the same manner as in Synthesis Example 5 using MAA as a monomer for forming the block A except that the amount of MAA was doubled. The polymerization conversion was almost 100%, and the polymer obtained had a number average molecular weight of 7800 and a PDI of 1.35. The acid value as a resin was 205.0 mgKOH/g.

Subsequently, polymerization was conducted with the same composition as in Synthesis Example 5 to form a block C and obtain a polymer solution (A7-C7). The solid content of the polymer solution (A7-C7) was 40.2%, and it was confirmed that polymerization had completed almost 100%. The molecular weight was unclear. Moreover, when the polymer solution (A7-C7) was added to water, it was confirmed that the polymer was dispersed in a fine particle form to make the resultant liquid semitransparent. The polymer is referred to as A-C block copolymer-7.

The acid value of the block A, the number of monomers for A relative to 1 mol of the polymerization initiation compound, the number of monomers for C relative to 1 mol of the polymerization initiation compound, the mass ratio of the block A and the block C, the number of moles (mmol) of the quaternary ammonium salt contained in 1 g of the A-C block copolymer were calculated for Synthesis Examples 5 to 7. These are shown together in Table 3.

TABLE 3

Physical properties of A-C block copolymers 5 to 7 obtained in Synthesis Examples 5 to 7

| | Acid value of block A (mgKOH/g) | Number of moles relative to 1 mol of polymerization initiation compound | | Mass ratio of block A and block C | Number of moles (mmol) of quaternary ammonium salt in 1 g of copolymer |
|---|---|---|---|---|---|
| | | Monomers for A | Monomers for C | | |
| Synthesis Example 5 | 121.7 | 69.7 | 45.5 | 53.7:46.3 | 0.40 |

TABLE 3-continued

Physical properties of A-C block copolymers 5 to 7 obtained in Synthesis Examples 5 to 7

| | Acid value of block A (mgKOH/g) | Number of moles relative to 1 mol of polymerization initiation compound | | Mass ratio of block A and block C | Number of moles (mmol) of quaternary ammonium salt in 1 g of copolymer |
|---|---|---|---|---|---|
| | | Monomers for A | Monomers for C | | |
| Synthesis Example 6 | 61.0 | 58.7 | 45.5 | 51.3:48.7 | 0.42 |
| Synthesis Example 7 | 205.0 | 92.0 | 45.5 | 58:42 | 0.36 |

Example 7: Preparation of Treated Blue Pigment-1

In a 5 L flask, 347.2 parts (100 parts in terms of the pigment content) of water paste of micronized PB-15:6 (A-037, manufactured by Dainichiseika Color & Chemicals Mfg. Co., Ltd., solid content of 28.8%, average primary particle diameter of 30 nm) and 5.0 parts of copper phthalocyanine monosulfonic acid (molecular weight of 656.1, hereinafter written as MS) were charged and diluted with water so that the pigment concentration might be 5%. The MS used in the present Example acts as a synergist for the pigment and also acts as a sulfonate group-containing coloring matter that characterizes the present invention. Subsequently, 15.0 parts of AR-289 were added under stirring with a homogenizer, and the resultant mixture was stirred and peptized at 5000 rpm for 1 hour to obtain a pigment-containing coloring matter solution. Part of the coloring matter solution was taken to make a spot on filter paper.

Subsequently, a mixed solution of 205.5 parts of A-C block copolymer-1 obtained in Synthesis Example 1 and 205.5 parts of ion-exchanged water was gradually added to the pigment-containing coloring matter solution prepared above. It was able to be confirmed that the viscosity of the resultant mixture increased at a certain point of time and then decreased. It is considered that the viscosity increase occurred because of the following reason. A-C block copolymer-1, which had a quaternary ammonium salt and dissolved in water, exchanged salts with the sulfonates contained in AR-289 and in the MS to turn the block C into the block B, and the block B precipitated on the surface of the pigment. Therefore, the surface of the pigment had hydrophobicity that originated from the A-B block copolymer and the fluidity was lost. Subsequently, after the resultant mixture was stirred continuously for 1 hour, part of the result mixture was taken as a sample to make a spot on filter paper. The result was shown in FIG. 4 together with the result obtained after peptizing.

The left side of FIG. 4 shows a spot made after peptizing, and it is understood that the pigment exists in the center, and AR-289 bleeds around the pigment. The right side of FIG. 4 shows a spot made after adding A-C block copolymer-1, and it clearly shows that AR-289 did not bleed. It is considered from these facts that A-C block copolymer-1 and AR-289 exchanged salts to insolubilize the dye, thereby producing the A-B block copolymer as specified in the present invention and the pigment was treated with the A-B block copolymer.

Subsequently, the solution was filtered and the product was washed. The filtration speed was fast, and the filtrate and washing liquid had no coloration. Also from the result, it is inferred that the A-B block copolymer was produced. Subsequently, the product was dried at 80° C. for 24 hours, and the dried product was pulverized with a mill.

The resultant pulverized product was obtained with a theoretical yield of about 100%, as will be described later, relative to 100 parts of the pigment used, and is a resin-treated pigment in which the pigment is treated with the A-B block copolymer, the resin-treated pigment obtained by reacting the MS and AR-289 as a coloring matter with A-C block copolymer-1 to eliminate counter ions as sodium chloride. In the above example, the quaternary ammonium salt in A-C block copolymer-1 was reacted with the sulfonate group in the MS and AR-289 under an almost equimolar condition. The resin-treated pigment is referred to as treated blue pigment-1.

In the treated blue pigment-1 obtained above, the coloring matter monomer unit that characterizes the present invention and that is represented by formula (1) is contained in a high ratio, as high as in an amount of 26.5% in the A-B block copolymer and 49.8% in the block B. The ratio of the A-B block copolymer-1 used for treating relative to 100 parts of the pigment is 101.2%, and the pigment content in the resin-treated pigment obtained is 49.7%. All of these contents are theoretically calculated values. This will be briefly described below.

The total amount of the sulfonate group is 29.8 mmol because 5 g (in the description hereinafter, the number of parts is regarded as "the number of g (grams)") of the MS used is equivalent to 7.6 mmol, and similarly, AR-289 is used in an amount of 22.2 mmol (15 g). On the other hand, the A-C block copolymer is used in an amount of 82.8 g as a polymer, and therefore the amount of the quaternary ammonium salt contained in the polymer is 29.8 mmol, which is an equimolar amount to the total amount of the sulfonate group in the MS and AR-289. When the quaternary ammonium salt and the sulfonic group are reacted, the amount of eliminated hydrogen chloride originating from the MS is 7.6 mmol (0.28 g), the amount of eliminated sodium chloride originating from AR-289 is 22.2 mol (1.30 g), and 1.58 g of the weight is reduced in total. Accordingly, the amount of the A-B block copolymer is 5+15+82.8−0.28−1.30=101.2 g, namely 100 parts of the pigment are treated with about 101.2 parts of A-B block copolymer-1. As a result, the ratio of the pigment contained in the treated pigment is 49.7% as described above.

On the other hand, with respect to the coloring matter monomer unit represented by formula (1) in the A-B block copolymer obtained through the reaction, the molecular weight of the methacrylate obtained through reaction with the MS (hereinafter, written as methacrylate with MS) is 903.4, and the molecular weight of the methacrylate obtained through reaction with AR-289 (hereinafter, written as methacrylate with AR-289) is 902.1. All of the MS and AR-289 are reacted with the A-C block copolymer in Example 7, the MS and AR-289 are introduced into the resultant A-B block copolymer in an amount equal to the total number of moles of the MS and AR-289 used. That is to say, 6.9 g of the methacrylate with MS and 20.0 g of the methacrylate with AR-289 are introduced in the A-B block copolymer to make the weight of the coloring matter-containing methacrylate 26.9 g in total. As described above, the weight of the A-B block copolymer obtained was 101.2 g, and therefore the amount of the coloring matter-containing methacrylate (coloring matter monomer unit) contained in the A-B block copolymer is 26.5%.

Moreover, the ratio of the block A and the block C is 57:43 in the A-C block copolymer (solid content of 40.3%) used in Example 7, and therefore the amount of the block A contained in the A-C block copolymer (205.5 g) used is 47.2 g. The content of the block A in the A-B block copolymer is the same as in the A-C block copolymer and is 47.2 g, and accordingly, the content of the block B in 101.2 g of the A-B block copolymer produced is 54.0 g. The amount of the coloring matter-containing methacrylate is 26.9 g, and therefore the ratio of the coloring matter monomer unit in the block B is 26.9÷54.0×100=49.8%. Hereinafter, calculations were conducted in the same manner.

Example 8: Preparation of Treated Blue Pigment-2

A resin-treated pigment was prepared to obtain a pulverized product in the same manner as in Example 7 except that 306.6 parts of A-C block copolymer-2 (solid content of 40.5%) obtained in Synthesis Example 2 were used in place of A-C block copolymer-1 obtained in Synthesis Example 1. As a result, the phenomena similar to those in Example 7 were observed, and thereby it was able to be confirmed that the pigment was treated with the A-B block copolymer.

According to the theoretical calculation similar to that in Example 7, the resin-treated pigment obtained is a pigment treated with theoretically about 142.6% of the A-B block copolymer relative to 100 parts of the pigment. Moreover, also in the example described above, the quaternary ammonium salt in A-C block copolymer-2 was reacted with the sulfonate group in the MS and AR-289 under an almost equimolar condition. The resin-treated pigment is referred to as treated blue pigment-2.

Examples 9 to 11: Preparation of Treated Blue Pigments-3 to 5

Resin-treated pigments (pulverized products) of Examples 9 to 11 were prepared in the same manner as in Example 7 except that A-C block copolymer-3 (solid content of 40.0%) obtained in Synthesis Example 3 was used in the respective amounts as described below in place of A-C block copolymer-1 obtained in Synthesis Example 1. Specifically, A-C block copolymer-3 obtained in Synthesis Example 3 was used in an amount of 155.2 parts in Example 9, 194.0 parts in Example 10, and 232.8 parts in Example 11. In any of the Examples, the phenomena similar to those in Example 7 were observed, and thereby it was able to be confirmed that a resin-treated pigment in which the pigment was treated with the A-B block copolymer and in which the ratio of the A-B block copolymer was high was produced.

According to the theoretical calculation similar to that in Example 7, the resin-treated pigment obtained in Example 9 is a pigment treated with theoretically about 80.5 parts (80.5%) of the A-B block copolymer relative to 100 parts of the pigment. Moreover, also in this example, the quaternary ammonium salt in the A-C block copolymer was reacted with the sulfonate group in the MS and AR-289 under an almost equimolar condition. The resin-treated pigment is referred to as treated blue pigment-3.

According to the theoretical calculation similar to that in Example 7, the resin-treated pigment obtained in Example 10 is a pigment treated with theoretically about 96.0 parts (96.0%) of the A-B block copolymer relative to 100 parts of the pigment. In this example, the quaternary ammonium salt in the A-C block copolymer was reacted with the sulfonate group in AR-289 under a condition that the amount of the quaternary ammonium salt in the A-C block copolymer was 1.25 mol times more excessive than the amount of the sulfonate group in AR-289, and therefore the quaternary ammonium salt was left unreacted. The resin-treated pigment is referred to as treated blue pigment-4.

According to the theoretical calculation similar to that in Example 7, the resin-treated pigment obtained in Example 11 is a pigment treated with theoretically about 111.6 parts (111.6%) of the A-B block copolymer relative to 100 parts of the pigment. In this example, the quaternary ammonium salt in the A-C block copolymer was reacted with the sulfonate group in AR-289 under a condition that the amount of the quaternary ammonium salt in the A-C block copolymer was 1.5 mol times more excessive than the amount of the sulfonate group in AR-289, and therefore the quaternary ammonium was left unreacted. The resin-treated pigment is referred to as treated blue pigment-5.

Example 12: Preparation of Treated Blue Pigment-6

A resin-treated pigment was prepared to obtain a pulverized product in the same manner as in Example 7 except that 30 parts of AR-52 in place of AR-289 used in Example 7 and 236.3 parts of A-C block copolymer-4 (solid content of 40.5%) obtained in Synthesis Example 4 in place of A-C block copolymer-1 obtained in Synthesis Example 1 were used. As a result, the phenomena similar to those in Example 7 were observed, and thereby it was able to be confirmed that the pigment was treated with the A-B block copolymer.

According to the theoretical calculation similar to that in Example 7, the resin-treated pigment obtained is a pigment treated with theoretically about 127.4% of the A-B block copolymer relative to 100 parts of the pigment. In this example, the quaternary ammonium salt in the A-C block copolymer was reacted with the sulfonate group in the MS and AR-52 under an almost equimolar condition. The resin-treated pigment is referred to as treated blue pigment-6.

In the treated blue pigment-6 obtained above, the coloring matter monomer unit that characterizes the present invention and that is represented by formula (1) is contained in an amount of 38.1% in the A-B block copolymer and 64.1% in the block B according to the theoretical calculation similar to that in Example 7, and the pigment content in the resin-treated pigment obtained is 44.0%. All of these contents are theoretically calculated values.

Example 13: Preparation of Treated Red Pigment-1

In a 5 L flask, 421.9 parts (100 parts in terms of the pigment content) of water paste of PR 254 pigment (solid content of 23.7%, average particle diameter of 30 nm) obtained by micronizing a PR-254 pigment (trade name: Irgazin Red L3630, manufactured by BASF SE) and 5.0 parts of a monosulfonated PR-254 (molecular weight of 371.2, hereinafter written as 254S) were charged and diluted with water so that the pigment concentration might be 5% to obtain a pigment-containing coloring matter solution. The 254S used above actions as a synergist for the pigment and also functions as a sulfonate group-containing coloring matter that characterizes the present invention. AR-52 was added in an amount of 15.0 parts under stirring with a homogenizer, and the resultant mixture was stirred and peptized at 5000 rpm for 1 hour.

Subsequently, a mixed solution of 179.7 parts of A-C block copolymer-4 obtained in Synthesis Example 4 and 179.7 parts of ion-exchanged water was gradually added to the pigment-containing coloring matter solution prepared above. The phenomena similar to those in Example 7 were observed, and thereby it was able to be confirmed that the pigment was treated with the A-B block copolymer. The resin-treated pigment was filtered, washed, and then dried at 80° C. for 24 hours, and the dried product was pulverized with a mill.

According to the theoretical calculation similar to that in Example 7, the resin-treated pigment obtained is a pigment treated with theoretically about 90.7 parts of the A-B block copolymer relative to 100 parts of the pigment. Moreover, also in the example described above, the quaternary ammonium salt in A-C block copolymer-4 was reacted with the sulfonate group of the 254S and AR-52 under an almost equimolar condition. The resin-treated pigment is referred to as treated red pigment-1.

In the treated red pigment-1 obtained above, the coloring matter monomer unit that characterizes the present invention and that is represented by formula (1) is contained in an amount of 32.1% in the A-B block copolymer and 55.1% in the block B according to the theoretical calculation similar to that in Example 7, and the pigment content in the resin-treated pigment obtained is 52.4%. All of these contents are theoretically calculated values.

Comparative Example 1: Preparation of Comparative Treated Blue Pigment-1

A resin-treated pigment of Comparative Example was prepared in the same manner as in Example 7 except that the comparative random block copolymer solution the composition of which was the same with that of Synthesis Example 1, the solution obtained in Comparative Synthesis Example 1, was used. The phenomena similar to that in Example 7 were observed, and thereby it was confirmed that resin treatment of a pigment was able to be conducted even with a random copolymer, and from that, it was also confirmed that the action of the reaction itself, namely the action of eliminating a salt similarly occurred also in the case where a random copolymer was used and the treatment of a pigment was able to be conducted. The resin-treated pigment is referred to as comparative treated blue pigment-1.

Comparative Example 2: Preparation of Comparative Treated Blue Pigment-2

Treatment was conducted in the same manner as in Example 12 except that 46.3 parts of distearyl dimethylammonium chloride (trade name: QUARTAMIN D86P, active ingredients of 75%, molecular weight of 586.5, manufactured by Kao Corporation) were used in place of A-C block copolymer-4 obtained in Synthesis Example 4. As a result, the phenomena similar to those in Example 12 were observed, and thereby it was able to be confirmed that the pigment together with the dye was treated According to the theoretical calculation similar to that in Example 12, the treated pigment obtained is a pigment treated with theoretically about 34.7 parts of distearyl dimethylammonium chloride relative to 100 parts of the pigment. Moreover, also in the example described above, distearyl dimethylammonium chloride was reacted with the sulfonate group in the MS and AR-52 under an almost equimolar condition. The resin-treated pigment is referred to as comparative treated blue pigment-2.

In comparative treated blue pigment-2 obtained above, the pigment content in the resin treated pigment obtained is 60.1%. The content is a theoretically calculated value.

Comparative Example 3: Preparation of Comparative Treated Blue Pigment-3

A resin-treated pigment was prepared to obtain a pulverized product in the same manner as in Example 12 except that 136.0 parts of Disperbyk-2000 (acrylic block copolymerized product, manufactured by BYK Japan KK, 1.09 mmol/g of quaternary ammonium salt, solid content of 40.0%) was used in place of A-C copolymer-4 obtained in Synthesis Example 4. It was able to be confirmed that the pigment was treated with Disperbyk-2000.

According to the theoretical calculation similar to that in Example 12, the treated pigment obtained is a pigment treated with theoretically about 54.4% of Disperbyk-2000 relative to 100 parts of the pigment. Moreover, also in the example described above, Disperbyk-2000 was reacted with the sulfonate group in the MS and AR-52 under an almost equimolar condition. The resin-treated pigment is referred to as comparative treated blue pigment-3.

In comparative treated blue pigment-3 obtained above, the pigment content in the resin treated pigment obtained is 53.7%. The content is a theoretically calculated value.

The content of the coloring matter-containing methacrylate (coloring matter monomer unit), which characterizes the present invention and which is represented by formula (1), contained in the A-B block copolymer and in the block B, the ratio of the A-B block copolymer (coloring matter polymer) to the pigment, and the ratio of a component originating from the pigment contained in the resin-treated pigment were calculated for the respective resin-treated pigments of Examples 6 to 12 and Comparative Examples 1 to 3. The theoretically calculated value obtained were shown together in Table 4. It is to be noted that the ratio in the random copolymer is described for Comparative Example 1. Moreover, as for Comparative Example 2, the ratio of the treated pigment treated with the low-molecular weight quaternary ammonium is described, and as for Comparative Example 3, the ratio of the treated pigment treated with a commercially available acrylic block copolymerized product having a quaternary ammonium salt is described.

TABLE 4-1

Properties of resin-treated pigments of Examples

|  | Example 7 | Example 8 | Example 9 | Example 10 | Example 11 | Example 12 | Example 13 |
|---|---|---|---|---|---|---|---|
| Amount (%) of coloring matter monomer unit in A-B block copolymer | 26.6 | 18.9 | 33.4 | 28.0 | 24.1 | 38.1 | 32.1 |

TABLE 4-1-continued

Properties of resin-treated pigments of Examples

| | Example 7 | Example 8 | Example 9 | Example 10 | Example 11 | Example 12 | Example 13 |
|---|---|---|---|---|---|---|---|
| Amount (%) of coloring matter monomer unit in block B | 49.8 | 39.5 | 58.1 | 50.5 | 44.6 | 64.1 | 55.1 |
| Amount (parts) of coloring matter polymer relative to 100 parts of pigment | 101.2 | 142.6 | 80.5 | 96.0 | 111.6 | 127.4 | 90.7 |
| Amount (%) of pigment contained in resin-treated pigment | 49.7 | 41.2 | 55.4 | 51.0 | 47.3 | 44.0 | 52.4 |

TABLE 4-2

Properties of resin-treated pigments of Comparative Examples

| | Comparative Example 1 | Comparative Example 2 | Comparative Example 3 |
|---|---|---|---|
| Amount (%) of coloring matter monomer unit in A-B block copolymer | 26.6 | — | — |
| Amount (%) of coloring matter monomer unit in block B | 49.8 | — | — |
| Amount (parts) of coloring matter polymer relative to 100 parts of pigment | 101.2 | — | — |
| Amount (%) of pigment contained in resin-treated pigment | 49.7 | 60.1 | 53.7 |

Application Examples: Coloring Agents for Color Filters

Each of resin-treated pigments obtained in Examples 7 to 13 and Comparative Examples 1 to 3 was blended in an amount (parts) as shown in Table 5 and then stirred with a dissolver for 2 hours. After it was confirmed that the lumps of pigments disappeared, the resultant mixture was subjected to dispersion treatment with a horizontal media disperser "DYNO-Mill 0.6-L ECM model" (trade name, manufactured by Shinmaru Enterprises Corporation, zirconia bead: diameter of 0.65 mm) at a peripheral speed of 10 m/s to prepare each pigment dispersion liquid. Pigment dispersion liquids obtained were used as Application Examples 1 to 7 and Comparative Application Examples 1 to 3. Moreover, as an example simulating a usual dispersion of a publicly known coloring agent, PB-15:6 (hereinafter, referred to as comparative blue pigment) that was treated with 5% of copper phthalocyanine monosulfonic acid was used and dispersed in the same manner as used conventionally, and the dispersion obtained was used as Comparative Application Example 4. The formulations of the pigment dispersion liquids are shown together in Table 5. It is to be noted that the composition of Comparative Application Example 4 is shown in Table 5-2.

TABLE 5-1

Preparation of pigment dispersion liquids of Application Examples [unit: part]

| | Application Examples | | | | | | |
|---|---|---|---|---|---|---|---|
| | 1 | 2 | 3 | 4 | 5 | 6 | 7 |
| Treated blue pigment-1 (Example 7) | 30.0 | | | | | | |
| Treated blue pigment-2 (Example 8) | | 36.1 | | | | | |
| Treated blue pigment-3 (Example 9) | | | 27.0 | | | | |
| Treated blue pigment-4 (Example 10) | | | | 29.3 | | | |
| Treated blue pigment-5 (Example 11) | | | | | 31.6 | | |
| Treated blue pigment-6 (Example 12) | | | | | | 34.1 | |
| Treated red pigment-1 (Example 13) | | | | | | | 28.6 |
| PGMAc*[1] | 70.0 | 63.9 | 73.0 | 70.7 | 68.4 | 65.9 | 71.4 |
| Total | 100 | 100 | 100 | 100 | 100 | 100 | 100 |

*[1]Propylene glycol monomethyl ether

TABLE 5-2

Preparation of pigment dispersion liquids of Comparative Application Examples [unit: part]

| | Comparative Application Examples | | | |
|---|---|---|---|---|
| | 1 | 2 | 3 | 4 |
| Comparative treated blue pigment-1 (Comparative Example 1) | 30.0 | | | |
| Comparative treated blue pigment-2 (Comparative Example 2) | | 25.0 | | |
| Comparative treated blue pigment-3 (Comparative Example 3) | | | 27.9 | |
| Comparative blue pigment | | | | 15.0 |
| Pigment dispersant solution: BYK-21116*[1] | | | | 11.3 |
| Acrylic resin solution*[2] | | | | 7.5 |
| PGMAc*[3] | 70.0 | 75.0 | 72.1 | 65.2 |
| Total | 100 | 100 | 100 | 100 |

*[1]PGMAc solution manufactured by BYK-Chemie GmbH, solid content of 40%, amine value of 30 mgKOH/g, acid value of 0 mgKOH/g
*[2]Copolymer of benzyl methacrylate/methacrylic acid/2-hydroxyethyl methacrylate (Number average molecular weight = 8000 and PDI = 2.03, acid value = 97.8 mgKOH/g, PGMAc solution, solid content of 40%, used as alkali developable binder)
*[3]Propylene glycol monomethyl ether In Table 6, the measurement results of the number average particle diameter of the pigment contained in the pigment dispersion liquid, and the measurement results of the initial viscosity of the pigment dispersion liquid and the viscosity after the pigment dispersion liquid was left to stand at 45° C. for 10 days (after storage) for respective pigment dispersion liquids of Application Examples described above are shown together. It is to be noted that the number average particle diameter was measured with a particle size measuring apparatus "NICOMP 380ZLS-S" (trade name, manufactured by Particle Sizing Systems). Hereinafter, the measurement of the number average particle diameters was conducted in the same manner.

in usual coloring agents, namely the pigment dispersion liquid of Comparative Application Example 4, in which a pigment was subjected to dispersion treatment with a usual pigment dispersant. Besides, it was confirmed that when the resin-treated pigment of Examples according to the present

TABLE 6

Physical properties of respective pigment dispersion liquids

| | Application Examples | | | | | | | Comparative Application Examples | | | |
|---|---|---|---|---|---|---|---|---|---|---|---|
| | 1 | 2 | 3 | 4 | 5 | 6 | 7 | 1 | 2 | 3 | 4 |
| Number average particle diameter (nm) | 42 | 41 | 39 | 40 | 42 | 35 | 32 | 120 | 167 | 38 | 38 |
| Initial viscosity (mPa · s) | 7.9 | 8.9 | 8.6 | 9.4 | 10.6 | 9.5 | 8.3 | 352 | Unmeasurable | 10.3 | 7.9 |
| Viscosity after storage (mPa · s) | 7.9 | 8.7 | 8.5 | 9.0 | 10.1 | 9.0 | 8.1 | Unmeasurable | Unmeasurable | Unmeasurable | 7.6 |

Unmeasurable: indicating that the dispersion liquid exhibited no fluidity and therefore the viscosity was not able to be measured As shown in Table 6, the pigment dispersion liquids using the resin-treated pigment of Examples according to the present invention exhibited satisfactory dispersibility and storage stability. On the other hand, it was confirmed that the resin-treated pigment of Comparative Example 1 had a random structure and therefore was not able to exhibit the same effects as those exhibited in the case where a resin-treated pigment of Examples according to the present invention was used although the resin treatment was possible. It is considered that this is because the resin-treated pigment of Comparative Example 1 has a random structure and therefore a polymer molecule is adsorbed to the pigment over a plurality of particles or, conversely, a polymer molecule aggregates the pigments. Moreover, it was able to be confirmed that the pigment in Comparative Application Example 2 was not treated with the A-B block copolymer according to the present invention, further, a pigment dispersant was not added, and therefore the dispersibility was poor, the dispersion liquid did not exhibit fluidity at all even in the initial state, and the pigment was not able to be dispersed. It was understood that, in Comparative Application Example 3, the A-B block copolymer according to the present invention was not used, but a commercially available acrylic block copolymerized product was used, and therefore the initial viscosity of the dispersion liquid was satisfactory, about 10 mPa·s; however, the storage stability was poor because the fluidity was lost after storage. Accordingly, in Comparative Application Examples, it was suggested that use of a pigment dispersant or a dispersing resin together with the pigment was essential.

As shown in Table 6, it was confirmed that the pigment dispersion liquid using a resin-treated pigment in which a pigment was treated with the coloring matter block copolymer according to the present invention was able to achieve the same dispersion stability and storage stability as those exhibited in the case of the pigment dispersion liquid used invention was used, a pigment was able to be finely dispersed and the stability of the dispersed pigment was able to be maintained without adding an acrylic resin solution used in Comparative Application Example 4 as a dispersing resin. Moreover, it was understood from the results of Application Examples 3 to 7 that when the quaternary ammonium salt was left in a large amount, there was a tendency that the viscosity became slightly high. However, the storage stability was satisfactory, and therefore there was no problem.

Moreover, as shown in Table 6, it was confirmed that any of the average particle diameters of respective pigments contained pigment dispersion liquids of Application Examples each using a resin-treated pigment of Examples according to the present invention was about 50 nm or smaller and the micronized pigments were sufficiently and finely dispersed. Moreover, the initial viscosity was around 10 mPa·s for any of the dispersion liquids of Application Examples, and it is clear that the change in viscosity is small when the initial viscosity and the viscosity after storage are compared. As a result, it was confirmed that any of the pigment dispersion liquids of Application Examples had a sufficient stability.

Application Examples 8 to 11 and Comparative Application Examples 5 and 6: Preparation of Pigment Coloring Agents for Pseud Color Filter Next, each of pigment dispersion liquids obtained in Application Examples 1 and 2, and 6 and 7, and Comparative Application Examples 4 and 3 was used and blended in an amount (parts) as shown in Table 7, and the resultant mixture was sufficiently mixed with a mixer to obtain blue and red pigment coloring agents (pseud color resists) for a pseud color filter.

TABLE 7

Preparation of pigment coloring agents for pseud color filter [unit: part]

| | Application Example 8 | Application Example 9 | Application Example 10 | Application Example 11 | Comparative Application Example 5 | Comparative Application Example 6 |
|---|---|---|---|---|---|---|
| Blue pigment dispersion liquid of Application Example 1 | 66.6 | | | | | |

TABLE 7-continued

Preparation of pigment coloring agents for pseud color filter [unit: part]

| | Application Example 8 | Application Example 9 | Application Example 10 | Application Example 11 | Comparative Application Example 5 | Comparative Application Example 6 |
|---|---|---|---|---|---|---|
| Blue pigment dispersion liquid of Application Example 2 | | 66.6 | | | | |
| Blue pigment dispersion liquid of Application Example 6 | | | 66.6 | | | |
| Red pigment dispersion liquid of Application Example 7 | | | | 66.6 | | |
| Blue pigment dispersion liquid of Comparative Application Example 4 | | | | | 66.6 | |
| Blue pigment dispersion liquid of Comparative Application Example 3 | | | | | | 66.6 |
| Photosensitive acrylic resin varnish | 8.8 | 0 | 8.8 | 8.8 | 21.2 | 21.2 |
| TMPTA | 5 | 4.5 | 5 | 5 | 5 | 5 |
| HEMPA | 1 | 1 | 1 | 1 | 1 | 1 |
| DEAP | 0.5 | 0.5 | 0.5 | 0.5 | 0.5 | 0.5 |
| PGMAc | 18.1 | 27.4 | 18.1 | 18.1 | 5.7 | 5.7 |
| Total | 100 | 100 | 100 | 100 | 100 | 100 |

It is to be noted that a varnish containing an acrylic resin obtained by reacting glycidyl methacrylate with a BzMA/MAA copolymerized product was used for the "photosensitive acrylic resin varnish" in Table 7. The acrylic resin had an Mn of 6000, a PDI of 2.38, and an acid value of 110 mgKOH/g. Moreover, in Table 7, the "TMPTA" represents trimethylolpropane triacrylate, the "HEMPA" represents 2-hydroxyethyl-2-methyl propionic acid, and the "DEAP" represents 2,2-diethoxyacetophenone.

Next, a glass substrate treated with a silane coupling agent was set in a spin coater. The glass substrate was spin-coated with each of the pigment coloring agents for a pseud color filter prepared in Application Examples 8 to 11 and Comparative Application Examples 5 ant 6 under the condition of 300 rpm for 5 seconds. The glass substrate coated with the pigment coloring agent was pre-baked at 120° C. for 10 minutes, and then exposed with a light quantity of 100 mJ/cm$^2$ using an ultrahigh pressure mercury lamp to obtain each blue glass substrate.

Any of the respective glass plates (hereinafter, written as color glass substrates) obtained had an excellent spectroscopic curve. FIG. 5 shows spectroscopic curves of a coating film of Comparative Application Example 5 using the comparative blue pigment of Comparative Application Example 2 and coating films of Application Examples 8 and 9 each using a resin-treated pigment according to the present invention. As a result, as shown in FIG. 5, the absorption originating from the coloring matter block copolymers according to the present invention was confirmed.

Moreover, the glass substrates before exposure were left to stand at 250° C. for 1 hour, and then the changes in transmittance of the glass substrates were checked. The results are shown in FIG. 6. As a result, it is understood that the reduction in transmittance due to heat is small in the cases of the pigment coloring agents for a pseud color filter of Application Examples 8 and 9 each using a resin-treated pigment according to the present invention (FIGS. 6-1 and 6-2), and on the other hand, the transmittance is reduced in the case of Comparative Application Example 5 (FIG. 6-3). It is considered that this is because the surface of the pigment is treated with the A-B block copolymer (coloring matter block copolymer) according to the present invention, particularly treated with the block B having ionicity, thereby making the heat resistance satisfactory. Moreover, it was also confirmed that, in the coloring matter block copolymer according to the present invention, the dye was incorporated in the polymer and therefore volatilization of the dye due to heat did not occur.

Next, alkali developability tests were conducted in the manner as described below. That is to say, a spot was made with a 0.1 N aqueous solution of tetramethylammonium hydroxide every five minute on each of the color glass substrates spin-coated with each of pigment coloring agents for a pseud color filter of Application Examples 8 to 11 and Comparative Application Examples 5 and 6 and then pre-baked to conduct the alkali developability tests of determining "how many seconds to take to dissolve the exposed portion of a coating film". The results are shown in Table 8.

TABLE 8

Results of alkali developability test

| | Dissolution time | Developing behavior | Dissolution residue |
|---|---|---|---|
| Application Example 8 | <10 | Dissolved | Not present |
| Application Example 9 | <10 | Dissolved | Not present |
| Application Example 10 | <10 | Dissolved | Not present |
| Application Example 11 | <10 | Dissolved | Not present |
| Comparative Application Example 5 | 35 | detached as films | Present |
| Comparative Application Example 6 | 60 | detached as films | Present |

As shown in Table 8, the result that the developing time was shorter in the cases where the coloring agents of Application Examples 8 to 11 each using a resin-treated pigment according to the present invention were used as compared with the cases where conventional coloring agents of Comparative Examples 5 and 6 were used. Moreover, with respect to the dissolution behavior in Application Examples 8 to 11, film-like leftovers were not produced, and further, it was able to be confirmed that the edge of the coating film left undissolved was, when observed with a microscope, sharp for each of Application Examples 8 to 11. It is considered this is because the block A contained in the resin-treated pigment according to the present invention was neutralized with an alkali, the block B was adsorbed to the pigment, and therefore the A-B block copolymer dissolved in water to make the developability satisfactory. On the other hand, when the coloring agent of Comparative Example 5 or 6 was used, it was confirmed that the dissolution time was slightly longer, and that, also with respect to the dissolution behavior, the coating film was detached in small pieces of films, and besides, edges were slightly left. It is considered that those results were obtained because the alkali development was not able to be conducted with the pigment dispersants in the coloring agents of Comparative Application Examples 5 and 6. That is to say, by use of the coloring agent using the resin-treated pigment according to the present invention, it is expected that the development time can be reduced and the productivity can be improved.

Comparative Application Example 7

Next, a comparative violet pigment dispersion liquid was prepared using a pigment (hereinafter, written as "comparative violet pigment") treated with 5% of a micronized product of dioxazine-based violet pigment, PV-23, and copper phthalocyanine monosulfonic acid relative to the pigment and dispersing the pigment with a commercially available pigment dispersant in the same manner as in Comparative Application Example 4. This is a pigment dispersion liquid for comparison simulating the dispersion of a conventionally known coloring agent. A pigment dispersion liquid was prepared using the pigment dispersion liquid for comparison in the same manner as in Comparative Application Example 4 except that PB-15:6 and PV-23 were blended so that the ratio of PB-15:6 and PV-23 might be 85:15 in place of PB-15:6 used in Comparative Application Example 4 as shown in Table 5. A blue coloring agent for a pseud color filter was obtained using the resultant pigment dispersion liquid in the same manner as in Comparative Application Example 5, and the blue coloring agent was used as Comparative Application Example 7.

Comparative Application Example 8

Next, a PR-254 pigment dispersion liquid was prepared by dispersing a pigment using a commercially available pigment dispersant (trade name: BYK-21116, manufactured by BYK Japan KK) with a horizontal media mill, the pigment obtained by treating the micronized PR-254 pigment used in Example 13 with 5% of the 254S relative to the pigment. Moreover, a PR-177 pigment dispersion liquid was prepared: using a micronized product of an anthraquinone-based red pigment, PR-177, (hereinafter, the micronized product will be written as "comparative red pigment"); and dispersing the micronized product with BYK-21116 in the same manner as described above. These are pigment dispersion liquids for comparison simulating the dispersion of a conventionally known coloring agent. A pigment dispersion liquid was prepared using these pigment dispersion liquids for comparison in the same manner as in Comparative Application Examples except that the PR-254 pigment dispersion liquid and the PR-177 pigment dispersion liquid were blended so that the ratio of the PR-254 pigment dispersion liquid and the PR-177 pigment dispersion liquid was 90:10. A red pigment coloring agent for a pseud color filter (pseud color resist) was obtained using the pigment dispersion liquid in the same manner as in Comparative Application Example 5, and the red pigment coloring agent was used as Comparative Application Example 8.

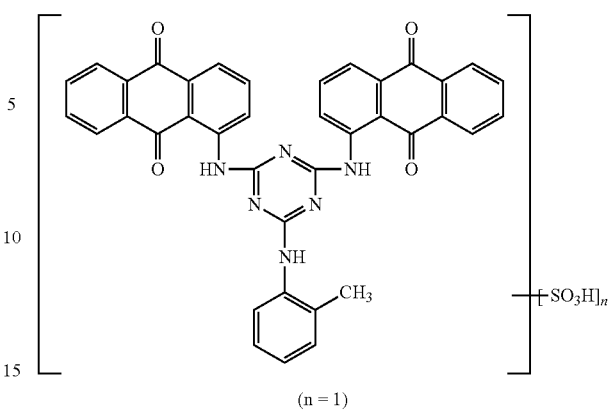

(n = 1)

A glass substrate was spin-coated with each of the resultant coloring agents of Comparative Application Examples 7 and 8. The spin-coated glass substrates were pre-baked at 90° for 2 minutes, thereafter post-baked at 230° C. for 30 minutes, and then exposed with a light quantity of 100 mJ/cm$^2$ using a high-pressure mercury lamp to produce each of a blue glass substrate and a red substrate.

Contrast (CR) and a Y value being an index of transparency were measured at the point in time when the pre-bake was conducted and at the point in time when the post-bake. Specifically, the contrast (CR) and the Y value being an index of transparency were measured with a contrast measuring apparatus (contrast tester CT-1 manufactured by Tsubosaka Electric Co., Ltd.) setting y=0.074 for blue glass plates and x=0.650 for red glass plates. The results are shown in Table 9. It is to be noted that the measurement results are shown relatively when the CR and Y value are assumed to be 100% in the case where the coloring agent of Comparative Application Examples 7 or Comparative Application Example 8 are used. The respective values in the cases where the coloring agents of Application Examples 8 to 11 are used are also shown together in Table 9.

TABLE 9

Evaluation results of contrast characteristic and transparency

| | Pre-bake | | Post-bake | |
| --- | --- | --- | --- | --- |
| | CR | Y value | CR | Y value |
| Comparative Application Example 7 | 100 | 100 | 89 | 90 |
| Application Example 8 | 136 | 123 | 134 | 123 |
| Application Example 9 | 129 | 122 | 130 | 122 |
| Application Example 10 | 135 | 129 | 131 | 129 |
| Comparative Application Example 8 | 100 | 100 | 87 | 93 |
| Application Example 11 | 132 | 125 | 128 | 124 |

As shown in Table 9, a higher contrast characteristic and a higher transparency were able to be obtained for the coloring agents of Application Examples 8 to 11 each using a resin-treated pigment according to the present invention as compared with those for the coloring agents of Comparative Application Examples 7 and 8 each using a usual pigment dispersion liquid, meaning that the color developability and transparency originating from the coloring matters can be obtained for coloring agents of Application Examples 8 to 11. Moreover, the coloring agents of Application Examples 8 to 11 had a satisfactory heat resistance and the deterioration of physical property values thereof was hardly observed even at high temperatures.

Next, light fastness tests were conducted with a super UV tester using blue glass substrates obtained in Application Examples 8 to 10 and Comparative Application Example 7 and red glass substrates obtained in Application Example 11 and Comparative Application Example 8. The glass substrates were irradiated with 60 mW/cm$^2$ of light for 30 hours, and the color differences before and after irradiation were measured. The color difference ΔE for the blue glass substrate using a conventional coloring agent and obtained in Comparative Example 7 was 0.2, the color difference ΔE for the red glass substrate using a conventional coloring agent and obtained in Comparative Application Example 8 was 0.3, and thereby it was confirmed that the light fastness originating from the pigments was obtained. On the other hand, the color differences ΔE for blue glass substrates each using a coloring agent containing a resin-treated pigment according to the present invention were 0.4 in Application Example 8, 0.4 in Application Example 9, and 0.6 in Application Example 10, the color difference of the red glass substrate was 0.4 in Application Example 11, and therefore the blue glass substrates obtained in Application Examples 8 to 10 and the red glass substrate obtained in Application Example 11 had a sufficiently high light fastness that was within the range suitable for use and had no problem although the light fastness for these glass substrates were inferior to that for the glass substrates obtained in Comparative Application Examples 7 and 8.

As described above, it was understood that the coloring agents each using a resin-treated pigment of Examples according to the present invention were excellent in dispersibility, storage stability, optical properties, heat resistance, alkali developability, and light fastness, and it was indicated that the coloring agents each using a resin-treated pigment of Examples according to the present invention were extremely useful particularly as a coloring agent for color filters.

Example 14: Preparation of Treated Cyan Pigment-1

In a 5 L flask, 337.8 parts of water paste (solid content of 29.6%) of PB-15:3 (A-220JC, manufactured by Dainichiseika Color & Chemicals Mfg. Co., Ltd.) were charged, and further, 1.5 parts of sodium dodecylbenzene sulfonate (molecular weight of 348.5, hereinafter also written as "SDS") being a sulfonate group-containing surface active agent and 59.2 parts of ion-exchanged water were added, and thereafter the resultant mixture was stirred with a disper to prepare a mill base. Subsequently, the pigment was sufficiently dispersed in the mill base with the horizontal media disperser in the same manner as described previously to obtain a pigment dispersion liquid.

The pigment dispersion liquid obtained above was diluted with water so that the pigment concentration might be 5%. Direct blue 199 (Sirius Turquoise S-FBL, manufactured by DyStar Japan Ltd., hereinafter written as DB-199, theoretical molecular weight of 909.4, having one sodium sulfonate group in average within a molecule) was charged in an amount of 15 parts under stirring with a homogenizer. The resultant mixture was stirred at 5000 rpm for 1 hour to peptize the pigment and the dye, and thereafter part of the mixture was taken out to make a spot on filter paper. Subsequently, an aqueous solution obtained by mixing and homogenizing 144.4 parts of the solution of A-C block copolymer-1 obtained in Synthesis Example 1 and 144.4 parts of ion-exchanged water was gradually added, and it was able to be confirmed that the viscosity of the resultant mixture increased at a certain point in time. Subsequently, the resultant mixture was continuously stirred for 1 hour. Thereafter, a spot was made on filter paper with part of the solution, and the result is shown in FIG. 7 together with the above-described spot.

FIG. 7 shows the surface state of the filter paper on which the spot was made, and the spot on the left side is a spot made at the point in time when the pigment and the dye were peptized. The pigment in the center and the bleeding dye can be confirmed. Moreover, the spot on the right side is a spot made after the viscosity increase caused by the addition of A-C block copolymer-1; however, the bleeding of the dye cannot be confirmed. From these facts, it was able to be confirmed that the chloride ion contained in A-C block copolymer-1 and the sodium ion contained in the dye caused desalting reaction to produce an A-B block copolymer and the A-B block copolymer was insolubilized, precipitated to treat the pigment. From the results shown in FIG. 7, it is inferred that the pigment was treated with the A-B block copolymer.

Subsequently, the resultant mixture was filtered, and the product was washed well with water. The filterability was extremely satisfactory, and it was able to be confirmed that the filtrate was transparent and the dye did not bleed. Also from the fact, it is considered that the A-B block copolymer being the coloring matter polymer specified in the present invention was formed and the pigment was treated with the A-B copolymer. The resin-treated pigment was obtained in the manner as described above, and the water paste thereof had a solid content of 35.5%. The resin-treated pigment prepared above was intended such that the resin-treated pigment was prepared in an aqueous solvent containing a pigment finely dispersed in advance with SDS being a sulfonate group-containing surface active agent, thereby treating the pigment in a finely dispersed state. In this case, it is considered that sodium dodecylbenzene sulfonate (SDS) used as a dispersant also contributes to adsorption by salt exchange with part of A-C block copolymer-1. Therefore, A-C block copolymer-1 into which SDS is introduced is not regarded as a coloring matter but is regarded as the A-B block copolymer because a salt-exchanged monomer is contained.

According to the theoretical calculation similar to that described previously in Example 7, the resin-treated pigment obtained above is a pigment treated with theoretically about 73.1% of the A-B block copolymer relative to 100 parts of the pigment. It is to be noted that A-C block copolymer-1 into which SDS is introduced is not regarded as a coloring matter but is regarded as the A-B block copolymer. Moreover, the quaternary salt in A-C block copolymer-1 was reacted with the sulfonate group of SDS and DB-199 under an equimolar condition. The resin-treated pigment is referred to as treated cyan pigment-1. With respect to the treated cyan pigment-1, the content of the coloring matter-containing methacrylate (coloring matter monomer unit), which is specified in the present invention, in the A-B block copolymer is 32.3% and 46.5% in the block B, further, the amount of the A-B block copolymer relative to 100 parts of the pigment is 73.1 parts, and the pigment content in the treated-pigment is 57.8%.

Application Example 12: Preparation of Aqueous Cyan Pigment Dispersion Liquid

A mill base was prepared by mixing 487.3 parts of water paste of treated cyan pigment-1 obtained above, 20 parts of BDG, 5 parts of diethanolamine, and 43.3 parts of ion-exchanged water, and then stirring the resultant mixture with a disper. The mixture had no fluidity at first, but exhibited fluidity as the mixture was stirred. The mill base was sufficiently mixed, and subsequently subjected to dispersion treatment using the horizontal media disperser at a peripheral speed of 10 m/s to disperse the pigment sufficiently in the mill base. The mill base obtained was filtered with a 10 µm membrane filter, and then further filtered with a 5 µm membrane filter. During filtration, clogging of the filters was not observed at all. The pigment content was adjusted so as to be 15% by mass by adding ion-exchanged water to obtain an aqueous cyan pigment dispersion liquid specified in the present invention. The number average particle diameter of the pigment contained in the aqueous cyan pigment dispersion liquid obtained was 103 nm to find that the pigment was finely dispersed. Moreover, the viscosity was, when measured with an E type viscometer, 3.30 mPa·s at 60 rpm and 25° C., and the aqueous cyan pigment dispersion liquid exhibited a low viscosity even though the content of the resin treating the pigment is high relative to the pigment. It is considered that this is because a dissolved polymer component was not present.

Comparative Application Example 9: Preparation of Comparative Aqueous Cyan Pigment Dispersion Liquid In order to make a comparison with the aqueous cyan pigment dispersion liquid obtained above, the PB-15:3 pigment used in Example 14 was dispersed with a conventionally known dispersant to prepare a comparative aqueous cyan pigment dispersion liquid. In more detail, a comparative aqueous cyan pigment dispersion liquid was obtained by conducting dispersion in the same manner as in Application Example 12 except that a styrene-maleic acid copolymer (acid value of 200 mgKOH/g, number average molecular weight of 5000, PDI of 2.3, an aqueous neutralized diethanolamine solution, solid content of 25%) being a random polymer type dispersant was used as a dispersant in an amount of 30 parts in terms of the solid content relative to 100 parts of the pigment. The number average particle diameter of the pigment contained in the comparative aqueous cyan pigment dispersion liquid obtained was 99 nm to find that the pigment was finely dispersed. Moreover, the viscosity was, when measured with an E type viscometer, 3.69 mPa·s at 60 rpm and 25° C.

The storage stability test was conducted in the manner as described below for the aqueous cyan pigment dispersion liquid obtained in Application Example 12 and the comparative aqueous cyan pigment dispersion liquid obtained in Comparative Application Example 9. Each of the dispersion liquids was put into a glass bottle and placed in a thermostatic chamber set at 70° C., and changes in the viscosity and the average particle diameter after the dispersion liquids were left to stand for 1 week were tested. As a result, the aqueous cyan pigment dispersion liquid using the resin-treated pigment according to the present invention had an average particle diameter of 103 nm and a viscosity of 3.21 mPa·s, and it was able to be confirmed that the changes in physical properties due to storage were not observed and the aqueous cyan pigment dispersion liquid maintained dispersion stability of high level. It is considered that this is because the A-B block copolymer according to the present invention was strongly adsorbed to the pigment to improve the storage stability. On the other hand, the comparative aqueous cyan pigment dispersion liquid had an average particle diameter of 135 nm and a viscosity of 5.6 mPa·s, and the aggregation of the pigment and viscosity increase were observed to obtain a result that the storage stability was poor.

Next, inks were prepared using each of the pigment dispersion liquids so as to contain 3% of cyan pigment, 1.8% of BDG, 5% of 1,2-hexanediol, 15% of glycerin, 1% of Surfynol 465, and balance water. The measurement of the average particle diameter and viscosity, and the storage stability test were conducted for the pigment in respective inks in the same manners as described previously. The results obtained are shown in Table 10.

TABLE 10

| | Evaluation of inks prepared using each pigment dispersion liquid | | | | | | | |
|---|---|---|---|---|---|---|---|---|
| | Particle diameter (nm) | | | | Viscosity (mPa · s) | | | |
| Kind of pigment dispersion liquid | Initial | After 7 days | Rate of change | Evaluation | Initial | After 7 days | Rate of change | Evaluation |
| Application Example 12 | 95 | 95 | 0% | AA | 2.9 | 2.8 | 3% | AA |
| Comparative Application Example 9 | 91 | Gel | — | C | 4.5 | Gel | — | C |

From the results described above, it was confirmed that the inks each using a resin-treated pigment according to the present invention were excellent in long-term storage stability similarly as in the case of the pigment dispersion liquids.

Next, each of the inks prepared above were filled into a cartridge, and solid printing was conducted with a printer to evaluate printability. In evaluating the printability, solid printing was conducted using a printer EM 930C, an inkjet printer manufactured by Seiko Epson Corporation, on photo-dedicated glossy paper (PGPP), Xerox paper 4024 manufactured Xerox Corporation, US, photo-dedicated matt paper with a print mode of "photo 720 dpi". As a result, a streak, misdirection, a dot blank, or the like was not observed for the ink using the aqueous cyan pigment dispersion liquid of Application Example 12 according to the present invention even though printing was conducted for a long time. Moreover, it was confirmed that the ink was able to be ejected from the inkjet nozzles without a problem. On the other hand, it was confirmed that a streak occurred after printing 10 sheets of paper for the ink using the aqueous cyan pigment dispersion liquid of Comparative Application Example 9. It is considered that this is because the dissolving dispersant is a random polymer dispersant and therefore the viscosity was unsatisfactory. From the results shown above, it was able to be confirmed that the ejection stability of the ink of Application Example using a resin-treated pigment according to the present invention had a satisfactory ejection stability.

Printing was conducted changing the photo matt paper into plain paper. Both inks gave similar image quality, and the image did not change even when a water droplet is dropped thereon. That is to say, when a coloring matter that dissolves in water, such as a dye, is used in an inkjet ink (hereinafter, written as IJ ink), the dye dissolves due to the water droplet to cause bleeding; however, when the coloring matter polymer according to the present invention is used, the coloring matter being a dye is bonded to the polymer, and therefore it is considered that bleeding did not occur due to water. From the results shown above, it was able to be confirmed that the ink of Application Example according to the present invention had a satisfactory water resistance.

After the printing test of each ink, each inkjet ink head was dried at 45° C. for 24 hours so that the ink could not be ejected, and thereafter the head cleaning operation of the printer was conducted once to evaluate re-ejection ability. The ink using the aqueous cyan pigment dispersion liquid of Application Example 12 according to the present invention was able to be ejected without a problem. That is to say, it is clear that the pigment dispersion liquid according to the present invention had satisfactory re-dissolvability and re-dispersibility because even if the pigment dispersion liquid is dried once, the dried product dissolves and is dispersed again. It is considered that this is because the block A contains a carboxy group, the carboxy group is neutralized to form an ion, and the block A easily dissolves in a liquid medium such as water even when the ink is dried. From the result, it was confirmed that the pigment treated with the A-B block copolymer according to the present invention had a satisfactory re-dissolvability due to the effect of the block A.

Moreover, the hue of respective printed products of the photo matt paper obtained above was measured and evaluated with an optical densitometer (trade name "Macbeth RD-914", manufactured by Macbeth). As a result, it was understood that the printed product formed by the ink using the pigment dispersion liquid according to the present invention had more excellent color developability and more expanded color gamut as compared with those of the printed product formed by the ink using the pigment dispersion liquid of Comparative Application Example 9.

Example 15: Preparation of Treated Magenta Pigment-1

In a 5 L flask, 333.3 parts of water paste (solid content of 30.0%) of PR 122 (CFR-130P, manufactured by Dainichiseika Color & Chemicals Mfg. Co., Ltd.) were charged and diluted with water so that the pigment concentration might be 5%. Subsequently, 12 parts of AR-289 were charged under stirring with a homogenizer. The resultant mixture was stirred at 5000 rpm for 1 hour to peptize the pigment and the dye, and thereafter part of the mixture was taken out to make a spot on filter paper. Subsequently, an aqueous solution obtained by mixing and homogenizing 110.8 parts of the solution of A-C block copolymer-5 obtained in Synthesis Example 5 and 110.8 parts of ion-exchanged water was gradually added, and it was able to be confirmed that the viscosity of the resultant mixture increased at a certain point in time. Subsequently, the resultant mixture was continuously stirred for 1 hour. Thereafter, a spot was made on filter paper with part of the solution, and the result is shown in FIG. 8 together with the above-described spot.

As shown in FIG. 8, the results similar to those shown in FIG. 7 and obtained in Example 14 are indicated, and in the spot on the left side is a spot made at the point in time when the pigment and the dye were peptized, the pigment present in the center and the bleeding dye can be confirmed. Moreover, the spot on the right side is a spot made after the viscosity increase caused by the addition of the A-C block copolymer. From the fact that the bleeding of the dye was not able to be confirmed, it was able to be confirmed that the chloride ion contained in the A-C block copolymer and the sodium ion contained in the dye caused desalting reaction to produce an A-B block copolymer and the A-B block copolymer was insolubilized, precipitated to treat the pigment.

Subsequently, the resultant mixture was filtered, and the product was washed well with water. The filterability was extremely satisfactory, and it was able to be confirmed that the filtrate was transparent and the dye did not bleed. Also from the fact, it is considered that the A-B block copolymer being the coloring matter polymer specified in the present invention was formed and the pigment was treated with the A-B block copolymer. The resin-treated pigment was obtained in the manner as described above, and the water paste thereof had a solid content of 33.3%. The resin-treated pigment is referred to as treated magenta pigment-1.

According to the theoretical calculation similar to that described previously in Example 7, the resin-treated pigment obtained above is a pigment treated with theoretically about 55.3% of the A-B block copolymer, which is obtained by reacting AR-289 with A-C Block copolymer-5, relative to 100 parts of the pigment. The pigment content in the resin-treated pigment is 64.4%. Moreover, the A-B block copolymer was obtained by reacting the quaternary salt in A-C block copolymer-5 with sulfonate group in AR-289 under an almost equimolar condition. Furthermore, the content of the coloring matter-containing methacrylate is 28.9% in the A-B block copolymer and 49.2% in the block B.

Examples 16 and 17

Resin-treated magenta pigments were prepared in the same manner as in Example 15 except that 105.0 parts of A-C block copolymer-6 obtained in Synthesis Example 6 were used in Example 16 in place of A-C block copolymer-5 obtained in Synthesis Example 5 and used in Example 15 and 122.3 parts of A-C block copolymer-7 obtained in Synthesis Example 7 were used in Example 17 in place of A-C block copolymer-7 obtained in Synthesis Example 7. In both of the Examples, the phenomena similar to those in Example 15 were observed, thereby it was able to be confirmed that the pigment was treated with the A-B block copolymer, and the resin-treated pigment specified in the present invention was able to be obtained. The resin-treated pigment obtained in Example 16 is referred to as treated magenta pigment-2, and the resin-treated pigment obtained in Example 17 is referred to as treated magenta pigment-3. Moreover, the ratio of the A-B block copolymer relative to 100 parts of the pigment, the pigment content in the resin-treated pigment, the content of the coloring matter-containing methacrylate (coloring matter monomer unit) in the A-B block copolymer, the content of the coloring matter-containing methacrylate in the block B were shown in Table 11 together with those in Example 15.

TABLE 11

Properties of resin-treated pigments of Examples 15 to 17

|  | Example 15 | Example 16 | Example 17 |
|---|---|---|---|
| Amount (%) of coloring matter monomer unit in A-B block copolymer | 28.9 | 30.0 | 26.6 |
| Amount (%) of coloring matter monomer unit in block B | 49.2 | 50.6 | 50.5 |
| Amount (parts) of coloring matter polymer relative to 100 parts of pigment | 55.3 | 53.2 | 60.2 |
| Amount (%) of pigment contained in resin-treated pigment | 64.4 | 65.3 | 62.4 |

Application Example 13: Preparation of Magenta Pigment Dispersion Liquids and Inks Using Magenta Pigment Dispersion Liquids Treated magenta pigment-1, treated magenta pigment-2, and treated magenta pigment-3 obtained in Examples 15 to 17 were used and pigment dispersion liquids containing each treated magenta pigment were prepared in the same manner as in Application Example 12. Further, the pigment dispersion liquids were used and inks containing each pigment dispersion liquid were prepared in the same manner as in Application Example 12. It was confirmed that all of these pigment dispersion liquids and inks exhibited excellent performance in dispersibility, storage stability, water resistance, ejection stability being a printing property, and re-dissolvability similarly as in the case of the aqueous cyan pigment dispersion liquid and ink each using the aqueous cyan pigment dispersion liquid in Application Example 12. From the results described above, it was confirmed that even when the block A had various acid values, the A-B block copolymer according to the present invention exhibited excellent performance equally regardless of the acid values, and usefulness of the resin-treated pigment according to the present invention was confirmed.

Comparative Application Example 10: Preparation of Comparative Magenta Pigment Dispersion Liquid and Comparative Ink Using Comparative Magenta Pigment Dispersion Liquid In order to make a comparison with the above-described magenta pigment dispersion liquids, a comparative magenta pigment dispersion liquid was prepared. Specifically, a comparative magenta pigment dispersion liquid was obtained in the same manner as in Comparative Application Example 9 except that PR-122 being a magenta pigment was used in place of PB-15:3 used in Comparative Application Example 9. A comparative magenta ink was then prepared in the same manner as in Comparative Application Example 9.

Printing was conducted with an inkjet printer in the same manner as in Application Example 12 using each of the ink prepared using treated magenta pigment-1 obtained in Application Example 13 and the comparative magenta ink obtained in Comparative Application Example 7, and the measurement of the hue and the optical density (with "Macbeth RD-914", tradename, manufactured by Macbeth) was conducted for the printed products of the photo matt paper. As a result, it was understood that the color developability was more excellent and the color gamut was expanded more in the case where the pigment dispersion liquid according to the present invention was used as compared with those in Comparative Example.

(Application Example 14: Application to Coloring Agent for Ultraviolet Ray Curable IJ Ink)

Application of the present invention to a coloring agent for an ultraviolet ray curable IJ ink was studied. Forty parts (20 parts in terms of the pigment content) of the treated cyan pigment-1 obtained in Example 14 and 60 parts of isobornyl acrylate were added and mixed, and the resultant mixture was stirred with a dissolver for 2 hours. After it was confirmed that the lumps of pigments disappeared, the resultant mixture was subjected to dispersion treatment with the horizontal media disperser described previously to prepare a pigment dispersion liquid. The pigment dispersion liquid obtained was passed through a 10 μm filter and then a 5 μm filter. Clogging of the filters were not observed at all during filtration. The pigment contained in the cyan color pigment dispersion liquid obtained had an average particle diameter of 100 nm and a viscosity of 19.2 mPa·s. As described above, a satisfactory pigment dispersion liquid was obtained by only dispersing the monomer and the resin-treated pigment.

The average particle diameter and viscosity (viscosity after storage) after the pigment dispersion liquid obtained above was left to stand at 70° C. for 1 week were measured. As a result, the average particle diameter was 98 nm, and the viscosity was 19.0 mPa·s. As described previously, the pigment contained in the pigment dispersion liquid before the test was fine, as fine as having an average particle diameter of around 100 nm. Further, the initial viscosity thereof was low, and the changes in the average particle diameter and the viscosity were hardly observed even in the storage stability test to find that the average particle diameter and viscosity were extremely stable.

Moreover, it was confirmed that the resin-treated pigment according to the present invention was treated in advance with the A-B block copolymer functioning as a pigment dispersant as described previously, and therefore was highly dispersed to maintain stability at a high level by only adding the pigment to a monomer being a solvent and then dispersing the resultant mixture.

Next, an ultraviolet ray curable IJ ink was prepared by the combination described below using the pigment dispersion liquid obtained above.

| | |
|---|---|
| Pigment dispersion liquid described above | 12.5 parts |
| Isobornyl acrylate | 44.5 parts |
| 1,6-Hexanediol diacrylate | 25 parts |
| Trimethylolpropane triacrylate | 7 parts |
| Dipentaerythritol hexaacrylate | 3 parts |
| Lucilin TPO (photopolymerization initiator manufactured by BASF SE) | 3 parts |
| Irgacure 819 (photopolymerization initiator manufactured by BASF SE) | 2 parts |
| Irgacure 127 (photopolymerization initiator manufactured by BASF SE) | 3 parts |

The ink was sufficiently stirred, thereafter filtered with a membrane filter having a pore size of 10 μm and then with a membrane filter having a pore size of 5 μm to obtain an IJ ink.

The measured particle diameter of the pigment in the ink prepared above was 98 nm, and the viscosity of the ink was 3.7 mPa·s. The ink was put in a brown sample bottle, and the storage stability test described previously was conducted to find that neither a transparent top layer nor sedimentation was observed at all, the average particle diameter of the pigment in the ink after the storage was 99 nm, and the viscosity of the ink after the storage was 3.6 mPa·s. It was understood that, by using the resin-treated pigment according to the present invention, the moiety at which the resin was to be adsorbed to the pigment was adsorbed to the pigment without being detached from the pigment, thereby making the storage stability of the ink satisfactory.

Next, the ultraviolet ray curable IJ ink obtained above was filled into a cartridge, and solid printing was conducted continuously for 1 hour on polyethylene terephthalate (PET) films with an inkjet printer EB100 manufactured by Konica Minolta, Inc. As a result, printing can be conducted smoothly without clogging of the head, neither a streak nor misdirection in the solid printing being a printed image was observed at all, and the ink exhibited a satisfactory ejection stability even during printing for a long time.

As described above, it was confirmed that the ink using the resin-treated pigment specified in the present invention exhibited a satisfactory ejection stability and gave printed products without a streak or misdirection even in the case of the ultraviolet ray curable ink containing a large amount of monomers.

INDUSTRIAL APPLICABILITY

According to the present invention, a useful resin-treated pigment is easily obtained by treating a pigment with a particular A-B block copolymer that is specified in the present invention and that has, within the structure thereof, an organic coloring matter skeleton such as a dye through an ionic bond, and the resin-treated pigment, when dispersed, exhibits dispersibility of fine particles at a high level and long term stability at a high level. Besides such performance, it can be confirmed that the resin-treated pigment has properties that are applicable to various methods of use: namely, the resin-treated pigment, when used as a coloring agent for color filters, gives a high transparency, a high contrast characteristic, and a satisfactory alkali developability; and, further, when the resin-treated pigment is used as an aqueous inkjet ink, re-dissolvability and ejection stability are imparted to the ink, and therefore utilization of the resin-treated pigment according to the present invention in a wide range of areas is expected. Besides, since the A-B block copolymer according to the present invention has, within the structure thereof, an organic coloring matter skeleton such as a dye through an ionic bond, the color developability of the coloring matter present in the polymer is added to the color developability of the pigment to be dispersed to further improve color performance of the resin-treated pigment obtained by treating a pigment with the A-B block copolymer according to the present invention, therefore the resin-treated pigment has a possibility to reproduce hue that has never been able to be achieved with conventional coloring agents, and also from this point of view, utilization thereof in a wide range of areas is expected. Moreover, the resin-treated pigment contains an A-B block copolymer having, within the structure thereof, a coloring matter molecule through an ionic bond and therefore has an improved heat resistance and an improved light fastness. Furthermore, the resin-treated pigment that is provided by the present invention is usable for both aqueous-based products and oil-based products. Therefore, the resin-treated pigment that is provided by the present invention can provide paints, inks, coloring agents for stationery, particularly coloring agents for color filters, coloring agents for UV-IJ, inkjet inks that are suitable for inkjet printing systems that can be applicable to high-speed printing, and therefore the use thereof in a wide variety of fields is expected.

The invention claimed is:

1. An A-B block copolymer, 90% by mass or more of which is constituted by a methacrylate-based monomer or methacrylate-based monomers, wherein:
a polymer block A comprises at least a carboxyl group-containing methacrylate as a constituent, provided that the polymer block A comprising an amino group- or quaternary ammonium salt group-containing methacrylate as a constituent is excluded;
a polymer block B comprises an ionic bond moiety represented by formula (1) as a constitutional unit, the ionic bond moiety comprising:
a methacrylate; and
an organic coloring matter having one or more sulfonate ions:

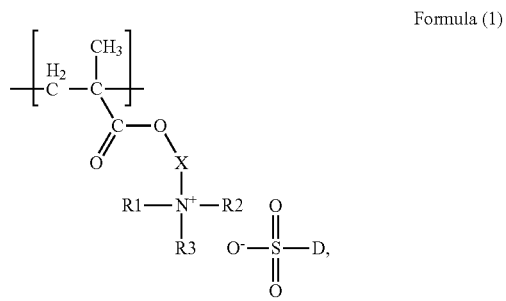

Formula (1)

wherein X represents an organic group, R1 to R3 each independently represent any one selected from the group consisting of C1 to C18 alkyl groups and a benzyl group, and a $DSO_3^-$ group represents an organic coloring matter,
wherein the polymer block A is water-soluble when being neutralized with an alkali,
the polymer block B is capable of adsorbing to a pigment,
D in the $DSO_3^-$ group of the formula (1) in the polymer block B is an organic coloring matter skeleton,
the $DSO_3^-$ group in the polymer block B is a sulfonate-group-containing dye having at least one sulfonate group,
the sulfonate-group-containing dye dissolves in water,
the at least one sulfonate group in the $DSO_3^-$ group in the polymer block B is ionically bonded to a quaternary ammonium cation that is bonded to X in the formula (1), and
a moiety represented by the formula (1) is contained in a range from 5 to 40% by mass in the A-B block copolymer and in a range from 20 to 80% by mass in the polymer block B.

2. The A-B block copolymer according to claim 1, wherein the ionic bond moiety being contained in the polymer block B and comprising the organic coloring matter having one or more sulfonate ions each being bonded thereto is formed by subjecting:
an A-C block copolymer comprising the polymer block A and a polymer block C comprising a quaternary ammonium methacrylate represented by formula (2) as a constituent; and
the organic coloring matter having at least one structural moiety selected from the group consisting of alkali metal sulfonates, within a molecule thereof,
to a reaction to detach counter ions as an alkali metal halide:

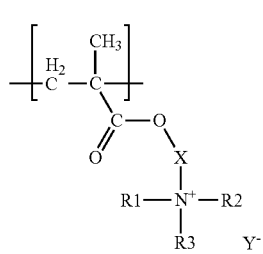

Formula (2)

wherein X represents an organic group, R1 to R3 each independently represent any one selected from the group consisting of C1 to C18 alkyl groups and a benzyl group, and Y⁻ represents a halogen ion.

3. The A-B block copolymer according to claim 1, wherein the polymer block A has a number average molecular weight in a range from 3000 to 20000 in terms of polystyrene in gel permeation chromatography, a degree of dispersion in a range of 1.5 or less, which is weight average molecular weight/number average molecular weight, and an acid value in a range from 30 to 250 mgKOH/g.

4. The A-B block copolymer according to claim 1, obtained by utilizing living radical polymerization using a polymerization initiation compound.

5. The A-B block copolymer according to claim 4, wherein, in the living radical polymerization, a total number of moles of a monomer or monomers for forming the polymer block B is in a range from 10 to 150 mol relative to 1 mol of the polymerization initiation compound.

6. A process for producing the A-B block copolymer according to claim 1, the process comprising:
conducting living radical polymerization in the presence of at least a polymerization initiation compound and a catalyst, wherein:
the polymerization initiation compound is at least any one of iodine and iodine compounds,
the catalyst is at least one compound selected from the group consisting of phosphorus halides, phosphite-based compounds, phosphinate-based compounds, imide-based compounds, phenol-based compounds, diphenylmethane-based compounds, and cyclopentadiene-based compounds, and
a polymerization temperature is in a range from 30 to 50° C.

7. A resin-treated pigment composition obtained by treating a pigment with the A-B block copolymer according to claim 1,
wherein the pigment is treated within a range from 10 to 200 parts of the A-B block copolymer relative to 100 parts of the pigment.

8. A process for producing the resin-treated pigment composition according to claim 7, the process comprising:
subjecting (i) the organic coloring matter having at least one structural moiety selected from the group consisting of alkali metal sulfonates within a molecule thereof, the organic coloring matter being the sulfonate-group-containing dye that dissolves in water, and
(ii) an A-C block copolymer comprising:
the polymer block A that is water-soluble when being neutralized with an alkali and comprises at least the carboxyl group-containing methacrylate as a constituent, provided that the polymer block A comprising the amino group- or quaternary ammonium salt group-containing methacrylate as a constituent is excluded; and
a polymer block C comprising: a quaternary ammonium methacrylate represented by formula (2) as a constituent:

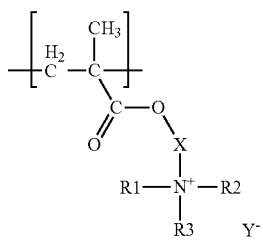

Formula (2)

wherein X in the formula (2) represents an organic group, R1 to R3 in the formula (2) each independently represent any one group selected from the group consisting of C1 to C18 alkyl groups and a benzyl group, and Y⁻ in the formula (2) represents a halogen ion,
to a reaction to detach counter ions as an alkali metal halide, in the presence of the pigment in an aqueous medium, thereby turning the pigment into a pigment treated with the A-B block copolymer, the A-C block copolymer reacting with the organic coloring matter in the reaction to form the A-B block copolymer.

9. The process for producing the resin-treated pigment composition according to claim 8, wherein the organic coloring matter and the A-C block copolymer are subjected to the reaction to detach the counter ions as the alkali metal halide in the presence of the aqueous medium comprising the pigment dispersed therein with a sulfonate group-containing surface active agent, thereby turning the pigment into a pigment treated with the A-B block copolymer.

10. A pigment dispersion obtained by dispersing the resin-treated pigment composition according to claim 7.

11. A pigment dispersion comprising at least:
a pigment; and
a pigment dispersant,
wherein the pigment dispersant is the A-B block copolymer according to claim 1, and
the pigment dispersion is an aqueous solution in which the polymer block B of the A-B block copolymer adsorbs to the pigment so that the pigment is dispersed in the aqueous solution.

12. A pigment dispersion liquid obtained by dispersing the pigment dispersion according to claim 10 in at least one dispersion medium selected from the group consisting of water, organic solvents, and polymerizable monomers.

13. A pigment dispersion obtained by dispersing a resin-treated pigment composition that is obtained by the process for producing the resin-treated pigment composition according to claim 8.

14. The A-B block copolymer according to claim 1, wherein the sulfonate-group-containing dye comprises at least one dye selected from the group consisting of acid dyes having a xanthene structure, pyranine derivatives, coumarin derivatives, oxazole derivatives, thiazole derivatives, imidazole derivatives, imidazolone derivatives, pyrazolone derivatives, benzidine derivatives, phthalocyanine derivatives, quinacridone derivatives, diketopyrrolopyrrole derivatives, azo-based dyes, disazo-based dyes, and diaminostilbene disulfonic acid derivatives.

15. A pigment dispersant that is an A-B block copolymer, wherein a polymer block B of the A-B block copolymer is capable of adsorbing to a pigment, and 90% by mass or more of the A-B block copolymer is constituted by a methacrylate-based monomer or methacrylate-based monomers, wherein:
a polymer block A comprises at least a carboxyl group-containing methacrylate as a constituent, provided that the polymer block A comprising an amino group- or quaternary ammonium salt group-containing methacrylate as a constituent is excluded;

the polymer block B comprises an ionic bond moiety represented by formula (1) as a constitutional unit, the ionic bond moiety comprising:
  a methacrylate; and
  an organic coloring matter having one or more sulfonate ions:

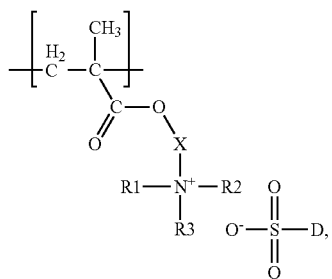

Formula (1)

wherein X represents an organic group, R1 to R3 each independently represent any one selected from the group consisting of C1 to C18 alkyl groups and a benzyl group, and a $DSO_3^-$ group represents an organic coloring matter, wherein the polymer block A is water-soluble when being neutralized with an alkali, D in the $DSO_3^-$ group of the formula (1) in the polymer block B is an organic coloring matter skeleton, the $DSO_3^-$ group in the polymer block B is a sulfonate-group-containing dye having at least one sulfonate group, the sulfonate-group-containing dye dissolves in water, the at least one sulfonate group in the $DSO_3^-$ group in the polymer block B is ionically bonded to a quaternary ammonium cation that is bonded to X in the formula (1), and a moiety represented by the formula (1) is contained in a range from 5 to 40% by mass in the A-B block copolymer and in a range from 20 to 80% by mass in the polymer block B.

* * * * *